(12) United States Patent
Guilaume et al.

(10) Patent No.: US 10,212,251 B2
(45) Date of Patent: Feb. 19, 2019

(54) METHOD AND SYSTEM FOR GENERATING EXCHANGEABLE USER PROFILES

(71) Applicant: InvenSense, Inc., San Jose, CA (US)

(72) Inventors: Sam Guilaume, Palo Alto, CA (US); Rene Cortenraad, Saint Egreve (FR); Cyrille Soubeyrat, Réaumont (FR)

(73) Assignee: InvenSense, Inc., San Jose, CA (US)

( * ) Notice: Subject to any disclaimer, the term of this patent is extended or adjusted under 35 U.S.C. 154(b) by 243 days.

(21) Appl. No.: 15/071,666

(22) Filed: Mar. 16, 2016

(65) Prior Publication Data

US 2016/0277528 A1    Sep. 22, 2016

Related U.S. Application Data

(60) Provisional application No. 62/133,894, filed on Mar. 16, 2015, provisional application No. 62/190,988, filed on Jul. 10, 2015.

(51) Int. Cl.
*G06Q 30/02* (2012.01)
*G06Q 50/18* (2012.01)
*H04L 29/08* (2006.01)

(52) U.S. Cl.
CPC ....... *H04L 67/306* (2013.01); *G06Q 30/0201* (2013.01); *G06Q 30/0206* (2013.01); *G06Q 50/188* (2013.01); *H04L 67/10* (2013.01); *H04L 67/12* (2013.01)

(58) Field of Classification Search
CPC ....... H04L 67/306; H04L 67/10; H04L 67/12; G06Q 30/0201; G06Q 50/188; G06Q 30/0206; G06Q 30/02; G06Q 30/0269; G06Q 30/0212; G06Q 30/0242; G06Q 30/0247; G06Q 50/28; G06Q 50/04; G06Q 50/24; G06Q 50/01
See application file for complete search history.

(56) References Cited

U.S. PATENT DOCUMENTS

| 8,290,577 | B2 * | 10/2012 | Brooks | A61B 5/0402 600/513 |
|---|---|---|---|---|
| 2008/0051679 | A1 * | 2/2008 | Maljanian | G01G 19/4146 600/587 |
| 2008/0234594 | A1 * | 9/2008 | Brooks | A61B 5/0402 600/513 |

* cited by examiner

*Primary Examiner* — Nikolay Yushin
(74) *Attorney, Agent, or Firm* — Bay Area Technology Law Group PC

(57) ABSTRACT

A profile of a user may be constructed having at least one profile entry. A device having an integrated sensor assembly including at least one sensor may be associated with the user and operated according to a sensor configuration. Sensor data may be processed to extract a feature. Entry data may be determined for a profile entry based on the extracted feature so that the profile entry may incorporate the determined entry data. An exchangeable profile may be derived from the constructed profile, for example by using privacy data, and compensation from a third party may be received in return for the exchangeable profile.

36 Claims, 40 Drawing Sheets

| Personal data | -user ID | 123456789 | | | | |
|---|---|---|---|---|---|---|
| | -gender | male | | | | |
| | -age | 30-40 y | 35y | 03/04/1980 | | |
| | -height | 170-180cm | 172cm | | | |
| | -hobbies | -tennis | -frequency | 3x/week | | |
| | | | -racket | Babolat | Play Pure Drive | |
| | | | -member | ID 12345 | | |
| | | | -ranking | 40-60 | 57 | |
| | | -running | -type | trail | | |
| | | | -frequency | 2x/week | | |
| | | | -distance | -total 2015 | 300-400km | 387km |
| | | | | -per week | 20-30km | 22.5km |
| | | | -partners | 1.7 | ID 123456790 | |
| | | | -shoes | Nike | Wildhorse GTX | 10/12/2014 |
| | -health | -doctor visit | -frequency | 1-5/year | | |
| | | -medication | none | | | |
| | - ... | | | | | |
| Housing | -type | apartment | 2nd floor | south-facing | | |
| | -location | California | San Jose | 1st street | | |
| | -heating | -type | electric | | | |
| | | -kWh/year | 10-20000 | 16745 | | |
| | | -avg room temp | 19.8C | | | |
| | - ... | | | | | |
| Car | -type | mid-size sedan | Toyota Corolla | | | |
| | -km/month | 1000-2000km | 1735km | | | |
| | -last service | 100-200 days | 03/04/2014 | | | |
| | - ... | | | | | |

Fig. 11

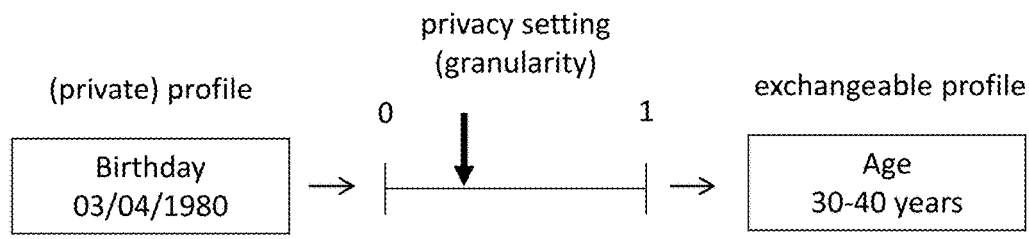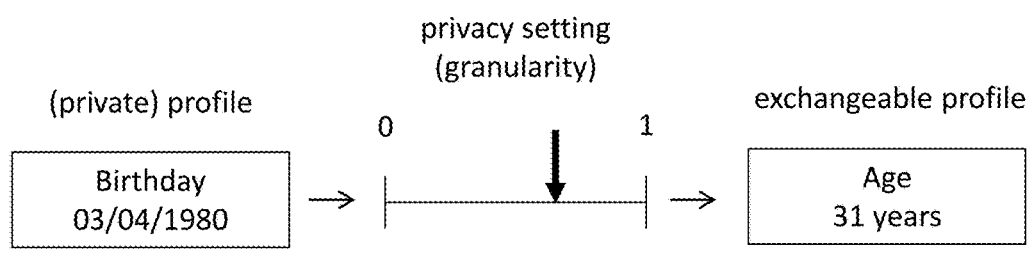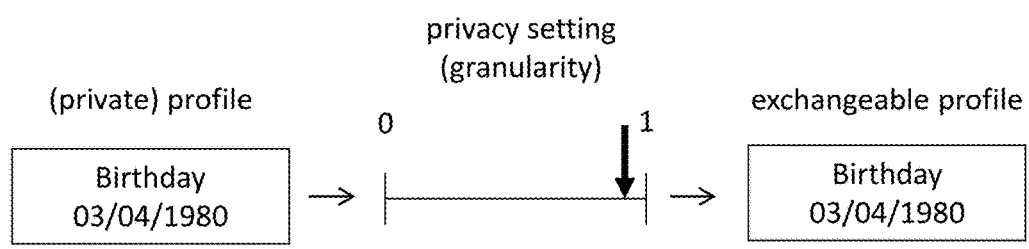
Fig. 25

METHOD AND SYSTEM FOR GENERATING EXCHANGEABLE USER PROFILES

CROSS REFERENCE TO RELATED APPLICATIONS

This application claims priority from and benefit of U.S. Provisional Patent Application Ser. No. 62/133,894, filed Mar. 16, 2015, which is entitled "AUCTION MY DATA," and U.S. Provisional Patent Application Ser. No. 62/190,988, filed Jul. 10, 2015, which is also entitled "AUCTION MY DATA," both of which are assigned to the assignee hereof and are incorporated by reference in their entireties.

FIELD OF THE PRESENT DISCLOSURE

The present disclosure generally relates to sensor data and more particularly to methods and systems for employing sensor data to in the construction of user profiles and the obtaining of compensation.

BACKGROUND

More and more devices get equipped with sensors and get connected. The sensor data from these devices may be analyzed and used to make predictions and/or construct models. These models convert sensor data into information and knowledge, and add value. For example, in an activity monitoring bracelet models and algorithms are used to convert the sensor data from the motion sensors in the device into the number of steps the user/wearer takes and the distance he or she walks. This information of the number of steps and distance has more value to the user than the raw sensor signals Determining if this number of steps is sufficient according to the user's lifestyle is knowledge. FIG. 1 shows a sensor, data, information, knowledge and wisdom (S-DIKW) pyramid where the value increases from the bottom to the top The models and algorithms that convert sensor data into information and knowledge take time and manpower to develop For example, to determine the relation between the motion sensor signals and number of steps it has to be determined how to detect a step based on the raw sensor signals, and how the step length depends on the characteristics of the user, such as e g. his or her height or style/speed of walking. In another example, an electronic tennis racket is equipped with sensors that convert the motion of the racket into a type of tennis swing using a pre-defined model. This model is based on an extended testing period with various tennis rackets and players. This makes developing a model very cost and labor intensive. By obtaining more sensor data from more players and rackets, analysis of the sensor data may be used to make a better model or better algorithms.

Often the models and algorithms are developed by specialized companies. An alternative way to develop models is to use the wisdom of the crowd, by having a crowd of people giving each their (small piece of) knowledge. In other words, by gathering the sensor data from many users, pattern or relations in the data can be investigated to determine the algorithms and models in a more automated manner. Many companies already exist that collect this data, often referred to as 'big data', and convert the data into value for the company. In almost all cases, the user who provided the data does not have any view in what is done with his or her data and how the big data company makes any profit. Moreover, the users and data providers almost never share in the profit these companies make through the added value.

In this disclosure a method and system are proposed where the user is in control of the sensor data he or she provides and the potential added value that can be generated based on this data. This means that the user can determine what happens to the data and that the user will receive any monetary benefit or other compensation that can be made based on the provided data. The user is assisted in these tasks by a service provider who helps the user construct a user profile based on the sensor data, and obtain monetizing options based on this profile and depending on privacy data, which may include the privacy settings of the user. FIG. 2 shows the flow of how the data produced by a user is converted into a user profile by a service provider, and how this profile may then be used to obtain compensation. The user profile may be consider an asset, and the user is in control on how to use this asset and convert it into compensation by sharing/exchanging/selling the profile information, or keeping the profile information private depending on his or her privacy ethics. The user profile has a dynamic character, which means that the user has to continue to provide (sensor) data to maintain his or her profile and the related monetizing options.

As will be described in the following materials, this disclosure satisfies these and other needs.

SUMMARY

As will be described in detail below, this disclosure includes a method for constructing a profile of a user having at least one profile entry. The method may involve associating a first device having an integrated sensor assembly including at least one sensor with the user, operating the sensor assembly according to a first sensor configuration, obtaining sensor data from the sensor assembly, determining at least one feature that may be extracted from the sensor data, processing the sensor data to extract the at least one feature, determining at least one profile entry that depends at least in part on the extracted feature, determining entry data for the at least one profile entry based at least in part on the extracted feature and generating the profile entry of the user profile by incorporating the determined entry data, so that the profile entry is based at least in part on sensor data from the integrated sensor assembly.

In one aspect, at least a second device having an integrated sensor assembly including at least one sensor may be associated with the user, wherein obtaining sensor data comprises obtaining sensor data from the first device and the second device.

In one aspect, the first device may be associated with a plurality of users, further comprising constructing a profile for each of the plurality of users, wherein the profiles each have at least one profile entry based at least in part on sensor data from the integrated sensor assembly.

In one aspect, a second configuration sensor configuration based at least in part on the entry data required for a profile entry may be determined so that the sensor assembly may be operated according to the second sensor configuration. The second sensor configuration may be based at least in part on a user setting.

In one aspect, generating the profile entry by incorporating the determined entry data may include incorporating the entry data in a plurality of entries of the user profile.

In one aspect, a confidence factor for the determined entry data for the profile entry may be determined. The confidence factor may be adjusted over time.

In one aspect, the first sensor configuration may be based at least in part on a user setting.

In one aspect, the method may also include obtaining a request for the at least one profile entry. Determining a feature may be based on the requested profile entry. Further, the first sensor configuration may be based at least in part on the request.

In one aspect, the method may also include inputting entry data for the profile entry and verifying the input entry data based on the sensor data. A confidence factor for the input information may be determined based at least in part on the verification.

In one aspect, the sensor data, profile entry or the complete user profile may be anonymized.

In one aspect, the method may also include determining the sensor activity for the determined entry data, and associating the sensor activity with the profile entry.

In one aspect, the profile may contain at least one profile entry related to a status of the user.

In one aspect, the user may be connected to at least one second user.

In one aspect, the method may also include obtaining privacy data corresponding to the user, establishing a plurality of granularity levels for at least one profile entry of the profile, selecting a first granularity level from the plurality of granularity levels for the at least one profile entry based at least in part on the privacy data and transforming the at least one profile entry to match the selected first granularity level. Establishing the plurality of granularity levels may involve analyzing a plurality of user profiles. The plurality of user profiles may be selected from a group of users, the selection process being based on a comparison of the entry data of at least one profile entry. An exchangeable profile may be generated that includes the at least one transformed profile entry.

In one aspect, the privacy data may be a user setting for the al least one profile entry, a user setting for a plurality of profile entries or a user setting for the profile. Additionally, the granularity of the profile entry may be derived from the privacy data using a disclosure parameter associated with the profile entry. The privacy data may also be derived from a plurality of user profiles and/or the privacy data may be determined for the profile by a service provider.

In one aspect, the method may also include transmitting the exchangeable profile to a third party and receiving compensation in return. The third party may be identified by a service provider. For example, the service provider may identify the third party by matching the transformed profile entry with a request. The compensation may be based at least in part on a granularity level of the entry data. The third party may also be selected from a plurality of entities based at least in part on the compensation being offered.

In one aspect, the method may also include modifying the exchangeable profile prior to transmission. The modification may be based at least in part on the characteristics of the third party. The modification of the exchangeable profile may also be linked to a change in the compensation.

In one aspect, the third party may be identified based at least in part on a user request. The user request may be based at least in part on a desired compensation.

In one aspect, the received compensation may be determined in an automated negotiation process with the third party according to preset rules. The content of the exchangeable profile may be determined in the automated negotiation process. Further, the negotiation process included a plurality of third parties.

In one aspect, the exchangeable profile may include information about a status of the user for the third party.

In one aspect, the exchangeable profile may include at least one profile entry related to a second user connected to the user.

In one aspect, the method may also include establishing a value for the transformed profile entry. A value for the transformed profile entry may be established based at least in part on comparison to at least one previous exchange. A value for the transformed profile entry may also be established based at least in part on a request for the transformed profile entry. Further, a value for the exchangeable profile by may be established by aggregating established values for a plurality of transformed profile entries. The established value for the transformed profile entry may be adjusted by selecting a second granularity level and updating the transformed profile entry based at least in part on the second granularity level. The second granularity level may correspond to a maximum obtainable granularity level.

In one aspect, the method may also include establishing a relation between the value and the sensor activity and/or relating the established value to the first sensor configuration. Further, the sensor assembly may be operated according to a second sensor configuration to generate an exchangeable profile with a different value.

In one aspect, the method may also include operating the sensor assembly according to a second sensor configuration based at least in part on analysis of a database of previous exchanges.

In one aspect, the method may also include operating the sensor assembly according to a second sensor configuration based at least in part on privacy data.

This disclosure also includes a device for constructing a user profile having a sensor assembly including at least one sensor integrated with the device and a profile module implemented by a processor configured to operate the sensor assembly according to a first sensor configuration, provide sensor data from the sensor assembly, determine at least one feature that may be extracted from the sensor data, process the sensor data to extract the at least one feature, determine at least one profile entry that depends at least in part on the extracted feature, determine entry data for the at least one profile entry based at least in part on the extracted feature and generate the profile entry to the user profile incorporating the determined entry data, so that the profile entry may be based at least in part on sensor data from the integrated sensor assembly.

In one aspect, the sensor assembly may include at least one of an accelerometer, a gyroscope, a magnetometer, and a barometer. The sensor assembly may include an inertial sensor implemented as a Micro Electro Mechanical System (MEMS).

This disclosure also include a server for constructing a user profile having a processor implementing a profile module configured to determine at least one profile entry that depends at least in part on an extracted feature, wherein the feature may be extracted from sensor data obtained from a device with an integrated sensory assembly operated according to a first sensor configuration that may be associated with the user, determine entry data for the at least one profile entry based at least in part on the extracted feature and generate the profile entry to the user profile incorporating the determined entry data, so that the profile entry may be based at least in part on sensor data from the integrated sensor assembly.

In one aspect, the profile module may be further configured to extract the feature from sensor data obtained from the device.

This disclosure also includes a system for constructing a user profile, such that the system includes a device having a sensor assembly including at least one sensor integrated with the device and a profile module implemented by a processor configured to operate the sensor assembly according to a first sensor configuration and provide sensor data from the sensor assembly and a server having a profile module implemented by a processor configured to determine at least one profile entry that depends at least in part on an extracted feature, wherein the feature may be extracted from sensor data obtained from the device, determine entry data for the at least one profile entry based at least in part on the extracted feature and generate the profile entry to the user profile incorporating the determined entry data, so that the profile entry may be based at least in part on sensor data from the integrated sensor assembly.

In one aspect, the server profile module may be further configured to extract the feature from sensor data obtained from the device.

BRIEF DESCRIPTION OF THE DRAWINGS

FIG. 11 is a schematic diagram showing an exemplary structure of a user profile with entry data, according to an embodiment.

FIG. 25 is a schematic diagram showing the effect of privacy data on an exchangeable profile, according to an embodiment.

DETAILED DESCRIPTION

Figure 1:
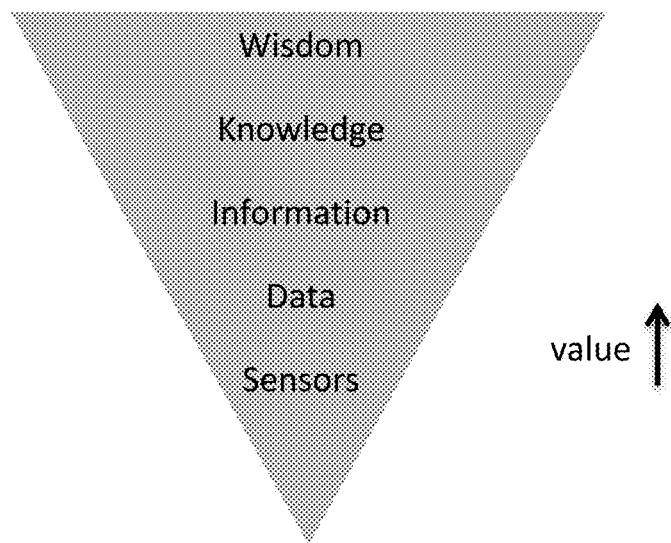
FIG. 1 is schematic diagram relating data and information to value, according to an embodiment.
Figure 2:
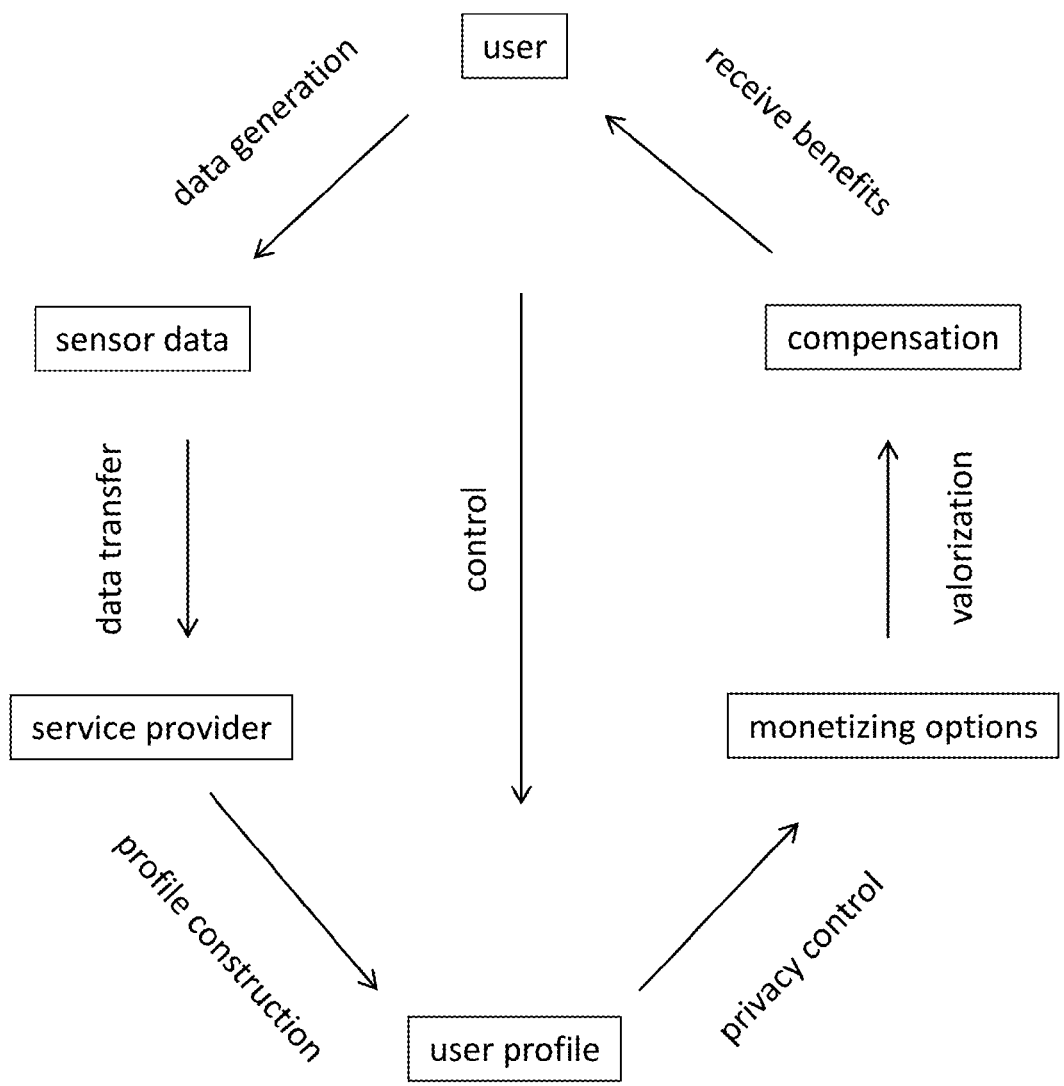
FIG. 2 is a schematic diagram showing data flow and compensation in relation to a user profile, according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. One example of such structures may be a neural network structure. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

Definitions

Figure 3:
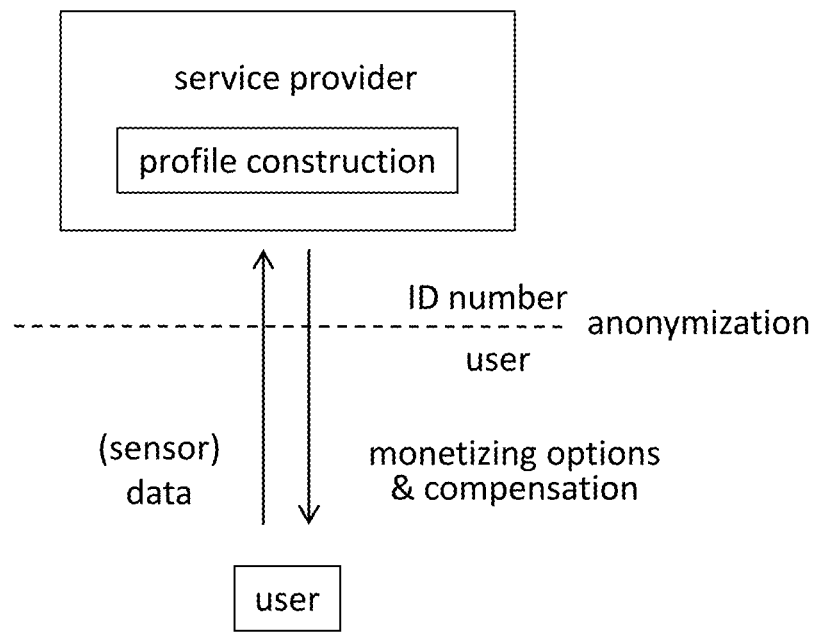
FIG. 3 is a schematic diagram showing the relationship between a user and a service provider, according to an embodiment.

User—The user is the person or moral person that the user profile refers to, meaning that the profile and its profiles entries somehow relate or corresponds to the user. The user may subscribe to the services of the service provider for the generation and construction of the user profile. The service provider will be referred to as SP for the remainder of this document. The user provides sensor data to the SP, who then constructs the profile for the user and provides the user with compensation, such as monetizing options or monetary benefit (FIG. 3). The user may stay anonymous to the SP and may be identified by a simple user ID (number) or a user name. If the user would like to stay anonymous, the SP must ensure that the user's identity cannot be reconstructed based on the data the user provided.

The user may be a single person, providing the SP with his or her personal (sensor) data. Hie user may be a group of people, or represent a group of people. For example, a user may be the father or mother of a household, who represents the whole family, which may include kids or even pets. In another example, the user may be a doctor or a nurse, representing a group of patients. In a further example, the user may be a farmer, representing his livestock, which is equipped with sensors for e.g. health or productivity monitoring. Generally speaking, the user is the entity that represents and owns/generates a collection of data and the profiles constructed from this data.

Figure 4:
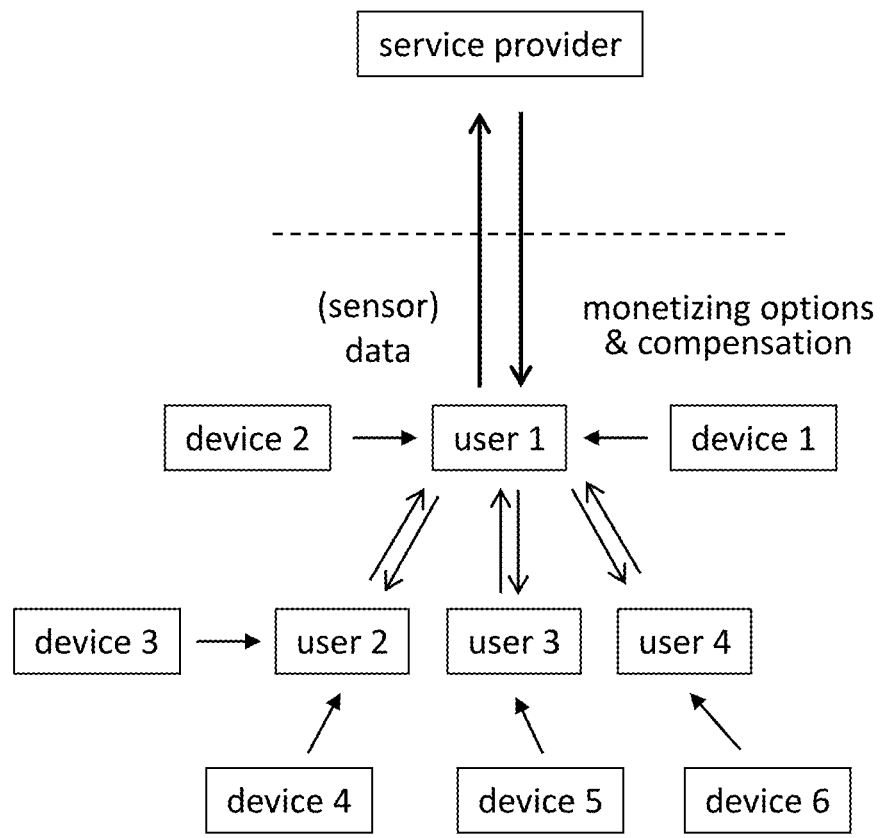
FIG. 4 is a schematic diagram showing providing sensor data from a plurality of users and a plurality of devices, according to an embodiment.

FIG. 4 shows an example of how one user may be in control of the data, profile, and compensation of a group of users. In this case, user 1 is the user in view of the SP because he or she is in control of the data transfer from the other users to the SP, and any potential compensation from the SP towards the other users. This user may have control over the profile generation and the profile settings, such as e.g. the privacy data and settings, of the other users. Some data or compensation may also be directly exchanged between the other/secondary users and the SP, but this exchange may be setup under the control of the primary user.

Service Provider—The service provider is the person or entity that controls and coordinates the service provided to the user. The SP constructs a user profile based on the provided data, and then arranges compensation such as monetizing options for the user based on the profile. The monetizing option may be e.g. in the form of a specialized offer or discount to purchase a particular product or service from a vendor. The SP builds and maintains a list or database of third parties (e.g. vendors) that may provide monetization options for the users that are subscribed to the service.

Figure 5:
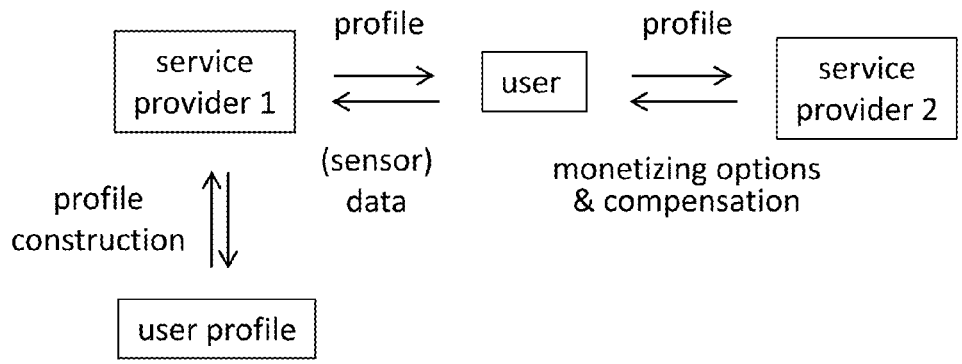
FIG. 5 is a schematic diagram showing one relationship between multiple service providers, according to an embodiment.
Figure 6:
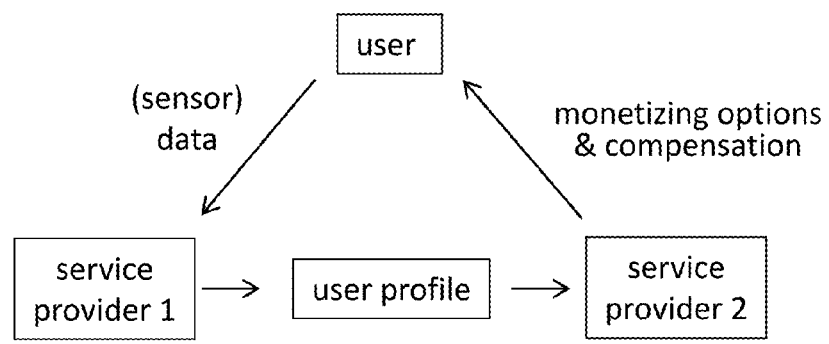
FIG. 6 is a schematic diagram showing another relationship between multiple service providers, according to an embodiment.

In exchange for providing his or her sensor data, the user obtains two services: 1) the creation of a user profile, and 2) the possibility to obtain some form of compensation, for example through the use of monetizing options. Both services may be provided by the same service provider. However, the services may also be separated and provided by different service providers. In this case, a first service provider receives the user data and constructs a user profile that is transferred to the user. The user may then propose this profile to a second service provider who then will look for monetization options for the user based on the profile (FIG. 5). Alternatively, the first SP who constructs the user profile may transfer the profile to the second SP who arranges the monetizing options (FIG. 6).

The service provider may function as a local service, a remote service, or a combination of the two. For example, the SP may operate a cloud based server, and the user transmits the sensor data to this server, where the user profile is generated. The generated or update profile information may then be transmitted to the user. In embodiments, where such a remote service is used, the SP may be referred to as a remote SP. Alternatively, the service provider may be in the form of a local service, such as one or more applications running on a device associated with the user. In this example, the SP will create e.g. a software solution or application that the user may install on one of his or her devices. This software will then receive the sensor data as an input and construct the profile. In this case, the software or application represents the SP. In such embodiments, the SP may be referred to as a local SP (in the form of software or applications). In some embodiments, a combination of remote and local service components may exist, where some processing is performed locally by the software provided by the SP, and some processing may be performed remotely on the SP's servers.

Figure 7:
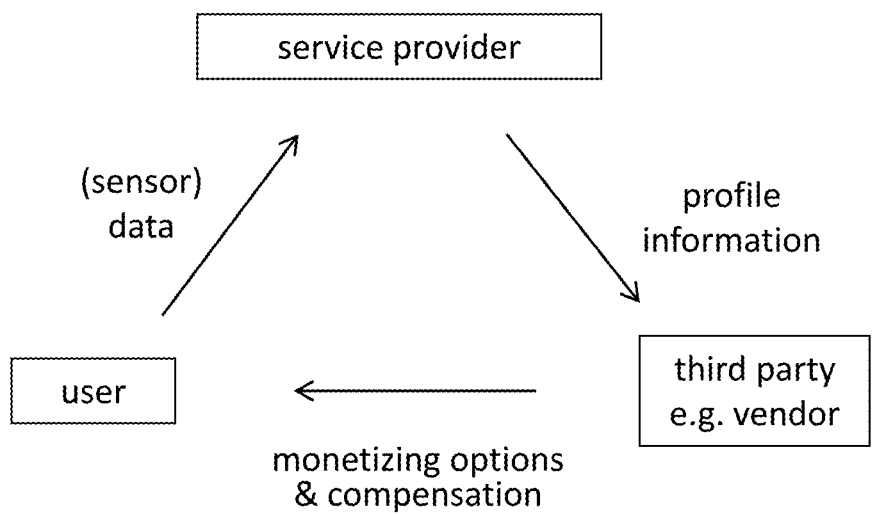
FIG. 7 is a schematic diagram showing relationships between a user, a service providers and a third party, according to an embodiment.

Vendor—The vendor is a third party, such as the person or entity that may provide the user with compensation based on the profile information provided to the vendor by the SP. For example, the vendor may be a shop or a person that proposes a personalized offer or discount based on the profile information. Intermediate stages may exist between the actual vendor and the SP. These intermediate stages may be companies such as e.g. campaign managers or computer platforms such as e.g. Real Time Bidding servers. In these cases, the term Vendor will apply to these latter brokers acting as an interface to the actual vendor. The triangular relation between the user, the SP, and the vendor/third part is shown in FIG. 7. The user provides data to the SP, which then converts the data into a user profile. The SP provides information to the vendor about the user based on the profile, and then the vendor in return provides a compensation such as a monetizing option to the user. The information may help the vendor provide the best possible service to the user based on the profile. This information may contain information relating to the potential revenue the user, or any of his or her connections, may bring to the vendor. The term vendor or third party will be used throughout this document to indicate the person or entity that provides the user with some sort of compensation, monetizing options or monetary benefit or reward. The vendor may of course be a shop, store, service provider, etc. where the user can obtain some sort of monetary benefit. The vendor may also be some sort of (official) organization. For example, a (local) government may arrange energy subsidies to a user in exchange for information and insight into his or her energy usage.

The vendor subscribes to the service of the SP, and provides the SP with information about the vendor, for example in the form of a vendor profile which describes the services or goods the vendor has to offer. By subscribing to the service, the SP will put the vendor in contact with selected users. The SP may help the vendor construct the vendor profile by providing tools or typical example profiles. The SP may also provide the vendor insight into vendor profiles of the vendor's competitors in order to help construct the vendor profile. The vendor may also provide the SP with a profile of a desired customer, which will help the SP target the correct users. The SP may help the vendor construct the desired user profile based for example on past transactions in the vendor's domain or with the vendor's competitors. Based on the information that is provided by the vendors, the SP builds and maintains a database of vendors that may provide monetization options for the users.

The user may stay anonymous to the vendors. Alternatively, (part of) the identity of the user may be revealed to the vendor, for example when using a monetizing option in the form of a discount on a purchase, for identification purposes. In some embodiments, no elements of the identity of the user will be revealed until he/she accepts the offer.

Data—A profile is built from data provided by the user to the SP. This data may be any kind of information that is provided about the user, the user's actions, the user's behavior, the user's preferences etc. This data may be entered manually by the user, but may also come from other sources from the users 'online life' or the user's 'offline life'. The online-data contains all data or information from the user's online usage, such e.g. his or her internet usage or emails. The off-line data contains all data or information not related to the user's online usage that may be captured by some sort of sensor. The off-line data may therefore also be referred to as sensor data. The sensor data may relate to the user itself, but also to his or her environment (e.g. house) or objects he or she uses (e.g. car). The sensor data may be obtained by associating a device having an integrated sensor assembly including at least one sensor with the user. A device may be associated to a single user, or a group or plurality of users, which means that the provided sensor data may be used for a plurality of profiles.

In general, any type of data or information that may be used to construct the user's profile should be considered. In this sense, any payment information from the user, such as e.g. credit cards or bills, may help in constructing a profile because the products a user buys reveal quite some information about the user. Data, and sensor data in particular, will be discussed in detail below.

Profile and profile entries—Based on the data the user provides to the SP, the SP constructs a profile. A profile is a collection of statements, facts, descriptions of the profile owner's characteristics, habits, past actions etc. Each item of the profile is referred to as a profile entry. Notably, at least one profile entry may be dependent on sensor data. In other words, the profile represents a digital description of the user, while keeping the user anonymous. The purpose of the user profile is to be able to describe the user anonymously to vendors and third parties that may potentially provide personalized monetizing options to the user.

Figure 8:
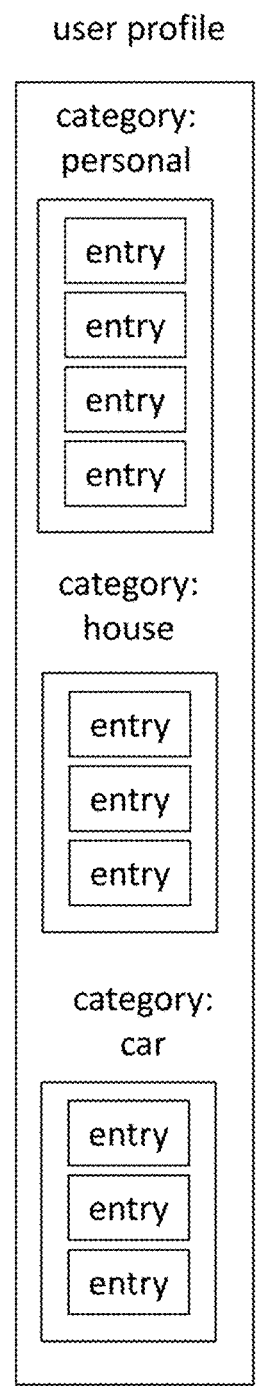
FIG. 8 is a schematic diagram showing an exemplary structure of a user profile, according to an embodiment.
Figure 9:
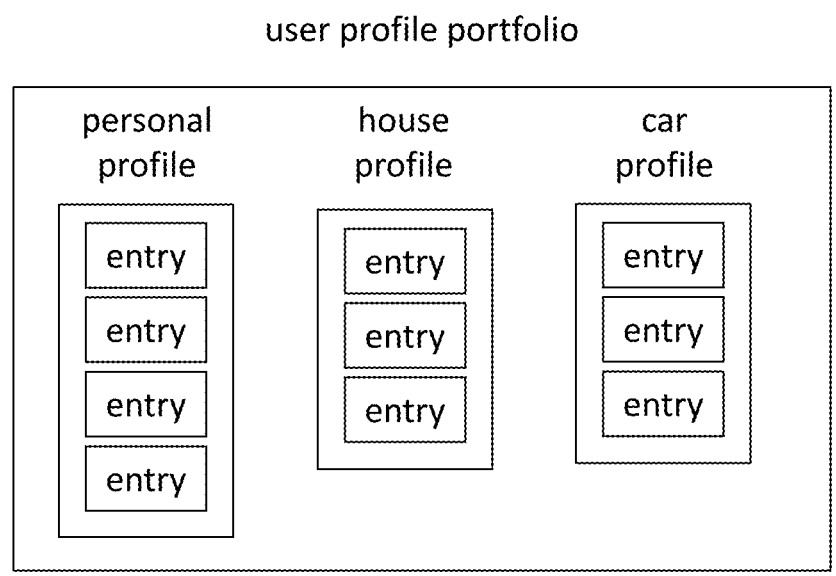
FIG. 9 is a schematic diagram showing an exemplary structure of a user profile with each category configured as a profile, according to an embodiment.

The profile may be organized in any suitable way, such as e.g. a tree like structure that helps give an overview of the relations between the different profile entries. The profile entries may relate directly to the user, but may also be related to e.g. the user's house or car. These different profile types or profile categories will be discussed in detail further below. FIG. 8 shows an example user profile structure where the profile is divided into different categories, each with its entries. FIG. 9 shows an example structure where each category may be considered a profile by itself, and the collection of profiles may be referred to as the user's profile portfolio. The contents of the profile entries, i.e. the information contained in the profile entries, may be referred to as the entry data. The entry data may be in any form, for example in the form of simple text, or in the form of contain raw or processed sensor data.

Figure 10:
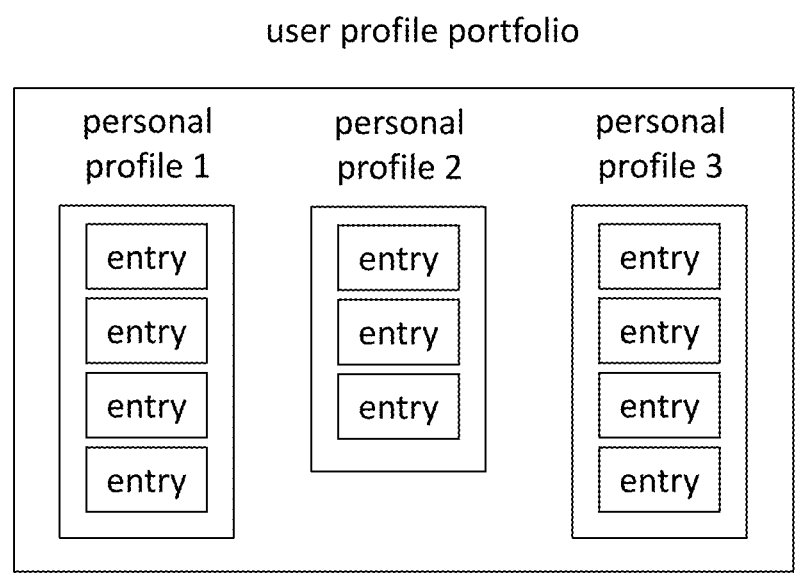
FIG. 10 is a schematic diagram showing multiple profiles associated with a user, according to an embodiment.

The profile represents the description of the user that he or she is willing to show to the third party. In addition, the profile may contain credentials or other information needed for accessing services of third parties if needed. The user may want to be represented by a different (personal) profile when dealing or in contact with different third parties. Therefore, the user may have a plurality of (personal) profiles with different entries describing the user, as shown in FIG. 10. The different profiles may have profiles and entries in common, which may be of a different level of detail. The third parties may be for example vendors, online vendors or brick-and mortar vendors, but they may be any entity that the user is in contact with and where some (profile) information is revealed. For example, the user may use different entities for online purchases, internet browsing, or using applications. The different profiles may represent certain categories, such as e.g. sport or finance, and the corresponding profile is selected depending on the third party in question. For example, the use may connect to a sport application using a first profile, connect to a music application using a second profile, and connect to a social networking application using a third profile. Different applications may be group together to use the same profile. The selection may be done manually by the user, where the user selects a certain profile or digital description from a list or group of graphical representations. The selection may also be done automatically by the SP, with or without informing the user. In this case, the SP may generate the corresponding sub-profile based on the principal or main profile. One advantage is that the user remains unknown to the third party, and that the third party only has access to the relevant information that the user is willing to share.

FIG. 11 shows an example profile structure with entry data and other information. The information may be available at different levels of detail. For example, the age of the user may be available as an age range (e.g. 30-40 years), or the exact age (35 years), or even the date of birth (e.g. Mar. 4, 1980). The details that are revealed to third parties, such as e.g. vendors, depend on the privacy settings of the user, which are discussed in detail below. The level of detail may also be synonymously referred to as the granularity or granularity level of the entry data, where a high granularity corresponds to a high level of detail and a low granularity corresponds to a low level of detail. A profile entry may contain entry data at a single granularity level, e.g. the highest possible granularity, or at different granularity levels, e.g. varying from a high to a low granularity.

The profile may also contain information about the connections of the user, such as his or her friends, family, acquaintances, work relations etc. If the connection also subscribes to the service of the SP, the profile entry for the connection may simply be the reference number or name for the SP. A user, may indicate which profile entries may be shared through his or her connections, and at which level of detail. These settings may be comprised within the privacy data of the user. If the connection has not subscribed to the service of the SP, the profile entry for the connection may contain some actual profile entries with information about the connections, for example things in common with the user, how often do the user and connection meet, etc. Accordingly, the user is connected to at least one second user. The user profile may contain profile entries concerning the at least one second user.

The profile of the user may be considered an asset that has been built from the user's data, using the devices associated with the user. The user may manage and protect the profile as an asset. The value of this asset can be obtained through the compensation and monetizing options. The value of a profile is discussed in detail below in a dedicated section on the value of data and profiles.

Figure 12:
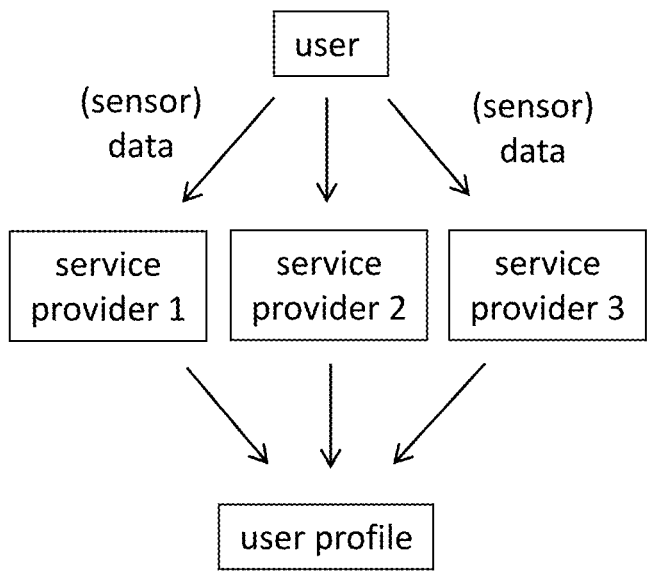
FIG. 12 is a schematic diagram showing one profile construction structure by multiple service providers, according to an embodiment.
Figure 13:
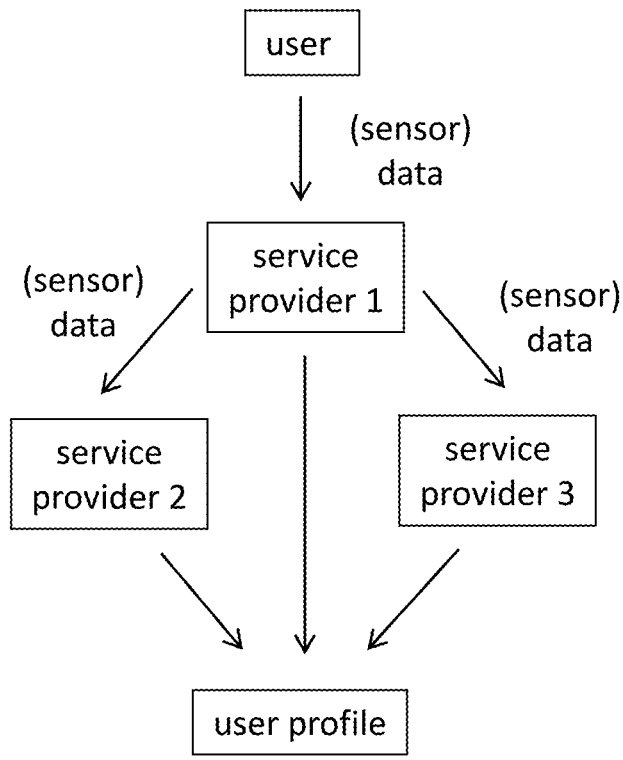
FIG. 13 is a schematic diagram showing another profile construction structure by multiple service providers, according to an embodiment.

The profile may be constructed by a single SP, which means that the user sends all of his or her data to the one SP. Alternatively, the profile may be constructed by several SPs. In this case, the user may send all the data to all the SPs, or may send selected data to certain SPs (FIG. 12). For example, the user may send motion data to an SP specialized in motion processing, and another SP, such as e.g. as bank, may handle the financial data. Coordination is required to determine which SP does what, and to resolve any conflicts. This coordination may be done by the user or a chosen SP. In an embodiment, one central SP may receive all the data, and may forward some selected data to other SPs that may specialize in processing the data (FIG. 13). In this case, the primary SP does all the coordination.

Figure 14:
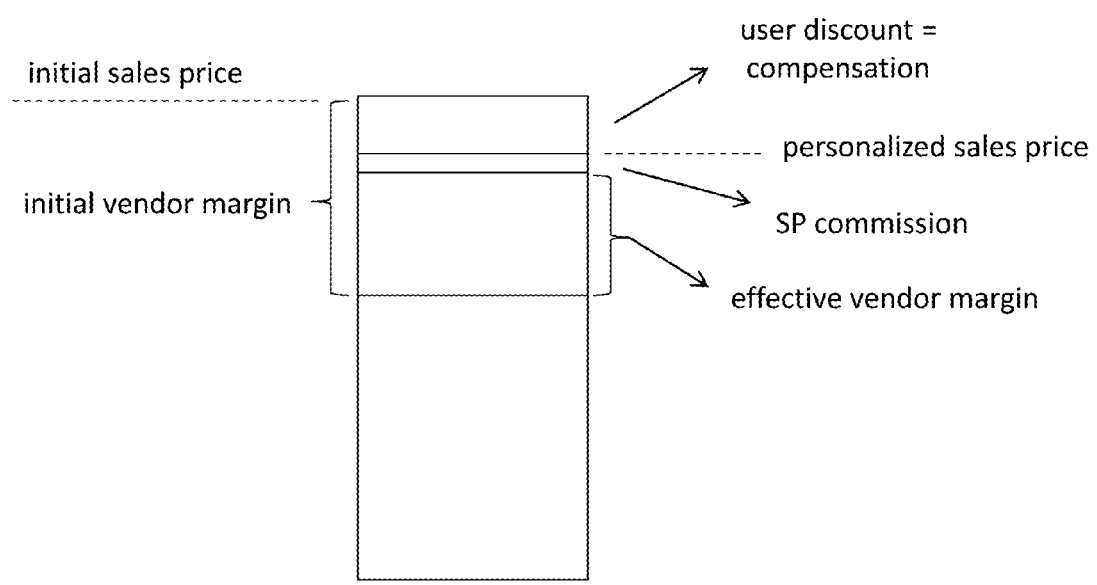
FIG. 14 is a schematic diagram showing the effect of compensation on vendor margin, according to an embodiment.

Compensation and monetizing options-Based on the constructed profile, the SP may be able to generate and arrange some sort of compensation, for example in the form of monetizing options, for the user. The term monetizing option refers to any financial benefit that the user may obtain based on the profile. The terms compensation and monetizing option may be used interchangeably. For example, if the user would like to purchase a certain object, the SP may find a third party or vendor that is willing to give the user a personalized discount for that object, based on the profile information the SP provided to the vendor. This opportunity to buy the object for the personalized price is considered the monetizing option. The amount of the discount may be referred to as the compensation (FIG. 14). The more information from the profile the SP is able to provide to some vendors, the more the vendors may be willing to provide a discount. The wider the coverage of the profile, the more the user can benefit for the purchase of different objects, goods, or services. The SP builds and maintains a list or database of vendors and third parties that may provide compensation options for the users that are subscribed to the service. The larger the vendor database, the more options the SP can provides to the collection of users.

Figure 15:
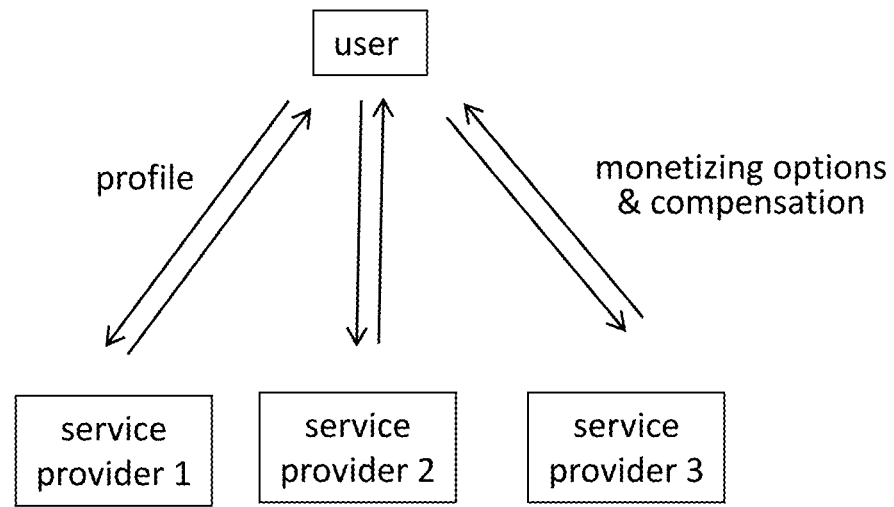
FIG. 15 is a schematic diagram showing creation of monetization options, according to an embodiment.
Figure 16:
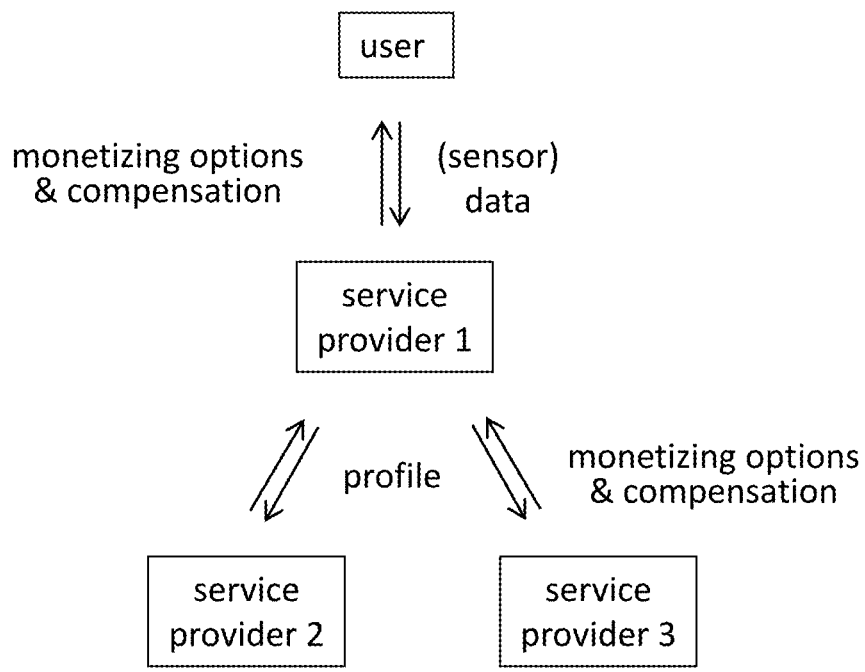
FIG. 16 is a schematic diagram showing coordination of service providers in creating monetization options, according to an embodiment.

The monetizing options may be provided by a single SP. This means that the SP manages the profile as an asset for the user and tries to maximize the monetizing options and monetary benefit for the user. Similar to the construction of the profile by several SPs in FIGS. 12 and 13, the monetizing options may also be created by several SPs. In one example, the user may transfer the profile to each SP, and the SP will try to obtain the best monetizing options for the user (FIG. 15). An SP may be specialized in a certain field, and the user may only send the SP the relevant part of the profile. The user may select the relevant SP manually, or the selection may be done automatically by software or an application running in the device associated with the user. In some embodiments, the SP may also be in competition to provide the best compensation. In this case, the information is provided to the plurality of competing SPs. All the SPs will transfer the obtained monetizing options to the user, who must then coordinate the different offers. The SPs may have contributed to the profile construction. In another embodiment, one central SP will handle the communication with the user, but this SP may use the services of other (specialized) SPs to create the monetizing options (FIG. 16). The central SP will make sure that these SPs receive the relevant profile information. The central SP will do the coordination of the different monetizing options.

Figure 17:
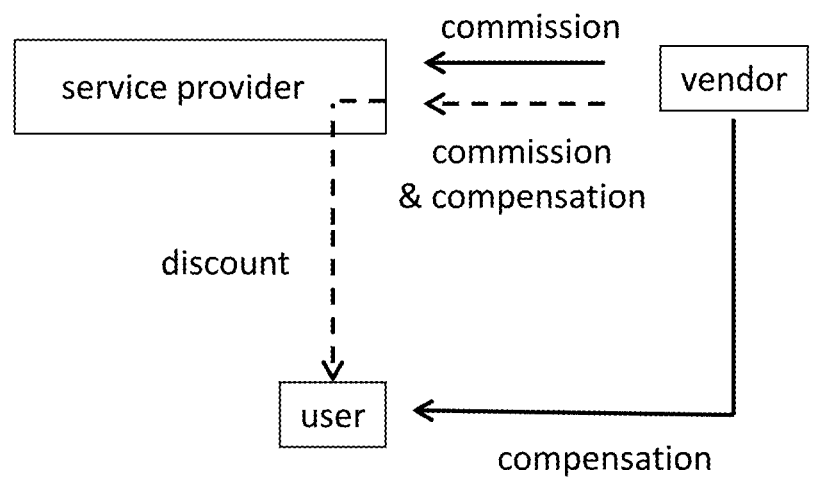
FIG. 17 is a schematic diagram showing compensation of the user and service provider, according to an embodiment.

When the user takes advantage of a monetizing option and purchases an object or service at a personalized price, the SP may also be rewarded since the SP provided a monetization options for the user and enabled the vendor to make a sale (FIG. 17). The reward to the SP may also be considered a fee or commission that has to be provided to the SP, either by the vendor or the user. For the remainder of this document we will refer to the reward for the SP as the SP commission(s). The user compensation or discount may be applied directly by the third party or vendor, so the user pays a reduced price. In this case, the vendor transfers the SP commission to the SP (solid arrows in figure). The SP commissions may be transferred immediately, or at predetermined times, e.g. once a month. Alternatively, the user discount may be transferred to the user by the SP. In this case, the user initially pays the full price, and the vendor transfers the user's discount and the SP commission to the SP. The SP then transfers the user discount to the user in the form of e.g. money (dashed arrows in figure). This transfer may be immediate, or at a later time. The latter strategy has the advantage that the user sees the value of the sensor data as the money that is transferred by the SP.

Sensor Data

Definition—Sensor data is data that can be detected by electronic devices. Any sensor that measures any type of physical, chemical or biological parameter or quantity may be used. A device having an integrated sensor assembly including at least one sensor may be associated with the user to obtain sensor data. The terms sensor and sensor assembly may be used interchangeably. Example sensors may include accelerometer, gyrometer, magnetometer, pressure sensor, temperature sensor, location sensor (e.g. Global Positioning System (GPS)), microphone, light sensor, biometric sensor, humidity sensor, gas sensor, etc. The sensors may be MEMS sensors or any other type of sensor technology. The sensor data that is provided to the SP may be raw signals from a sensor, or maybe be preprocessed or transformed by the device with the integrated sensor assembly or any other device.

Figure 18:
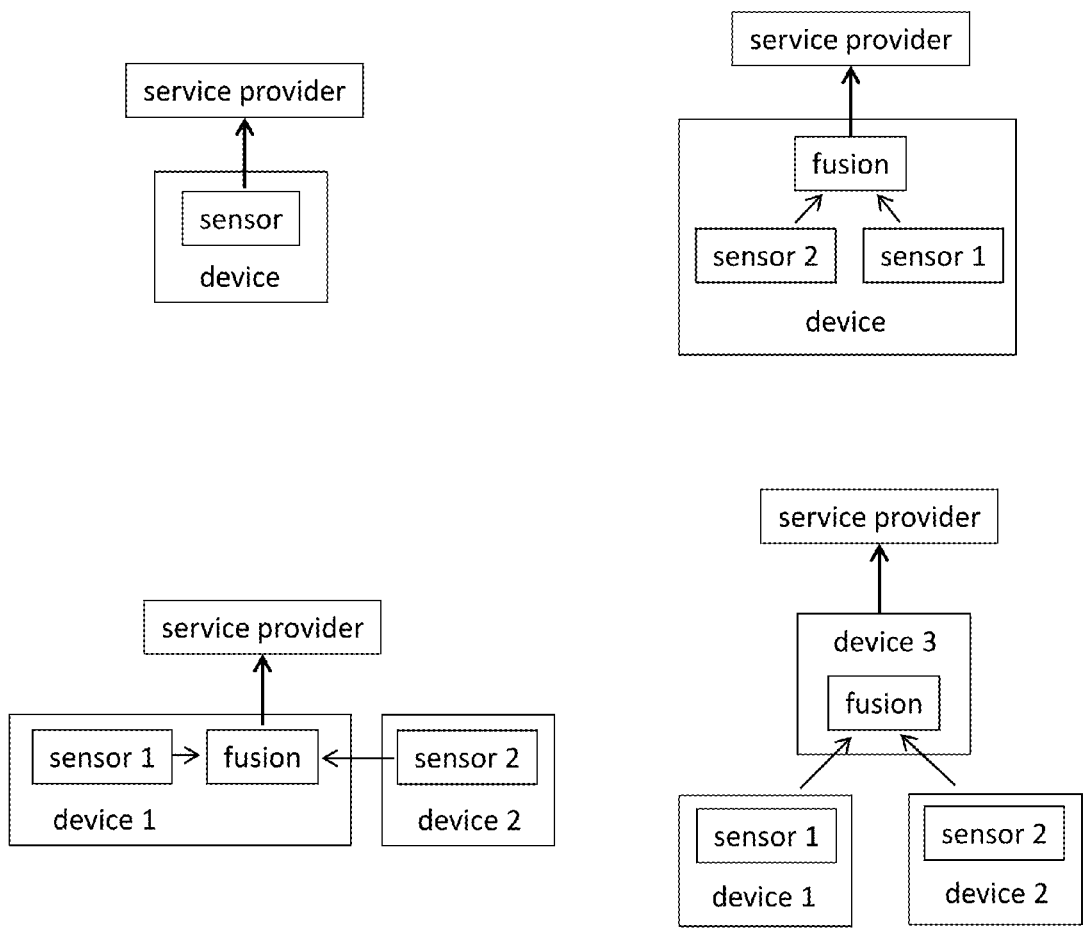
FIG. 18 is a schematic diagram showing fusion of sensor data, according to an embodiment.

The sensor data may come from a single sensor, or the data may be based on sensor fusion from a plurality of sensors. The sensors may be integrated together in the sensor assembly, or may be distributed over different assemblies. The fusion may concern different sensors from one device, or a plurality of sensors from different devices. FIG. 18 shows different examples of fusion using a plurality of sensors and devices.

A sensor does not need to be a sensor in the conventional term of the word where the sensor measures any type of physical, chemical or biological signal. A sensor may not be designed to sense anything in particular. In one example, an electronic toothbrush may be considered a sensor by just knowing if the tooth brush was on or off, because this 'senses' if the user is brushing his or her teeth.

In another example, a credit card reader may be considered a sensor because it detects how much a user pays for what product, and where and when. More in general, any data that is detected, when the user makes a payment may be used.

Any sensor, sensor assembly, device, apparatus, machine, tool, appliance, etc. that provides any type of data or information may further be referred to as a Data Collection Object (DCO). The data collected by the DCO relates to a Data Collection Event (DCE). A single event may be covered by several DCOs. For example, a user going for a run (DCE) may be covered by a GPS (DCO 1) and an activity bracelet (DCO2).

The sensor data may represent processed sensor data. For, example, the number of steps the user has taken, the activity the user is performing, the number of heart beats per minute, etc. The data may come directly from the device, or may have already been processed by other services such as runkeeper, fitbit, etc. In this case, the user would help the SP get access to the sensor data that may be stored elsewhere. In this case, the service that preprocesses the data and outputs the processed data may be considered a DCO. This means that any services that provide data or information about the user that can be used to deduce the users profile may be considered a DCO. For example, any-account from services runkeeper, fitbit, facebook, linked, etc that can provide data relating to the user to the SP may be considered as a DCO. This also means that, for example, a bank that processing the payment data of the user, and provides an overview of the payments and products purchases, can also be considered a DCO.

The sensor data may come from a plurality of devices such as a smart phone, a watch or bracelet, an electronic sport device (e.g. tennis racket), connected scale, home automation system, connected car . . . .

The sensor data may be directly related to the user, but may also be indirectly related to the user. For example, the sensor data may be related to the user's house such as e.g. room temperature, energy usage, lights functioning. Alternatively, the sensor data may be related to the user's car, such as, average gas mileage, engine temperature, tire pressure . . . . The sensor data may be categorized to represent these different categories (personal, house, car . . . ). The category may be detected automatically based at least on, for example, one of the sensor data itself, the sensor type, the channel of providing the sensor data, etc. Any object that the user owns, and that has properties of interest that can be measured, may produce some sort of (sensor) data.

The sensor data may be annotated, which means the sensor data is accompanied by information describing the sensor data. The annotation may be done by a single user, or a crowd of users. An example of such annotation is described in U.S. patent application Ser. No. 14/909,961, filed Feb. 3, 2016, entitled "Method, Device and System for Annotated Capture of Sensor Data and Crowd Modelling of Activities," which is hereby incorporated by reference in its entirety. The sensor data may be annotated automatically, e.g. using other sensors. For example, when a user is walking or running, the sensor data from his or her activity monitoring bracelet may be combined with the sensor data from the GPS indicating the trajectory, distance or speed. In this case, the GPS data is considered the annotated part of the data because it helps determine the relation between the motion signals from the activity bracelet and the actual distance the user runs. The sensor data may be annotated manually by the user. For example, a user playing tennis with his electronic racket, may provide the sensor data from the racket, and may also indicate which type of tennis swing he or she was performing (backhand, forehand, service, . . . ). The annotation may take place at the initiative of the user, or upon request by the SP. The annotation may be in the written, audio, or video form. Any form of data or information accompanying the sensor data in order to gain more insight into the meaning of the data may be considered an annotation.

When the user performs an annotating, the user provides additional data/information. This data originates from the senses of the user, and thus may also be considered as sensor data of some sort. The 'sensor data' from the user's senses is processes by the user's brain, and then transferred to the SP when the user performs the annotation.

Following this reasoning, we consider the observations of the user also sensor data. This human sensor data may relate to something that the user observes, such as the type of tennis swings mentioned above. Alternatively, the sensor data may relate to the user himself. For example, the user may sense that he or she is, cold, warm, tired, happy, sad, feeling good, . . . . This human sensor data may also relate to a product or service the user has experienced, and may extend to preferences or tastes. For example, the user may fill in a questionnaire regarding a product or a service, maybe on request of the SP or a vendor.

The sensor data may be provided on a contract basis. For example, the user may get a special discount or other benefits on a product that is capable of providing sensor data, if the user engages to provide the SP (or the manufacturer) with the produced sensor data. The contract may be with the SP directly, or the contract may be with the vendor or manufacturer, who then has the data contract with the SP. For example, the user may buy a car, and will get special benefits in the form of a discount, a special service, free special features, if the user is willing to share at least some of the sensor data produced by the car with the SP and the manufacturer.

Providing Sensor Data—The method of transmitting the sensor data from the user to a remote SP depends on the sensors and on the device that incorporates the sensors or sensor assembly. For example, if the sensor data originates from sensors that are incorporated in a (mobile) device with wireless communication means capable of communicating with the SP, the sensor data may be sent directly from the device itself. The SP would provide the user with a tool or application to anonymize the data and transfer the sensor data to the SP, accompanied by an anonymous user ID. This may be the case, for example, for sensors in a smartphone, or device in direct communication with a smartphone. In the case of a local SP, the sensor data is transmitted to the device running the SP software or application. This device may be one of the users mobile devices, such as e.g. the user's smartphone, or one of the user's non-mobile devices, such as e.g. the user's home server. Furthermore, the device may be able to communicate with the actual (remote) SP that has provided the software or application, for example for updates or shared processing.

Some sensors may be in devices that only have short range communication, such as e.g. blue tooth communication. In this case, the sensor device may be in communication with a mobile device, such as e.g. a smartphone, capable of communicating with the remote SP, or doing the processing itself if this device is acting as the local SP. The mobile device may transmit the sensor data from the other (wearable) sensor devices on or in close proximity to the user and in communication with the mobile device. The wearable device may transmit raw data to the mobile device, or may perform some sort of processing before sending the sensor data. The mobile phone may also process sensor data from one or more other devices before transmitting the data to the remote SP.

If the sensor device is a portable device without any means of wireless communication, the user would have to manually transfer the sensor data to another device capable of transferring the sensor data.

Sensor data that is indirectly linked to the user, such as data from sensors related to objects like the house or the car, may be sent directly to the remote SP if a means of communication with the SP is present. In this case, the house or car, may have local processing capabilities that gathers the information from the relevant sensors and then transmits the sensor data to the SP with some identification method to link the data to a user. The SP may provide a tool to integrate with these devices or sensors in order to anonymize the data and associate the data with the user. The object's sensors may also send the data to another of the user's device, such as e.g. the smartphone, which then takes care of the required communication with the remote SP. Similarly, in the case of a local SP, the sensor data will be send to the appropriate device.

The user may provide the sensor data directly, or the sensor data may be provided by a third party. For example, the user may upload the sensor data from his or her activity bracelet to a third party like Fitbit or Runkeeper. The third party may process the sensor data and provide activity reports to the user. The user may then grant access to the information to the service provider, for example, by registering the third parties with the SP and providing access to the information. Alternatively, a SP may have direct access to the data at third party with the permission of the user and in collaboration with the third party.

The sensor data for a certain user may under limited circumstance also come from another user. For example, a device having an integrated sensor assembly may be associated with a plurality of users, so that a profile may be constructed for each of the plurality of users, each having at least one profile entry based at least in part on sensor data from the integrated sensor assembly. As an illustration, a user may go running with a friend, and the friend may be able to provide additional sensor data from a device that the user may not have, such as e.g. a GPS. In this case, the information about the trajectory may be used by both users. This may be done by the friend directly transferring the sensor data to the user, or the friend and user may inform the SP that that particular sensor data applies to both users, and should be copied from one user to the other. The copied sensor data may contribute with a lesser weight to the status of the user since the data did not originated from his or her sensors. Care must be taken by the SP to avoid fraudulent copying practices, for example by detecting multiples of the same data sets.

The sensor data may be produced in a device capable of transmitting the data immediately to the SP. The user may decide to transfer the data online or live, but this may come to additional costs to the user. The SP may also make an agreement with phone carriers or network operators (further referred to as carrier) to get a special rate or special conditions to send the sensor data outside peak hours. The carrier may receive a commission depending on the transactions. In this case, the user may store, and maybe compress, the sensor data until outside the peak hours. The peak hours maybe preset times, or may be decided by the carrier in a flexible way. The carrier may have direct control on when the sensor data is send (with approval of the SP and the user).

In any case, whatever method is used to send the sensor data to the SP, the sensor data may be anonymized and accompanied by a user ID. The sensor data should have a meaning, and not be just a series of zeros and ones. This means that the SP needs to know, e.g. what the data referrers to, what units the data is in, what sensor was used, . . . . This type of information may come from a file header, or may be sent in parallel to the sensor data.

Sensor Profiles—A user may have plurality of sensors or sensor assemblies that are able to provide sensor data. Each sensor will have certain settings, which may depend e.g. on the application/activity requesting the data, on the context, or on the power saving mode. The collection of sensor settings for the different sensors and their various dependencies may be referred to as a sensor profile or sensor configuration. A device having an integrated sensor assembly associated with the user may be operated according to a desired configuration to obtain sensor data. A sensor profile may comprise the sensors from different devices. The terms sensor configuration and sensor profile may be used interchangeably.

Each sensor profile will result in a certain combination of sensor signals being generated. These sensor profiles may be set manually by the user. Alternatively, the SP may set the sensor profile, or may propose an optimum sensor profile to the user. The SP may adapt the sensor profile as a function of the privacy data, including privacy settings of the user, so that the sensor assembly is operated under a different or modified sensor configuration. The SP may also adapt the sensor profile as a function of the user profile or the profile entry that the SP is looking to detect, complete, or verify, so that a configuration based at least in part on the entry data required for a profile entry may be determined and the sensor assembly may then be operated according to that sensor configuration. The sensor profile may also be optimized for power efficiency or for a maximum of profile construction. Based on analysis of the profile construction for other users, the sensor profile may be optimized for a maximum value or compensation to power ratio; obtain the highest possible value/compensation of the user profile with a sensor profile that consumes the least battery and processing power. The sensor profile may be dynamic and change with any change is activity, behavior, etc. of the user. Still further, the sensor configuration may be related to a value or desired value that may be established for profile entries as described below. By operating the sensor assembly according to a different sensor configuration, the value of the profile entries may be varied as desired.

Sensor Encryption—The sensor data may be encrypted. The encryption may take place when the data is sent to a remote SP, and the SP may store the data encrypted. The SP's application running on the user's device that is sending the data may receive the data unencrypted from the sensors, and then encrypts the data before sending. This means that within the device the data is unencrypted. In some embodiments, homomorphic encryption may be used which enables computations to be carried out without decryption.

The sensor data may also be encrypted at a lower level. The sensor data may be encrypted directly at the sensor level, for example at the sensor processor, which may be incorporated with the actual sensor on a single chip or package. In this case, the sensor data is not useable within the device without having the decryption key or information.

Complete encryption of the sensor data at sensor level means that the data is encrypted for all programs, applications, etc. that may want to use the data. If the sensor or the device that contains the sensor only provides the data to the SP, the encryption at the sensor does not pose any problems. However, if other programs or applications are running on the device that contains the sensor, these programs or application may not be able to use the sensor data without being able to decrypt the data or have permission to use the data. For example, if the data is encrypted at sensor level in a smart phone, the phone's OS and application would not be able to use the sensor data. If the user is in control of the encryption settings, it means that the user is in control of which programs are able to use the data, without the OS being in the middle or intervening.

In one example embodiment, the sensor data may be partially encrypted at the sensor level. This means that the user is in control to what extent the sensor data is encrypted, and to what extend the data may be used by other programs or applications without knowing how to decrypt the data. For example, for a GPS sensor, the absolute GPS coordinates may stay encrypted, while the relative GPS coordinates may be unencrypted. Therefore, the relative coordinates may be used by any program or applications, which may be under the control of the OS, and the absolute coordinates may only be used under specific permission of the user. This kind of partial encryption may have a large influence on the privacy of the sensor data for the user. For example, when the user goes running from the place where he or she lives, and does not want to reveal his or her location but still would like to track the circuit he or she runs using the GPS. The user may decide that no program or service may use the absolute GPS coordinates, or the absolute GPS coordinates are encrypted at the sensor and may be transmitted to the SP who may use them for the profile information. Other programs or services, such as e.g. the OS, Runkeeper, etc., may then use the relative GPS coordinates.

In another example of partial encryption, an audio or video sensor may e.g. filter the voice or image of the user so that the user becomes unrecognizable. The image from a video sensor may be analyzed to describe the 'scene' in the image, without actually revealing the image. This unencrypted information may then be used, while the raw audio and video signals may be encrypted, and send to the SP. As such, the encrypted data may have a different level of detail or granularity level compared to the unencrypted data.

Any processing that is done at sensor level for any sensor may use a similar encryption technology, where the data that is processed to different level may have different levels of encryption. For example, motion and/or audio sensors may be used for context detection, but different levels of detail of the detected context may be encrypted differently. The context algorithms may be able to detect exactly what type of public transport the user is using such as e.g. bus, train, tram, metro, etc. However, the user may decide that the unencrypted information may just say 'public transportation', and that the details are encrypted.

Figure 19:
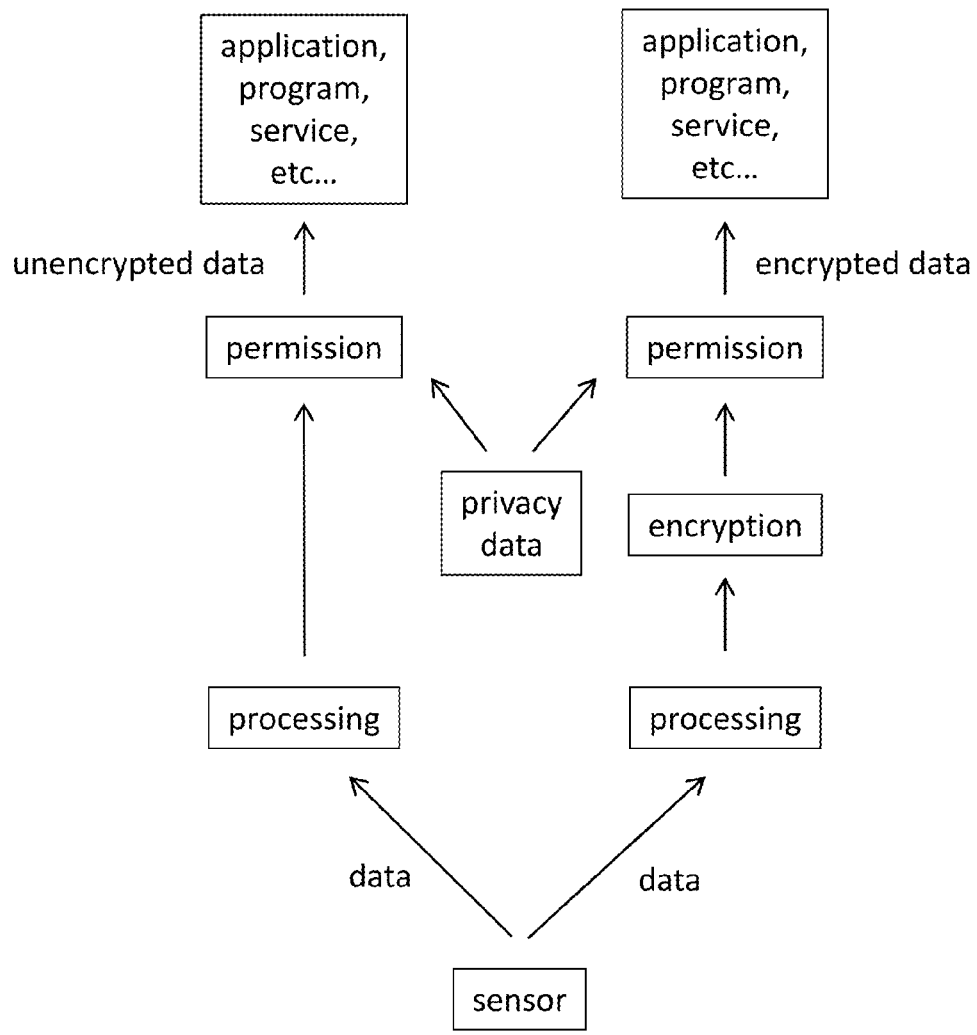
FIG. 19 is a schematic diagram showing partial encryption of sensor data, according to an embodiment.

FIG. 19 shows the data flow in the case of partial encryption. Starting from the sensor, the data may be processing differently depending on what type of information is encrypted and what information is not encrypted. The permissions to access the encrypted and unencrypted information is set depending on the user's privacy data and settings.

In conclusion, the user is in control to what level of detail the sensor data is encrypted. This control may be done directly in the (smart) sensor if the sensor is equipped with a processor capable of doing the encryption. The user must have control over the level of encryption, without the influence of the OS. This control may be provided by an application or tool provided by the SP or the sensor manufacturer.

User in Control—The user may be in complete control of his or her data. This means the user may remain the owner of the data, even if the data is stored at the SP. All the operations that are performed on the data may be transparent to the user. The SP may provide a tool or application so the user can have an overview of his or her data and the processing that is done on the data.

If the user is in control of the data, the user may also have the possibility to remove data e.g. if he or she thinks the data conflicts with his or her privacy ethics. The removal of data may have consequence for the profile entries. Any profile entry that is based on the data that the user has removed may have to be re-determined to reflect the removal of the data. In other words, the profile entry should be calculated as if the removed data never existed. This may have consequences on the value of the profile or the monetizing options that can be provided by the SP. When the user wants to delete the data, the user may be made aware of these consequences. The SP may tracks for which profile entry the data is used so that when that data is removed it is clear which profile entries should be re-determined. In conclusion, any change that the user makes to the data should be reflected on the profile, profile entries, profile value, etc.

Architecture Examples—A sensor unit may contain the sensor or sensor assembly which is connected via an internal communication bus to a sensor processor (e.g. MCU) and a sensor memory. The sensor unit may be integrated on a single chip or in a single package. This type of sensor unit may be referred to as a smart sensor because of the integrated processor. The sensor memory may be used for storing of data or algorithms needed for the processing of the sensor data. The sensor may provide the raw signals to the processor, which may do any kind of processing on the raw data, such e.g. calibration. If the encryption or anonymization is done at the sensor level, the sensor processor may perform this task using algorithms stored in the processor memory. A dedicated communication line may exist for directly setting up the encryption without e.g. the OS intervening.

The sensor unit is connected with a second communication bus to the other components of the device. Although not shown in the figure, other devices or sensors may also be connected to this bus, either wired or wireless. The device processor may process the sensor signals further, for example for encryption or anonymization if this has not yet been done in the sensor unit. The processor may also perform any type of fusion if more sensors or sensor units are available. The processor may also run any type of tools or application provided by the SP for the communication with the SP. These tools and/or application and the user's identification may be stored in the memory. The memory may store any algorithms required for these types of processing. The memory may also be used to store sensor data before transferring the data to the SP in case the data is not send directly. The communication module will transfer the data, by any means of wired or wireless communication protocol, to the SP after the optional anonymization and encryption processes.

The SP will receive the data and will process the data to construct the profile and the SP's server system equipped with processors, working memory, and storage systems such as e.g. hard disk arrays. The SP may start the processing immediately, or the SP may store the data in the memory and do the processing at a later lime. The algorithms and models may be stored in a memory or storage system. The SP may also store the user profile DB and vendor DB in the memory system, if the data is encrypted, the SP will decrypt the data before the processing, but may store an encrypted copy of the data for later use. The constructed profile may be stored encrypted or unencrypted. The data from a user may all be stored in one place, or may be spread over different storage system as a security measure.

Figure 20:
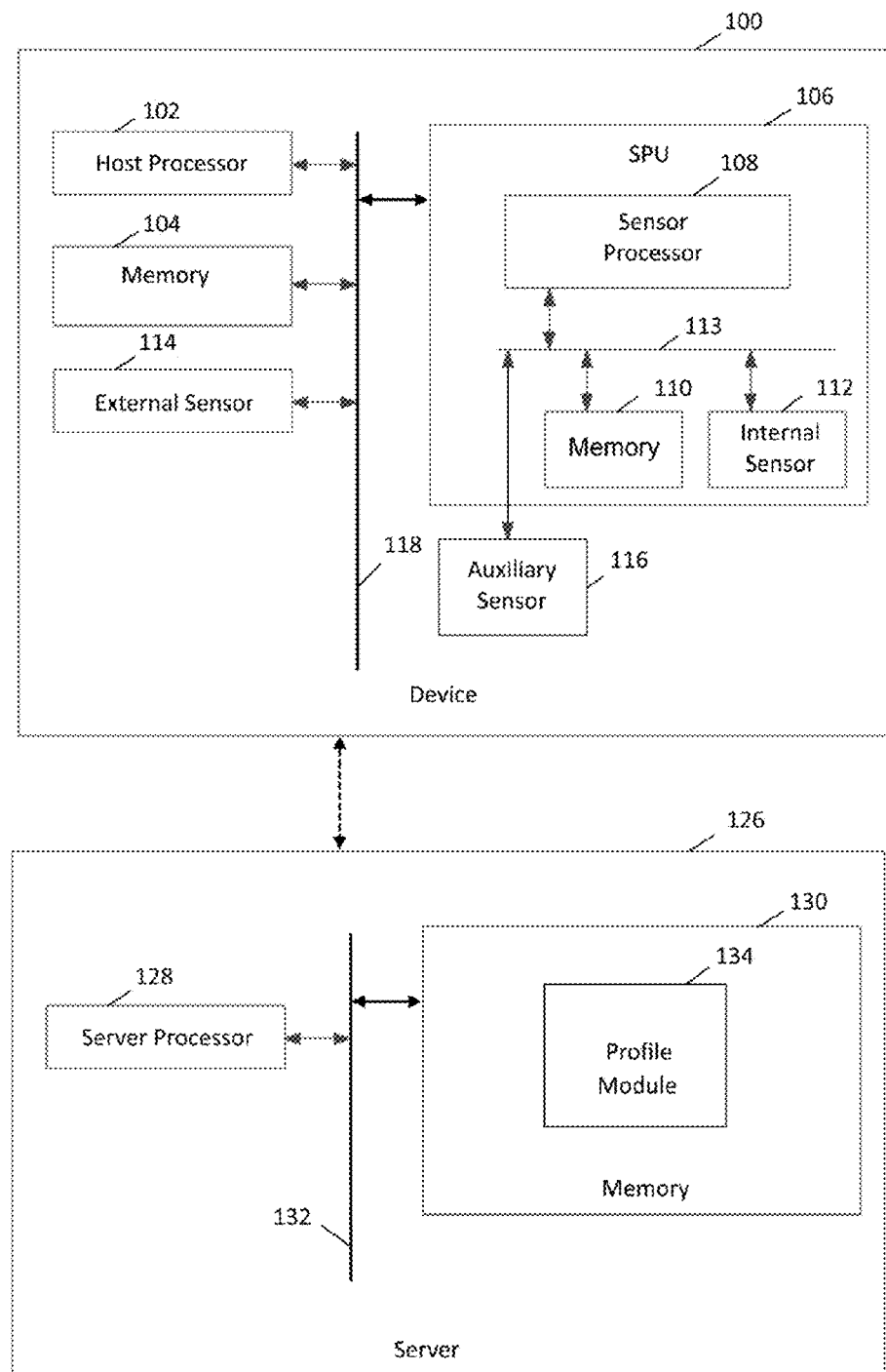
FIG. 20 is a schematic diagram of a system for constructing a user profile, according to an embodiment.

To help illustrate these aspects, a representative system for constructing a user profile is schematically depicted in FIG. 20, with device 100 represented by high level schematic blocks. As will be appreciated, device 100 may be implemented as a device or apparatus, such as a portable device or a handheld device that can be moved in space by a user and its motion, location and/or orientation in space therefore sensed. For example, such a portable device may be a mobile phone (e.g., smartphone, cellular phone, a phone running on a local network, or any other telephone handset), tablet, personal digital assistant (PDA), video game player, video game controller, navigation device, wearable device (e.g., glasses, watch, bell clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly, as shown here in the form of integrated sensor processing unit (SPU) 106 featuring sensor processor 108, memory 110 and internal sensor 112, which may communicate over sensor bus 113. The internal sensor 112 may represent a single sensor, or a sensor assembly containing a plurality of sensors. In some embodiments, the internal sensors may be inertial sensors, and the sensor processing unit 106 may also be referred to as a motion processing unit (MPU). Memory 110 may store algorithms, routines or other instructions for processing data output by internal sensor 112 and/or other sensors as described below using logic or controllers of sensor processor 108, as well as storing raw data and/or processed data from internal sensor 112 or other sensors. Internal sensor 112 may be one or more inertial sensors for measuring motion of device 100 in space. Correspondingly, the sensor data from internal sensor 112 represents motion of the device at a plurality of epochs from a first instant to a subsequent second instant. Depending on the configuration, SPU 106 measures one or more axes of rotation and/or one or more axes of acceleration of the device. In one embodiment, internal sensor 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 108, or other processing resources of device 100, combines data from internal sensor 112 to provide a six axis determination of motion. The analysis of the motion of the device may be used to derive information about the activities, gestures, context, and/or behavior of the user for the profile construction. As desired, internal sensor 112 may be implemented using Micro Electro Mechanical System (MEMS) to be integrated with SPU 106 in a single package. Exemplary details regarding suitable configurations of host processor 102 and MPU 106 may be found in co-pending, commonly owned U.S. patent application Ser. No. 11/774,488, filed Jul. 6, 2007, and Ser. No. 12/106,921, filed Apr. 11, 2008, which are hereby incorporated by reference in their entirety. Suitable implementations for SPU 106 in device 100 are available from InvenSensc, Inc. of Sunnyvale, Calif.

Alternatively or in addition, device 100 may implement a sensor assembly in the form of external sensor 114. This is optional and not required in all embodiments. Internal and/or external sensor may be any type of sensor that can measure any type of physical, chemical, environmental parameter that may be useful to deduce information about the activities, behaviors, etc. of the user and/or the user's environment. For example, the sensors may be accelerometers, gyroscopes, magnetometers, pressure sensors, proximity sensors, ambient light sensors, audio sensors, video sensors, location sensors, navigation sensors, biometric sensors, temperature sensors, gas or particle sensors, and moisture sensors, among other sensors. The sensor data from the different sensors may be combined in a fusion algorithm in order to deduce relevant information. As used herein, "external" means a sensor that is not integrated with SPU 106 and may be remote or local to device 100. Also alternatively or in addition, SPU 106 may receive data from an auxiliary sensor 116 configured to measure one or more aspects about the environment surrounding device 100. This is optional and not required in all embodiments. For example, a barometer and/or a magnetometer may be used to refine position determinations made using inertia) sensor 112. In one embodiment, auxiliary sensor 116 may include a magnetometer measuring along three orthogonal axes and output data to be fused with the gyroscope and accelerometer inertial sensor data to provide a nine axis determination of motion. In another embodiment, auxiliary sensor 116 may also include a barometer to provide an altitude determination that may be fused with the other sensor data to provide a ten axis determination of motion. Although described in the context of one or more sensors being MEMS based, the techniques of this disclosure may be applied to any sensor design or implementation. In general, the sensor assembly may include any or ail of internal sensor 112, external sensor 114 and auxiliary sensor 116.

In the embodiment shown, host processor 102, memory 104, MPU 106 and other components of device 100 may be coupled through bus 118, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

Multiple layers of software may be employed as desired and stored in any combination of memory 104, memory 110, or other suitable location. For example, a motion algorithm layer can provide motion algorithms that provide lower-level processing for raw sensor data provided from the motion sensors and other sensors, such as to extract one or more features that may be identified in the sensor data. As an illustration, one feature may comprise a motion mode that indicates the user's motion patterns, which may include without limitation, walking, driving, running, going up/down stairs, riding an elevator, walking/standing on an escalator, and other similar motion patterns. A sensor device driver layer may provide a software interface to the hardware sensors of device 100. Further, a suitable application program interface (API) may be provided to facilitate communication between host processor 102 and SPU 106, for example, to transmit desired sensor processing tasks.

In this exemplary system, device 100 communicates raw sensor data and/or processed sensor data to remote processing resources, such as server 126, for construction of the user profile. The processing of the sensor data may comprise extracting features from the sensor data, as will be discussed in detail below. One suitable architecture of server 126 is depicted using high level schematic blocks in FIG. 20, and may include server processor 128 that is in communication with memory 130 over bus 132. As will be described in further detail below, server processor 128 may execute instructions stored in memory 130 that are represented as functional blocks, including profile module 134. Profile module 134 may receive sensor data from device 100, as well as any features that may be have been extracted locally by device 100. Correspondingly, profile module 134 may also extract one or more features from the sensor data received from device 100. Based on the extracted features, profile module 134 may perform the other operations described herein as being associated with profile construction, including determining profile entries that depend on the extracted and determining entry data to be incorporated with such profile entries when constructing the user profile. Memory 130 or profile module 134 may also contain blocks for providing an exchangeable profile for transmission to a third party in exchange for compensation. As such, the SP operating the server 126 and providing the service to the user, is a remote SP. Memory 130 may also be used for storage of profile, entries or complete profiles from one or more users.

Communications between device 100 and server 126 may employ any suitable protocol. For example, a shorter range, low power communication protocol such as BLUETOOTH®, ZigBee®, ANT or a wired connection may be used or a longer range communication protocol, such as a transmission control protocol, internet protocol (TCP/IP) packet-based communication, accessed using a wireless local area network (WLAN), cell phone protocol or the like may be used. In general, the system depicted in FIG. 20 may embody aspects of a networked or distributed computing environment, devices 100 and server 126 may communicate either directly or indirectly, such as through multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

As noted, device 100 may supply raw sensor data (and, optionally, extracted features) and server 126 may perform operations associated with the construction of the user profile. However, any or all of the profile construction functions may be performed by any number of discrete devices in communication with each other, or may be performed by device 100 itself in other suitable system architectures. For example, device 100 may communicate with server 126 to transfer the raw sensor-data and/or processed sensor data, but device 100 may not comprise any sensor and obtain the sensor data from other devices connected to, or communication with, device 100. As such, device 100 may be a device dedicated to the profile construction and communication with the SP server, and may receive the sensor data from other devices associated with the user. Accordingly, it should be appreciated that any suitable division of processing resources may be employed whether within one device or among a plurality of devices. Further, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 102, sensor processor 108, server processor 128, a dedicated processor or any other processing resources of device 100, server 126 or other remote processing resources, or may be implemented using any desired combination of software, hardware and firmware.

Figure 21:
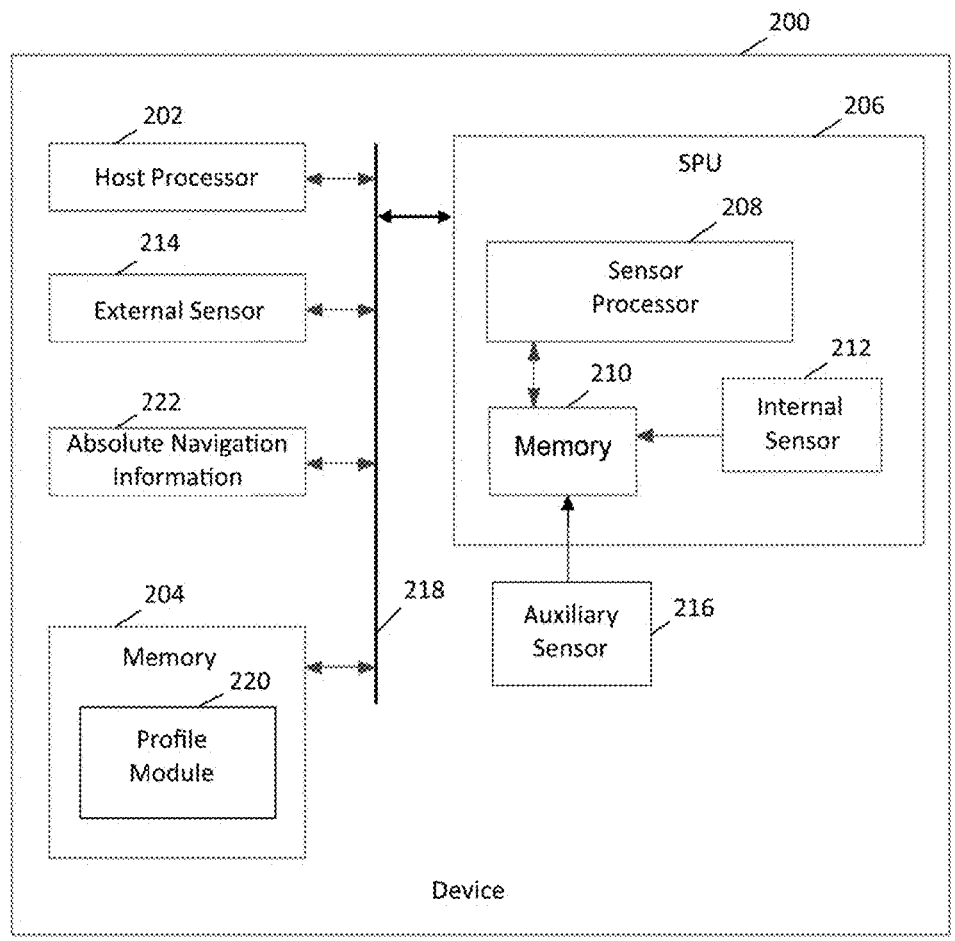
FIG. 21 is a schematic diagram of a device for constructing a user profile, according to an embodiment.

As another illustrative, but non-limiting example, the embodiment schematically depicted in FIG. 21 represents a device in which profile construction is performed locally. Similar components have corresponding reference numbers (such as, device 100 of FIG. 20 may correspond to device 200 of FIG. 21). Accordingly, device 200 includes a host processor 202, which may be one or more microprocessors, central processing units (CPUs), or other processors to run software programs, which may be stored in memory 204, associated with the functions of device 200. Multiple layers of software can be provided in memory 204. Device 200 includes at least one sensor assembly, as shown here in the form of integrated sensor processing unit (SPU) 206 featuring sensor processor 208, memory 210 and internal sensor 212. Memory 210 may store algorithms, routines or other instructions for processing data output by inertial sensor 212 and/or other sensors as described below using logic or controllers of sensor processor 208, as well as storing raw data and/or motion data output by inertial sensor 212 or other sensors. Device 200 may also implement a sensor assembly in the form of external sensor 214. This is optional and not required in all embodiments. Also alternatively or in addition, SPU 206 may receive data from an auxiliary sensor 216 configured to measure one or more aspects about the environment surrounding device 200. This is optional and not required in all embodiments. In the embodiment shown, host processor 202, memory 204, MPU 206 and other components of device 200 may be coupled through bus 218, which may be any suitable bus or interface. Device 200 may also have a source of absolute navigation information 222, such as a Global Navigation Satellite System (GNSS) or GPS, which is optional and not required in all embodiments.

In this embodiment, device 200 includes profile module 220, representing instructions stored in memory 204 for execution by host processor 202 to construct a user profile according to the techniques of this disclosure. Some of the processing may also be done by one or more SPUs. For example, the SPU may perform the feature extraction of the sensor data, and then provide the extracted features to the host processor. The SPU may be specially designed and optimized for the purpose of the profile construction. In one embodiment, the software associated with profile module 220 may be supplied by a SP, which may be referred to as a local SP since the profile construction is done on the user's device. According to one technique, the SP may receive the constructed profile from device 200, so that the SP may provide an exchangeable profile for transmission to a third party in exchange for compensation. Alternatively, the SP may facilitate a third party to communicate with device 200 to negotiate a direct exchange of a profile for compensation.

In some embodiments, the user may run an application using sensor data on the server of the SP instead of on one of the devices associated with the user. The user may use or control the remote application from one of his or her devices, and the screen of the device may be identical as if the application was running locally. As such, the SP has more control over who has access to the data used in the application. In a similar manner, the application may run on a local server belonging the user, but setup of this purpose. These strategies may help with keeping the user anonymous to the application.

As discussed in relation to FIG. 3, the user may stay anonymous to the SP, which means that the sensor data should be anonymized or depersonalized (e.g. by associating the sensor data to an alternate identity of the real user). In the rest of this document, the term anonymization will stand cover both the process of anonymizing or depersonalizing user data. Device 100 may therefore contain an anonymization module that transforms the sensor data before transmitting to the SP. The level of anonymization may depend on user preferences. Part of the anonymization process may also contain (partial) encryption. SPU 106 may also perform some or all of the anonymization or encryption. An advantage of performing these operation at the source, i.e. at the sensors, also means that the operation system may only read already transformed data. When transmitting the sensor data to the SP, care must also be taken to remove any identification possibilities through the device used in the transmission, such as through identification numbers or addresses of the device, e.g. the devices IMEI and/or MAC addresses. In embodiments, as depicted in FIG. 21, where the profile is constructed on the user device, the anonymization may be done on an entry or profile level.

Figure 22:
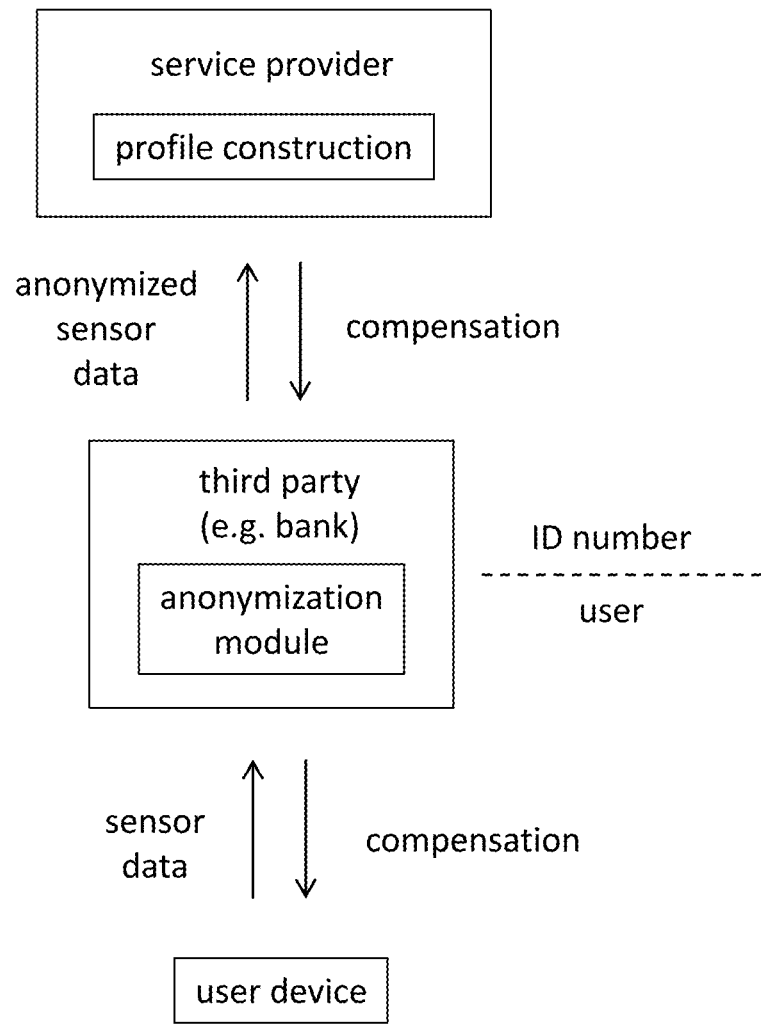
FIG. 22 is a schematic diagram of a system involving anonymization of the user, according to an embodiment.

The anonymization may also be done by an independent third party, such as e.g. a financial institute or a bank. FIG. 22 shows a system where the sensor data, raw or processed, is transmitted to the third party that takes care of the anonymization. The anonymized data is then transmitted to the SP for the profile construction. The third party may know the identity of the user, while for the SP the user may be identified by a user number. When the third party is a financial institute like a bank, the third party may also take care of transmitting any compensation to the user.

Profile Types

Different types of profiles exist, and below the different types will be briefly discussed. The user may have, or contribute to several different profiles. The profiles that the user 'owns' are part of the user's profile portfolio. The SP may provide the user with a tool or application to manage his or her profile portfolio. In general, each profile may have at least one profile entry based at least in part on sensor data.

Personal profiles—A first type or category of profiles is a profile that relates directly to the user. This means that this profile contains profile entries that relate to the characteristics, habits, preferences, etc. of the user. The characteristics may refer to the physical characteristic such as e.g. the user's gender, weight, or height. The habits and preferences may refer e.g. to the user's hobbies, eating habits, shopping/buying habits. In other words, any information relating to the user that describes the user and may be used in some form of monetizing options, may be used for the user's personal profile. The credentials that a user has created for accessing the services of a vendor or third party are also considered as personal data and may, as such, be included in profiles.

The personal profile may also contain information relating to the connections of the user, such as e.g. his or her family and friends. The information may relate to the kind of relation between the user and the connections, for example a family member like a child, parent etc. If the connection also subscribes to the service of the SP and has a profile, the profile entry may contain just a reference. For some monetizing options, the vendor may be interested in information about the connections of the user, for example to determine if through the users, their connections are potential customers. The users and/or his connections may be able to set permission to regulate this type of deep-linking, for example in the privacy data of the user and/or the connection. The linking from a user to his or her connections may contain multiple level (to connections of the connection). If the connection does not have a profile, the user's profile may contain information about the connection.

The profile may be divided into categories grouping related profile entries. For example, a profile category may be related to the user's hobbies, physical activities, eating habits, etc. The profile may also have a category relating to the professional activities or work of the user. This may include the user's competence, experiences, colleagues, etc. The data analyzed for the personal or work profile may come from different sources. For example, for the personal profiles the personal email may be analyzed, and for the work profile the work profile may be analyzed.

The personal profile may be considered the main or primary profile since it relates directly to the user. This profile may therefore also contain information which other profiles relate indirectly to the user. The other profiles may be accessible through links in the main profile. The other dedicated profiles may be stored at different places, or even at other service providers. For example, this concerns profiles relating to object like the house or the car of the user. Profiles relating to objects will be discussed below.

Object profiles—A profile does not have to refer to a person but may also refer to an object. For example, the user may have a profile relating to the house lie or she is living in. The house profile contains e.g. entries describing the house, which may consist of describing the feature of the house, but also information on the energy and electricity usage. In another example, a profile may refer to the car of the user. The profile of the car may contain information about how the car is driven, what maintenance is performed etc. The profiles of the object may be constructed from sensor assemblies incorporated in the objects, or external to the objects. The object's sensor assemblies may be operated according to specific sensor configuration relating to the object.

An object may have an owner, which will be indicated in the objects profile. The profile of the house may be built from data coming from the user or directly from the object, or even external databases. For example, the temperature characteristics of the house may come from a thermostat, and the time characteristics of the occupancy may come from the user's smartphone. The temperature inside the house maybe compared to the temperature outside the house, which may come from a meteorological database.

If an object has more owners, or users, the data that contributes to the constructing of the object's profile may come from a plurality of users. For example, for a house the information comes from the people living in the house, and for a car the information comes from people driving the car.

Although the object's profile is 'attached' to the user's profile, the object's profile may belong to the object, and the object may be considered the 'owner' of the profile. This means that if the object changes owner because it is sold, given, or lend, the object's profile may be transferred to the new owner (if that user subscribes to the service provided by the SP or a similar service). In other words, the object's profile becomes part of the profile portfolio of the new user(s). When transferring the profile, any personal information relating, or traceable back, to the previous owner may be removed.

The profile of an object can be thought of as a traceable history of the object, and may stay with the object from production until the object's end of life. Consider the example of a car. The car manufacturer may create a profile for each car that is produced. The profile may contain information relating to the production of the car, the materials used, information on replacement parts etc. The profile is then transferred to the user who buys the car. The SP may have an agreement with the car manufacturer, and the profile data may remain stored with the manufacturer. The new owner may give the car manufacturer access to the car profile (complete or only certain entries) and may obtain some monetizing options in return. Any types of maintenance of changing of parts may be entered into the profile, e.g. by the company performing the maintenance.

The advantage of such a profile is that the information is certified and backed up with (sensor) data, giving the user a reliable history of the object, and giving the manufacturer information on the life of the product and occasional or systematic problems that are encountered. For any profile entry, the SP may provide some sort of evidence or proof of the deduction and the data the backs up this deduction.

Animals, like pets and livestock, may fall in this same category of profiles since these animals have an owner. For pets the profile may contain e.g. information coming from the veterinarian, or the type of food the user buys for the pet. For example, for a dog the profile information may also come from the user walking the dog, such as e.g. the average time or distance of the walks. For livestock, the profile may contain information to the food used to raise the animal, the medicine required for treatments etc. This way, the owner, i.e. the farmer, may have a traceable record for each animal of his or her stock.

Group profiles—A profile may also describe a group of users, where the profile entries are constructed based on data provided by the users of the group. A group may be a collection of people, such as e.g. a club, organization, company, etc. with some form of shared interest, either for leisure of professionally.

When managing a group profile from and by a plurality of users, not all users may have the same rights. All users may contribute their data, but maybe not all users may enter or edit manual profile entries. An administrator may be appointed to manage the profile and be the contact person for the SP.

A group profile may contain entries relating to e.g. the dynamics of the group, the knowledge of the group and the individuals. For example, in a company profile, the profile may contain information matrixes of who talk to whom about what from an analysis of emails, discussions, and movements of the employees. The field of knowledge of each employee may be deduced from his or her emails, internet use, discussions with other colleagues on the phone or directly, etc. This type of information may help with the analysis of the communication within a company.

Any compensation that may be obtained through the group profile may be distributed over the users belonging to the group. Each group may decide how to distribute over the users.

Third party profiles—The user's data may also be used to construct a profile for a third party or a specific location such as e.g. a restaurant, store, park, address, street, etc. For example, when a user is going to a restaurant, an audio sensor may be used to deduce the noise level, the occupancy, or even to determine serving and waiting times. The sensor data from the user and other users may be used to construct a (time dependent) profile for the restaurant. In addition, the information may be used to deduce information for the user itself. If the user always goes to restaurants with low noise levels (or stays longer when there is less noise), it can be deduced that the user has a preference for low-noise restaurants. From all the user data, the profiles for many restaurants can be deduced, and this can then be used to advice particular restaurants to the user. The information about the restaurant may also be used by the owner of the restaurant for marketing Or commercial purposes, stating that the information has been objectively certified/validated using sensors. The information from the third party profile may also be transferred to the user (profile). For example, when the user is visiting a restaurant, the determined noise level, may be transferred to the data of the restaurant for that restaurant visit.

These types of profiles may be created by those interested in the profile information, but the user should also have some sort of rights to do so, e.g. because he or she is the owner. For example, a restaurant owner may create such an open or third party profile for the restaurant, or the 'city' may create a profile for a public park. For the SP these profiles have a special status because any user at the corresponding location may contribute to the data for the profile.

The profiling of specific locations based on crowd sources sensor data may be referred to as geo profiling, certified by sensor validation.

Profile Entry Input Mechanisms

A profile is a collection of profile entries, where each profile entry may be classified into different categories or types depending on how the profile entries are constructed. A first example of a category of profile entries may be entries where the information is entered manually by the user. In general, this concerns information that is difficult or impossible de deduce from sensor data or other data. For example, the user may enter his or her personal data such as, the gender or height. In a second example of profile categories, the entries may be entries where the information that is entered is constructed automatically based on data provided to the SP. This data may be sensor data, online data, or any other kind of data. For example, the weight of a user determined by an electronic scale is an example of an automatic entry. In yet another category, the profile entries may consist of entries that have been entered manually, but may need to be validated based on data. For example, a user may state in an entry that he or she is sportive, but this entry may need to be validated by measuring the activities of the user based on sensor data. Further categories of profile entries may consist of entries that are linked from other databases, or inherited from, or shared with, profiles of other users.

In the user settings, the user may decide which type of category he or she will allow for the creation of the profile entries. The user may also decide if the SP may fill the entries, with or without notifying the user, or if the SP has to ask specific permissions. When the SP completes or fills an entry, the user may give feedback if he or she thinks the entry is correct. The SP may also request that the user provides or authorizes a-given profile entry. The SP may receive a request from a third party for certain information, upon which the SP verifies if the entry exists, and if not the SP may take the required actions to construct the entry, for example by modifying the sensor configuration and operation the sensor assembly accordingly. Therefore, in some embodiments, the entry data for a profile entry may be generated upon a request. This request may come from the user, the SP, or a third party (either directly or through the SP). The user may be allowed to modify an entry, but the SP may also keep the original entry the SP deduced.

When the user subscribes to the service of the SP, an empty profile will be created for the user. The SP may ask the user some questions to create certain empty profile entries and to maybe start filling the profile entries. For example, the SP may ask the user what his or her hobbies are, or if the user is sportive. Depending on the answers, the SP may create typically relating profile entries. The SP may ask if the user has a house and/or a ear, and create the corresponding profile entries to be filled. The SP may also propose several stereotype profiles from which the user may choose. The user may also choose, profile entries from a menu or a list in order to create the profile with the profile entries that the user likes or desires. The user may also be able to remove profile entries if he or she so desires.

The different types of profile entry methods will now be discussed in more detail.

Sensor data based creation—The profile information may be entered automatically based on the sensor data the user provides. This means that the SP analyzes the sensor data, extracts the useful features and information, and converts these to a profile entry. The profile entry may have been empty, or may already have a value, in which case this value may be replaced or updated based on the newly deduced value.

The data coming from the DCO may be directly usable as a profile entry. For example, if the user has an electronic connected scale, every time the user uses the scale, the weight of the user and the date when the scale is used may be automatically be used to fill the correct profile entry. This type of profile entry may be referred to as a directly-measurable entry.

In most situations, the data and information from the DCOs may not be directly useable as a profile entry input. For example, based on motion data from an activity monitoring device, it may be deduced that the user goes running on average three times per week. In this case, the SP may receive the information from the activity monitoring device, either as raw sensor data, or preprocessed by the device, and based on the pattern of the data over time, will deduce the information about the running activities of the user. Any type of patterns may be deduced or learned from analysis over a group of users, and this knowledge may be used for other users to detect such patterns and anticipate of potential coming data collection events. This type of profile entry may be referred to as an indirectly-measurable entry.

The sensor data may come from a plurality of sensors, in one or more devices, and the SP will combine the collected data to deduce the profile entry. In one aspect, two or more devices having an integrated sensor assemblies may be associated with the user, so that the sensor data includes sensor data from each device. For example, if in addition to the data from activity monitoring device in the previous example, the user provides data from an electronic tennis racket, e.g. of the performed tennis swings, and the SP can deduce that the running and the tennis swings were detected at the same time, the SP may deduce that the user was playing tennis (instead of running).

Online data based creation—In a similar manner as the sensor data based entries, the user's online data can be used to derive profile entries. Any information that can be deduced from the user's online 'life' may be used to create profile entries. Examples of sources of information may be the user's search queries, content of visited pages, emails, etc. Based on the online information, the SP may deduce profile entries related to e.g. the hobby or interest of the user, the type of music or videos the user is interested in, or a product the user is looking to buy. The online data or information may be combined with the sensor data, or any other type of data, to construct profile entries. The SP may obtain the online data from collaboration with third parties that analysis the online data, such as e.g. Google. The SP may also perform an own analysis if access is provided to the online data.

Deductions made from online data may also be combined or verified by sensor data. For example, if a user is buying running shoes online, this may trigger the verification using sensor's whether or not the user is a runner.

Sensor or online based validation—Creating a complete profile from scratch based on sensor or online data may take some time. This would mean that it takes time before the user may be able to use the constructed profile as an asset and take profit from the profile through compensation mechanisms. This delay may not be very motivating for some users, and they may give up the 'effort' of providing the data to the SP. It should be possible for the user to start using his or her profile as an asset as quickly as possible after starting to provide the data to the SP.

Therefore, in order for the user to build a profile quickly, the user may be allowed to enter profile entries manually, even if the entry can in theory by deduced from sensor data. After the user has entered the entry data of the profile entry manually, the SP may start a validation process to check if the manual input is correct and corresponds to what Can be deduced based on the data provided by the user. In one aspect, the manually input entry data may be verified based on the sensor data. The SP may modify the sensor configuration and operate the sensor assembly accordingly in order to verify the entry. Different settings may be applied depending on the urgency and or importance, and may influence the sensor configuration. The SP may assign a validation or verification value or class to the manually entered data to indicate to what extent the manually entered information has been validated, is correct, can be trusted, or corresponds to the data. This validation is a security mechanism to make sure the user does not enter erroneous or false profile entries, possibly to pretend to be someone he or she is not, in order to increase the asset value of the profile and obtain better compensation. The time it takes to validate an entry may depend on the entry, and for each entry a process with specific time constant may be defined that check to associated data needed for the validation.

In one example, the validation value or class may be as simple as 'non-validated' and 'validated'. Alternatively, the validation classes may express a level of confidence, such as e.g. 'low confidence', 'medium confidence', and 'high confidence'. In another example, the validation or confidence may be expressed as a number, e.g. between 0 and 1, or as a percentage, where the low numbers represent low confidence. The confidence factor will be discussed in detail below.

For some profile entries the validation may be performed quickly. For example, if the user enters his or her weight, this can be verified the next time the users uses an electronic scale. For other profile entries, the validation process may take longer, and the confidence may increase only gradually over time. For example, if a user declares that he or she practices a certain sport a certain amount of times per week, the sensor data, for example from an activity monitoring device, has to back up this entry. In this example, the confidence that the user actual does the sport an average amount of times per week will increase over several weeks if data consistent with the entry keep being provided to the SP.

It is of interest to the user that his or her manually entered profile entries get validated quickly, since this would increase the monetizing options for the user. This means that the SP may provide options to the user to help with the validation process. For example, if the user enters that he or she plays tennis 2 times a week, the user may enter if he or she has an electronic tennis racket and where the users plays tennis. The SP may use the location indicated by the user, and check with localization methods (GPS, wifi, . . . ) to see how often and for how long the user is in that location. The rules deduced for validation of certain entries with the help a user provides, may also be used for other users that do not provide any help, as is explained below.

The difficulty to validate certain profile entries may also be related to the user entering data that is not 100% true. For example, a tennis player may exaggerate the amount of tennis he or she plays in order to obtain better monetizing options. If the (sensor) data does not back up the entries or proves otherwise, a penalty may be imposed on the user. For example, less monetizing options or options with less monetary benefit may be provided to the user, or the value of the monetizing, options may not exceed a set maximum.

In the discussion above the user manually enters the profile entry, after which the validation process is started. The profile entry that needs to be validated may also come from a connection of the user. In other words, the SP may check the profile entries of the connections of the user, and may verify if they also apply to the user. The reasoning is that in general people have some points in common with the friends, i.e. their connections. The more time the user spends with his or her connections, the higher the chance that they have profile entries in common. The direct connections of the user are referred to as first level connections, and the connections of the connection are second level connections for the user (and so on). The SP may also check deeper level connections, but the probability of similar profile entries may decrease.

Figure 23:
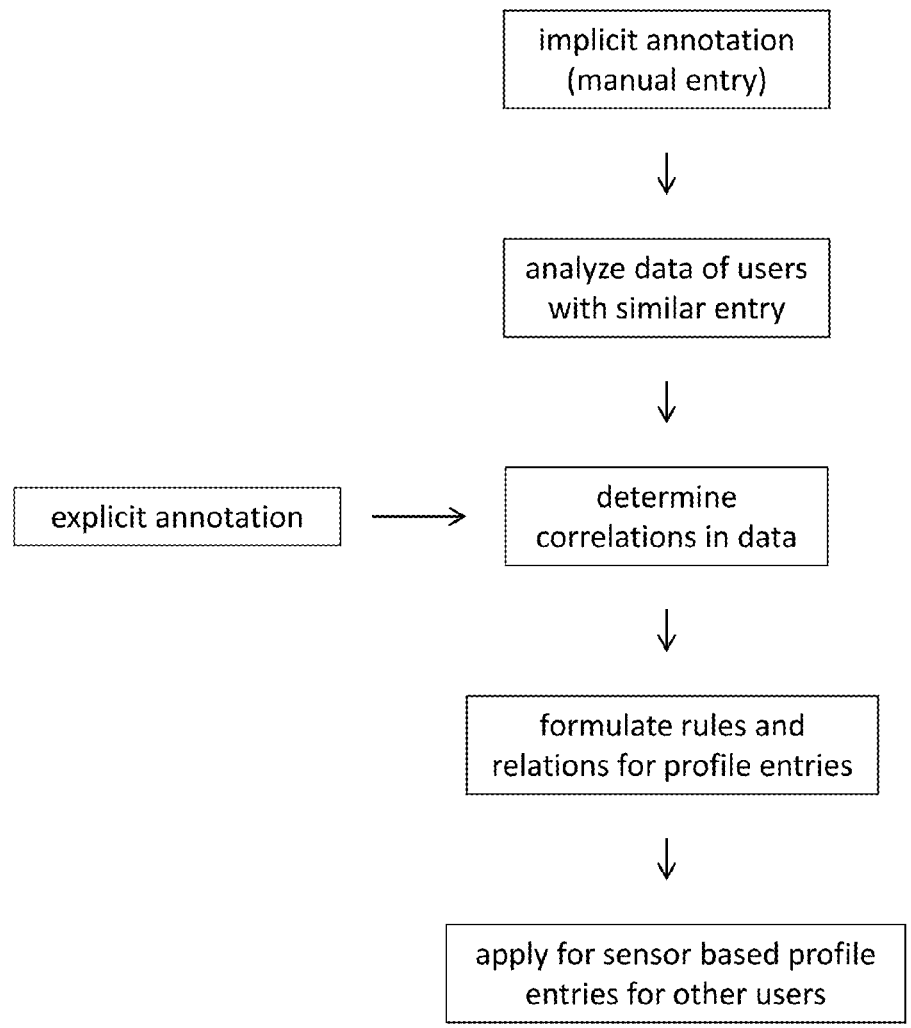
FIG. 23 is a schematic diagram showing annotation of entry data, according to an embodiment.

In the discussion of sensor data above it was indicated that the user may provide annotation of the provided sensor data. This is important for the SP since it helps with the interpretation of the sensor data and the creation of algorithms and models that may be required. The entries that the user makes manually can be thought of as implicit annotation because the user provides the SP with information. This information is related to the user's data, although it is in most cases not defined to which data exactly the information refers. The SP may use this implicit annotation to deduce any existing correlations between the manual entry and the (sensor) data. The SP may select those users who have made a similar manual entry for a certain profile entry, and look for any correlations that may exist in the data of the selected users. The thus determined correlations may be used to formulate rules and relations between (sensor) data and profiles entries. These rules and relations may then also be used for the users that do not perform any implicit annotation and fill the profile entry based on sensor data (as discussed above). For example, a user may manually enter that his or her hobby is playing tennis. The SP may then select all the users that have made a similar statement, and analyze their data. The analysis of correlation in the e.g. GPS data of these users will reveal locations of tennis courts, providing enough statistics are available. Entries may also be combined to facilitate the search for correlations. In this example, the SP may also ask how many times a week the user plays tennis. This information may be used to look for a correlation within the GPS data for a single user, or the SP may give the GPS points of users that play often a larger weight. Based on this implicit annotation the SP has determined a relation between GPS data and locations of tennis courts. This information may then be used for users that do not indicate that their hobby is playing tennis, but if their GPS data suggests that they are often at tennis courts, there is a high likelihood that the user does play tennis. For this example, a user performing explicit annotation would indicate that he or she is playing tennis when he or she is at the tennis court so that the SP can directly create the relation between the GPS data and playing tennis. The explicit and implicit annotation methods may be combined to create the rules and relations between the data and the profile entries (FIG. 23).

Linked from database—The profile information may also come automatically from databases associated with the user. For example, if a user participates in a competition for the sport he or she performs as a hobby or professionally, the ranking may be looked up in the official database. This information may be used to deduce how good the user is in that particular sport. In this case, the user provides the SP with all the required information to access such databases and construct the profile entry.

In another example, the SP may look up meteorological data in an official database to determine the weather characteristics for the place where the user lives. This kind of information may be useful for some monetizing options, for example for vendors of clothing.

The database may also contain the user's sensor data that has been processed and transformed by third parties. For example, sensor data from the user's activity monitoring bracelet may be process by etc. Fitbit or Runkeeper. This data may be used to fill the profile entries, either directly or after some form of conversion.

The SP may set up a specific collaboration with the third party to exchange the data automatically, or may use the users login data to access the database.

Inherited profile entries—The profile entries may not only be based on the data the user provides but may also be inherited from other profiles. A profile entry may be inherited from a profile entry of another user that the user may have a (hierarchical) relation with. For example, in a family situation, each family member may have their own personal profile, but some entries from one family member may be inherited from another member or shared with another member. For example, profile entries from a certain parent may be inherited by a child or shared with any other member, such as e.g. the address or type of housing. The relationship between the users may be detected automatically, or entered manually and validated afterwards.

The profile entry information may also be inherited from a group that the user may belong to. For example, if a user belongs to a tennis group or club, the profile entry for hobby or physical activities may come from the entries of the group profile. For example, a user that belongs to a tennis club will have tennis as a physical activity. If the club has a training schedule, the frequency of practice sessions and competition games may be inherited from the group profile.

The inheritance of profile entries or sensor data is not limited to persons. In a larger sense of the term inheritance, an object can inherit a profile entry or sensor data from one or more users, or vice versa. For example, if two users, like a husband and wife, share a ear, their driving data may be used for their personal profile entries related to driving, but may also be used to construct a profile for the car relating e.g. to how the car has been driven. Thus, the car profile is inherited and built from the data and entries of the users of the car.

Shared data entries—In principle, the profile of a user is built at least in part from sensor data from the user. However, in some situations the user may also take advantage of data generated by other users. This means that the principles described throughout this document may also apply to the construction of profile entries for a first user, using data from sensors or DCOs from a second user. The challenge of this principle is to decide when this sensor data may be used. Criteria for this decision may be e.g. the relationship between the users and or the proximity of the different users.

Consider the example of two users doing an activity together, such as e.g. doing some trail running. The first user may use a GPS to track the run, while the second user may not have a GPS. If it can be established that the first and second user did the run together, the GPS data from the first user may be used for the second user. The degree to which the details of the data may be shared depends on the details of how precise it can be determined that both users where performing the activity in a similar manner. For example, if it can be established, e.g. using audio signals, that the users where always close together, the location of the run and the detail about the speed characteristics of the run may be shared. If such close proximity cannot be guaranteed (maybe one user was faster and was stopping regularly to wait for the other user) only the location information about the run maybe used, without any information about the running speed.

In other words, the data from a first user for a certain data event may be applied to a second user after a validation process. This validation process may yield a confidence factor that may be applied to the data, indicating the confidence in the determination that the data from the first user may be applied to the second user. In some situations the SP may ask permission from the first and/or the second user to share the data.

Confidence Factor

The profile entries are based on deduction from (sensor) data. Some of these deductions are direct and simple and some are indirect and more complicated. To help indicate reliability of a given profile entry, a confidence factor may be determined, which may depend on any suitable criteria, including those discussed below. The confidence factor may also be adjusted over time, either as a decay process if the entry is not actively updated or as an augmentation if the history of the profile entry indicates increased reliability, or more sensor data has become available that confirms the entry.

A simple and direct deduction may be the example discussed above of the weight of a person 'deduced' from an electronic connected scale. Even if the weight of a person varies a bit, a reliable determination of the weight of the person can be performed from one measurement. From the one data event, the SP can therefore determine the weight with a high confidence factor. The accuracy may be determined by analyzing the variation in weight of the user or users in the database over time, maybe in combination with filters to select users with a similar profile as the user. This would give an indication of the variation of the weight of a user over time, and thus can be used to determine the confidence factor. For example, if the analysis of the users in the database shows that the typical weight variation (for similar users) is about 5%, it can be assumed that we can determined the weight of the person from a single measurement with about the same confidence.

As an example of a more complicated indirect deduction, where it is difficult to determine the correct profile entry with a high confidence based in a single or just a few data events, consider the concept of healthy living. This concept is not directly measurable and consists of many different factor such as, for example, the food a user buys in supermarkets, the restaurants a user goes to, the amount of exercise a user does, etc.

Because there are many factors involved, there are many factors to be verified, which may take some time. Each data event reveals only a small piece of the puzzle and only the combination of these puzzle pieces will reveal the complete picture. Initially, the SP may only be able to determine which supermarkets the user goes to or the restaurant the user visits. But since this is only part of the pictures, it cannot yet be deduced for certain that the user is living healthy. At this point, the healthy living entry has a low confidence factor. The exact confidence factor depends on which piece of the puzzle has already been determined and what the correlation strength is between this piece and the profile entry. As the other puzzle pieces of the healthy living concept are confirmed based on data events, the confidence factor increases. How much each piece of the puzzle or confirmed data event contributes to the profile entry and the confidence factor may be determined from rules or algorithms set or defined by the SP, or by analyzing the profiles of similar user and determining correlation strength between the profile entry and certain data. This correlation strength may then be used to calculate the confidence factor. Alternatively, the rules that define the confidence factor as a function of the detected data events may also be deduced from the implicit annotation discussed above. For example, the SP may ask the user if he or she considers that he or she is living healthy (or the user may make such a manual entry). A correlation can then be looked for between the answers of these users and their data and profile entries (the SP may perform some pre selection). For example, consider that 100 users fill an entry whether they are living healthy or not. The SP may check for these users what supermarket they use. Suppose that 24 users that say they live healthy visit supermarket A and that 16 users that say they do not live healthy visit supermarket A. This gives a correlation between visits to supermarket A and living healthy. Now, if the SP detects that a user is visiting supermarket A, but that user has not declared if he or she is living healthy, the SP can determine the probability that the user is living healthy. In this example that probability would be 24/(24+16)=0.6. The SP may use this correlation as a confidence factor, meaning that for the user that visited supermarket A, the confidence factor for the entry that the user is living healthy is 0.6. The SP may also look for other correlation between living healthy and e.g. doing physical exercise or visiting certain restaurants. The confidence factor for the different correlations may be combined to determine the confidence factor for the living healthy entry. This example has shown how the correlation strength from the analysis, using e.g. implicit annotation, can be used to determine the confidence factors, for all users.

The confidence value for a certain entry may also influence the confidence value of another profile entry, lower level data or higher level data. For example, a higher confidence level that a user is practicing some sport or physical activity on a regular bases, may also lead to a higher confidence level that a user has a certain fitness or is living healthy. The confidence level of a particular entry may be a mathematical combination of confidence levels of other entries. For example, the confidence value of the fitness level of a user may be a combination of all sports related confidence values. The confidence values may also be mathematically combined, e.g. averaged, per category or even for the entire profile. These confidence values give an indication of how accurate the deduced profile entries are e.g. per category or for the entire profile.

In another example, the confidence values may be mathematically combined for specific monetizing options. If for a certain monetizing option, certain profile entries are important, the confidence levels of these entries, separately or combined, may be made known to the provider of the monetizing options. The potential compensation of the monetizing option may be related to the confidence value; the higher the confidence value, the higher the compensation. The underlying principle is that the more it can be guaranteed that the profile entries used for the monetizing option are correct, the more the user can be rewarded for it. For example, if the confidence value is expressed as a percentage, the actual compensation may be multiplied by this percentage. This strategy may be transparent to the user, as an incentive to provide more, data, which would yield a higher confidence level and therefore a higher compensation. Part of the compensation may also be held back or reserved, and may be released to the user when the confidence factor increases. If the confidence factor does not increase within a predefined time, the compensation may be partially canceled.

The confidence value for a user may also be influenced by the connections of the user (e.g. friends, family, etc.) since the lifestyle of a user often has similarities with the lifestyle of the connections. The influence may depend on how close the user is to a particular connection and on the amount of time the user spends with the other users/connection. For example, if a user spent a lot of time with another user and they both have entries for a certain (physical) activity. A higher validation value of that entry for the friend may increase the confidence level of that entry for the user. In a similar manner, confidence value for entries may also be inherited from a user to his children since a certain lifestyle of the parent is transferred to the children.

As mentioned above, the validation and verification process is done to check that the user entries are correct. This process can also be seen as a certification, meaning that the SP certifies the profile or certain profile entries of the user. The certification may also be used for official purposes. For example, the user may receive a certain subvention from a (local) government for an energy efficient lifestyle. In this case, the official instance may set up rules for qualification of the subvention, and the certification by the SP that the user follows these rules may be used as a qualification criterion to receive the subvention. A minimum confidence factor or threshold may be introduced to qualify for the certification. In this case, the SP may provide a certification document as proof. The certification may be monitored over time, and adapted if changes occur.

All profile entries may have a confidence factor stored with the entry. In addition, a date may be added when this confidence factor was obtained and a history of the confidence factor may also be stored how the confidence factor was determined or calculated over time. This confidence factor may be visible to the user, or may be stored in the background. If the confidence factor is visible, the SP may have an option where the user may contribute to the increase of the confidence factor, for example by providing some annotations to the user or suggest how to measure or validate the entry (more).

Profile Dynamicity

People change, change their habits, change their preferences, and can therefore not be considered a constant. Therefore, a profile cannot be considered a constant or static, but rather profiles are dynamic. The profile entries are deduced from the sensor data that comes in at a certain point in time. It cannot be assumed that all events are measured and therefore that any change is detected. A profile entry deduced from one or more data events may have to be continuously confirmed by similar data events. For example, consider that it is detected that a user is playing tennis. From one data event it cannot be deduced that playing tennis is a hobby of the user. However, if it is detected that the user plays tennis every week, the profile may indicate that one of the user's hobbies is playing tennis and that he or she plays tennis with a frequency of once a week. If the user does not play tennis in a certain week, it can mean that he or she just missed that week, or that the user stopped playing tennis. Therefore, the confidence in the fact that the user plays tennis as a hobby decreases.

Figure 24:
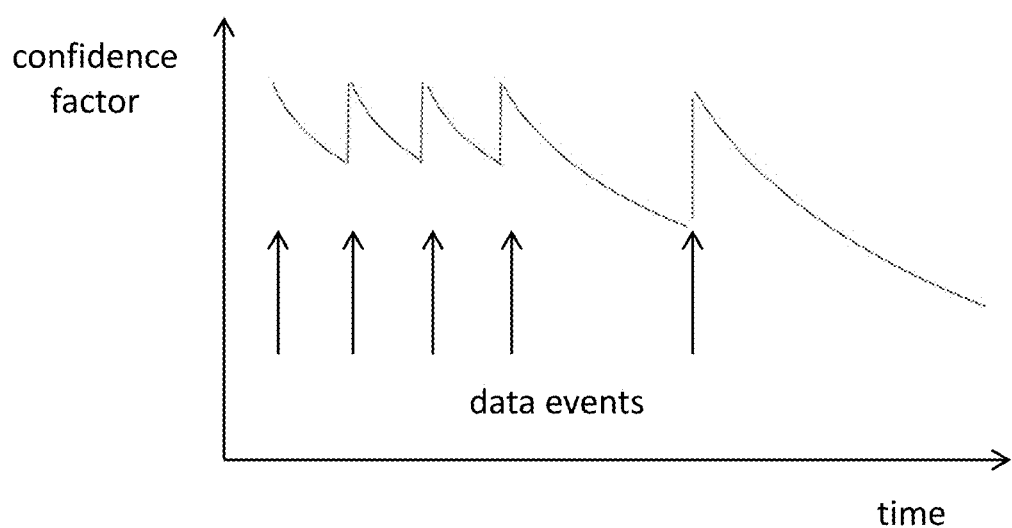
FIG. 24 is a schematic diagram showing adjustment of a confidence factor, according to an embodiment.

This concept may be introduced into the profile by defining a decay of the confidence factor, meaning that the confidence factor of certain entry has a certain decay time. In other words, the confidence in a certain deduced entry decreases with time, until a new data event confirms the deduced entry. In other words, the confidence factor is adjusted over time, in general in a monotonic decrease function until new sensor data of new events confirm the entry. FIG. 24 shows how the confidence factor decreases after each data event (indicated by the arrows). If users break habits, as in the example above, they might have another reason. This reason may have more importance than the expected event. If an important data event is detected instead of the expected data event, the amount of decay of the confidence factor may be adapted.

The decay time may be deduced from the data frequency or the type of entry. In general, if certain data is usually provided at a certain frequency, the decay time should be a multiple of this time interval. In the example above, the initial frequency was once a week, and therefore the decay time should be of the order of weeks. The starting value of the confidence factor depends on the confidence of the deduction as is explained above.

The decay of the confidence factor over time may take any required form that corresponds most to the profile entry, e.g. exponential, linear, etc. The decay time or decay speed may be deduced from the data of the user, or may be based on the data from all or a selection of users. In other words, based on an analysis of the data from a large group of users, the typical time characteristics of the variation of the profile entries or user habits can be determined, from which the decay time or speed can be deduced. For example, a user practicing a certain sport may at some point become less interested and gradually decreases the frequency at which he or she practices the sport. In another example, a user may follow a certain diet but may gradually decrease the rigor with which he or she follows the diet. These kinds of trends of changing habits may be determined per user or group of user and help to predict typical expected changes in profile entries.

As discussed above, the confidence factor influences the value of the profile, and therefore the decay of the confidence factor also leads to a decay in the value or compensation. This decay in value of the profile is a combination of the decay in value of the different entries. Therefore, the decay of the value of the profile is a mathematical combination of the decay of the value of the individual values. For example, this may be done by simple adding the value predictions over time of the various entries in order to determine the value prediction over time for the entire profile. The different entries may be given different weights to account for, for example, personal preferences or past monetizing options or actions of the user.

Privacy Management

Privacy vs. monetization—The profile of the user may be considered an asset. In this sense the user profile is a digital version of the user containing all the information that can be deduced from his or her online and offline data and behavior. This information is both private and valuable. The profile may be managed as an asset where the privacy aspect and the value aspect should both be considered. In fact, the privacy and value aspect represent variables that can be tuned, and can help to decide on how to manage the user profile. In any case, the system will allow the user to keep his or her privacy with respect to the vendor or third party while sharing the data with the SP.

On the one hand, the user may decide that his or her privacy is very important and that the information in the user profile should only be known to him. The fact that the user does not want to share the information with anyone makes it very difficult for the SP to create monetizing options. These users thus choose privacy over monetizing options, and will not be able to gain much from the profile. In this case, there might not be a large interest in generating a detailed profile using lots of sensor data. Therefore, the SP may adapt the sensor configuration to provide just enough sensor data in order to construct the minimum profile that the user is interested in, and operate the sensor assembly according to this configuration. This would save computing and power resources.

On the other hand, the user may decide that he or she does not mind sharing the information of the profile if this leads to monetizing options. In this case, the SP is allowed to use the profile information to find and propose monetizing options to the user. These users thus choose the monetizing options over their privacy.

In other words, the user is in control over the privacy of his or her profile but he or she has to choose between keeping (parts of) the profile private, or using it as an asset for monetization. Privacy data, such as a privacy parameter may be used by the user to make this choice, ranging from high privacy and low monetization, to a low privacy and high potential monetizing options.

Privacy parameter—In managing the user profile as an asset, the user may set a privacy parameter or a monetizing parameter that indicates if the user prefers privacy or monetizing options. These and other related parameters may be considered privacy data that corresponds to the user. The parameters may be set at all different levels, such as e.g. at the complete profile level, or at lower level such as per category (personal, car, house), or even per profile entry, such that the privacy data may be a user setting for at least one profile entry. The parameter may be simple and binary, where the information the user does not want to use or share is classified as 'private', and all entries not marked 'private' or marked e.g. 'monetize' may be used for monetizing options. Since the private and monetizing aspects are sort of each other opposite, if it is not the one, it may be considered the other. The privacy parameter may also have a scale with more options or different levels of granularity, and may be set for example between 0 and 1, where 0 means the information is private and 1 means the information may be used for monetizing options. A value of the parameter between 0 and 1 may indicate to what level the information is revealed. For example, consider the age of the user as indicated in FIG. 11. The age may be revealed at several different gradations of privacy or granularities as is shown in the figure: 30-40 yrs, 35 yrs, or as the actual birth date Mar.

4, 1980. In this case, if the user sets the privacy parameter to 0 it means the age remains unknown or to set to the maximum range (as deduced from statistics of the users database), while if it is set to 1, the birth data is made available. Since in this case, 3 gradations are available it would mean that a privacy parameter of 0.33 corresponds to '30-40 yrs' and 0.66 corresponds to '35 yrs'. Thus, privacy data may be obtained that corresponds to the user. A plurality of granularity levels may be established for at least one profile entry of the profile. By selecting a first granularity level from the plurality of granularity levels based on the privacy data, the profile entry may be transformed to match the selected granularity level. In some embodiments, the plurality of granularity levels may be established in part by analyzing multiple user profiles of a group of users. For example, when different users are asked to enter their birth data, they have the choice to enter their data with their desired granularity, e.g. the exact date, or only the year. By analyzing these profile entries from the different users, the SP may derived the possible or most used granularity levels. When the user enters his or her exact birth date in the profile, but according to the privacy data, only the birth year should be revealed, the requested granularity setting is selected from the plurality of deduced possible granularity settings. The group of users may be selected from a larger list or database of users based on some selection criteria, for example in order to select users that resemble the user in some way. This selection process may be based on a comparison of the entry data of one of more different profile entries. The selection criteria may be determined by the user and/or the SP.

Figure 26:
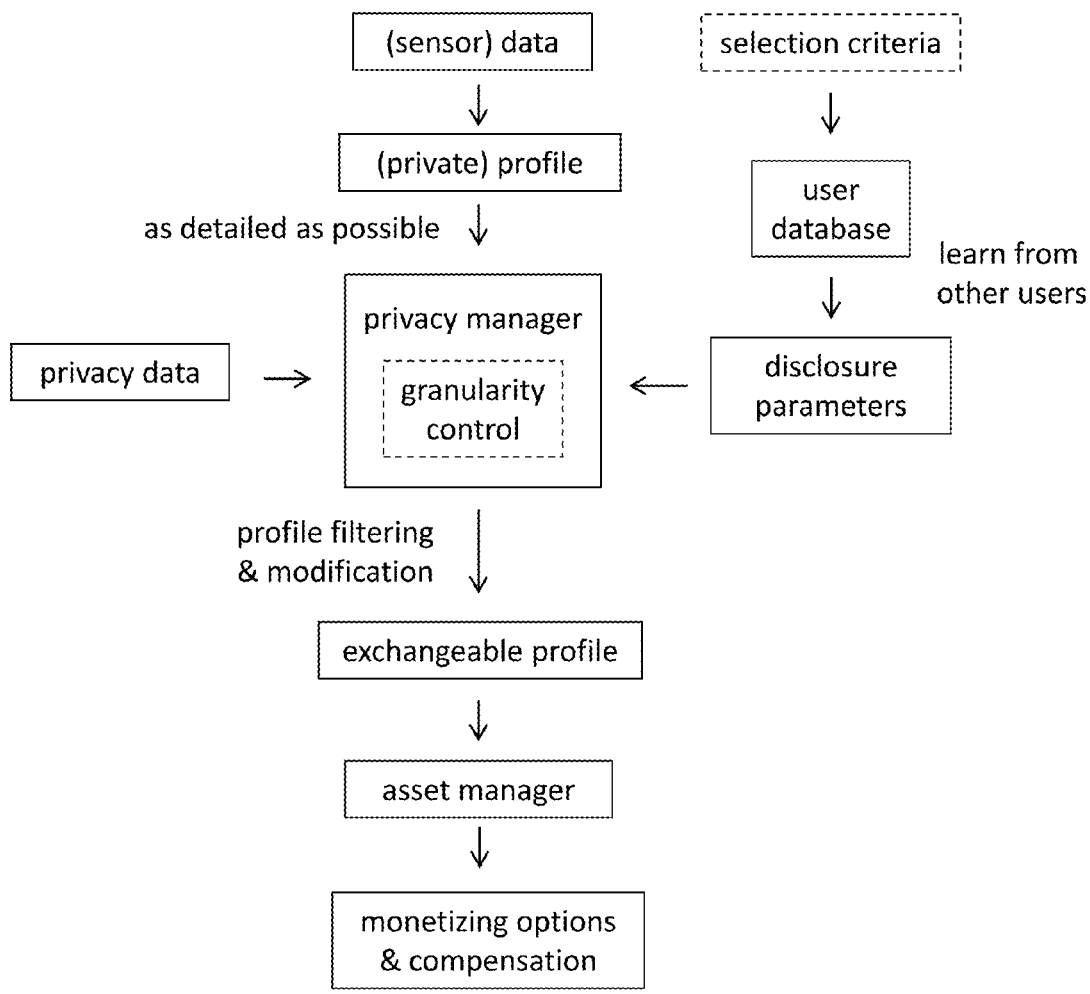
FIG. 26 is a schematic diagram showing the generation of an exchangeable profile, according to an embodiment.

FIG. 25 shows an example using the age of the user to demonstrate the influence of the privacy setting on how the constructed profile is converted into a profile that may be exchanged with the public, such as a vendor or other third party. The profile constructed based at least in part on sensor data may be referred to as a private profile, and contains as much details as possible as can be obtained by the sensors and/or manual entry. The term private is used to indicate that no information from the profile is used in monetizing options without the knowledge and approval of the user. The exchangeable profile is basically a filtered private profile where the filtering is done based on the privacy data, such that the exchangeable profile includes at least one profile entry transformed according to privacy data. The exchangeable profile is available to the SP for the creation of monetizing options. The exchangeable profile may also be referred to as a public profile, but he term 'public' does not mean that the profile is published for everybody to see, it merely states that this is the profile that the SP will work with and will reveal to the vendor or third party in example for a monetizing option or other forms of compensation. The private profile may be encrypted, while the exchangeable profile is not. The user may enter the privacy setting as a numerical parameter, or may use, as indicated in FIG. 25 some sort of graphical interface with for example a slider or a dial. When changing the slider's or dial's position, the exchangeable profile will instantly change to see the effect of the privacy setting on the entries of the exchangeable profile. If the user sets a certain privacy parameters, the closest corresponding class may be chosen (0.5 reveals '35 yrs') or the parameter must be higher than the corresponding class before the information is revealed (0.5 reveals '30-40 yrs'). FIG. 26 shows a flow chart of the generation of the exchangeable profile.

The different available granularity levels for each entry may be determined by the SP. In the example of the age, the SP may define there are 4 granularity levels: 1) the actual birth date, 2) the age in years, 3) the age within a 5 year window (e.g. 20-25, 25-30, 30-35, . . . ), or 4) the age within a 10 year window (e.g. 20-30, 30-40, . . . ). The granularity levels may also be defined by setting a minimum window size and a maximum window size, and the amount of granularities between. In this example, the minimum windows size is 1 day, and the maximum window size is 10 years. The minimum and maximum maybe derived from the user entries. In the example of the age, the entered age of the users may vary between e.g. 15 to 80 years. In this case, the maximum range may be set as 65 year windows, or at least e.g. half the maximum observed spread in entries. The different granularities details between the minimum window and maximum window may be determined using a linear, or logarithmic, or any other scale. The granularities may also be determined automatically from the user entries. In the example above the user has entered the birthdate in the private profile. However, some user may not want to enter there birthdate or age with this accuracy. Some may want to enter their age as 35 years or 30-40 years. Analysis of the entries can be used to determine the most common entries and select and order them to obtain usable, gradual, and full-scale-covering selections.

The exchangeable profile entry obtained after the privacy filtering indicates the maximum detail that the user would like to be 'public' and use for monetizing options. However, this does not mean that this entry is shared with all vendors or providers of monetizing options and other forms of compensation. The SP will ensure that the compensation provider will not receive more detailed information than required. For example, a vendor of sporting goods, like running shoes, would only need to know the age with a 5 or 10 years window, while a vendor of flowers may like to know the birthdate (within a few days) to provide a special offer related to the birthday. The minimum required detail may be deduced by the SP from the user entries. For example, in the example of the running shoes, the age distribution of the users buying these or similar running shoes may be analyzed. The observed window of ages may be used to set the maximum detail reveal to the vendor of the shoes. In the example of the vendor of flowers, the SP may look for a relation between the birthday of family members and the purchase of flowers. This relation will mostly likely give certain peaks around special days such as e.g. the birth day and/or mother day. These special days and the spread in days around these days may be used to define the useful information detail for the flower vendor without revealing too much detail. These examples show that the (privacy) details and granularity of the information revealed to a vendor or third party can be deduced from analyzing the data and profiles of the user in relation to the products or similar products that the third party may provide. The width of the distribution, the variance, or any other similar parameter may be deduced for this data and be directly applied to determine the level of granularity revealed to the vendor. This shows that the filtering or modification of the (private) profile that is performed to generate the exchangeable profile may be based at least in part on the characteristics of the third party that may provide compensation.

As an alternative option, the user may also be able to determine the exact details of his or her exchangeable profile. This means that for each entry, or category or class of entries, the user may manually set the granularity of the information and the details he or she wants to reveal. These settings may depend on the third party, or category or class of third parties. Although this option may be provided to the user by the SP, it would require a lot of attention and work for the user. The user may do this at an initial stage, and the SP may learn about the privacy settings of the user, and use this to deduce some privacy parameters and rules that the SP may propose to the user to apply in addition to the manually way.

A user may not want to set a privacy parameter for each profile entry, and may want to set only a general privacy parameter for the whole profile, or per category that may include a plurality of profile entries. In one example embodiment, this general privacy parameter is then inherited by all the entries in that category. However, the influence of the different profile entries on the privacy may vary. In other words, the different profile entries do not reveal the same 'amount' of information about a user. For example, the type of music a user plays or likes is generally considered to be less private than the type of medicine the user takes, if the user sets only a general privacy parameter, the SP must assign corresponding privacy parameters to the different entries taking into account how much that entry reveals or discloses about the person. A disclosure parameter may be used and applied by the SP which takes into account and quantifies the amount an entry discloses about a person. The disclosure parameter may be considered part of the privacy data, or may be calculated based on the privacy data. The disclosure parameter may also be combined with the privacy data. For example, the privacy data may contain a privacy parameter for e.g. the profile or a profile category, and the granularity of the profile entry is derived from the privacy data using a disclosure parameter associated with the profile entry. This disclosure parameter may be defined as different classes, e.g. low, medium, high. The disclosure parameter may also vary between 0 and 1, similar to the privacy parameter. In this case, 0 may indicate that the entry reveals not much about the user, which is typical for information that people don't mind sharing with each other, such as their musical preferences. A disclosure parameter of 1 may indicate that it reveals a lot about the user, which is typical for information that people in general don't like to share with others, such as e.g. the medicines they use. The disclosure parameters for the different entries may be set manually, for example by the SP. The disclosure parameters may also be set by or learned from the users. For example, the SP may learn this from the users that do set the individual entries. In this case it is assumed that if a user gives different privacy parameters to different entries, that user feels that they disclose a different amount of the user. Of course, each user may have different opinion about how much a certain entry discloses, but statistics over many different users may give a good average estimation of the disclosure parameters. As such, privacy data may be derived from a plurality of user profiles. The group of different users may be selected from a list or database of users based on certain selection criteria as explained above. Even after the individual privacy settings have been determined based on the general privacy parameter and the disclosure parameters, the user may be able to adjust the proposed individual parameters. This adjustment also gives the SP information about the disclosure parameters, for that particular user, and also as part of the general deduction strategy of the disclosure parameters. In general, any adjustment any user makes changing the privacy setting of a profile entry of a group of profile entries may be used by the SP to learn about the disclosure parameter of that entry of group of entries. In most situations, when a user decreases the granularity of an entry of an exchangeable profile, it means that the user feels that the previous granularity revealed too much about the user. This change in modification may be used to increase the disclosure parameter of that entry. The change in disclosure parameter may be correlated to other profile entries that may help the selection criteria to select the group of users from a list or database of users. The disclosure parameters may be used in different ways to determine the individual privacy parameters of the entries. For example, the individual privacy parameter may be deduced by multiplying the general privacy parameters by 1 minus the disclosure parameter for the entry. This means that the more an entry reveals about a person, the more the individual privacy parameter is reduced. In another example, the disclosure parameter may be used as a threshold where only those entries are made public (or used) where the disclosure parameter is below the set general privacy parameter. For example, if the privacy parameter is set to 0.5, all entry with a disclosure parameters under 0.5 may be made available.

The privacy settings may also be presented to the user in the form of stereotypes or models, meaning that the user selects a certain model or stereotypes that he or she identifies with most. The SP may also propose a stereo type to the user based on what the SP deduces as the most corresponding stereo type based on the users profile. For example, the user may construct stereo types or models 'Generation X' or 'Generation Y'. Generation Y, which mostly grew up in the digital era, may be more inclined to share its data. The SP may construct this profile based on the privacy settings of users that are part of Generation Y.

When the user changes general privacy settings, the effect on his of her exchangeable profile should be shown immediately (or 'live'), as discussed in relation to FIG. 25. Instead of showing only 1 entry, the user interface may show the complete profile or part of the profile, depending on which entries the parameter he or she is changing influences.

Through the privacy data and parameter(s) the user chooses which part of his profile stays private and which part becomes public, meaning the part that may be used for monetizing options or other forms of compensation. Therefore, the generated private profile can be defined as the profile that contains everything that may be learned about the user, adding all the possible details. The exchangeable profile is then defined as a filtered version of the private profile, where the filtering is done using the privacy data. The filtering and modifications performed to obtain the exchangeable profile may be performed by a privacy manager or privacy management module, which may be a software application running on one of the users or SP devices/servers. In the user interface where the user can get an overview of his or her private and exchangeable profiles, the influence of the privacy parameters should be clearly visible to the user, so that he or she can vary the privacy parameter, and see what the resulting exchangeable profile becomes.

Value of private and exchangeable profiles—A profile may be considered to have a value, which is based on the obtained compensation by the user and/or other users subscribing to the service. The value depends on the information in the profile. This information is different between the (private) profile and the exchangeable profile. Therefore, the private and exchangeable profiles also have different estimated values. Because the exchangeable profile contains less detailed information, the exchangeable profile has a smaller value than the private profile.

The maximum value a user can obtain from his or her data is the value of the private profile. If the user sets the privacy parameter to a minimum, the exchangeable profile equals the private profile, and therefore the exchangeable profile has the same value as the private profile. Because the privacy parameters influence the exchangeable profile, they also influence the value of the profile. To show the influence of the privacy parameters to the user, the values of the private and exchangeable profiles may be shown in the interface where the user controls the privacy settings. This means that the value of the profile varies 'live' as the user changes the privacy data.

Flexible privacy vs. value of monetizing options—The value of the monetizing options and other forms of compensation that are proposed to the users may depend on the information that is revealed. For example, a vendor or third party may be inclined to give a better deal if the user provides more detailed information. This principle is incorporated in the negotiation process to obtain the compensation that will be described below.

In the compensation negotiation process, the SP may start by providing the vendor with profile information below the limit of what the user allows to be used based on the privacy data. This way, in the negotiation, the SP may reveal more information about the user (up to his or her limits) if the vendor provides better compensation.

In one embodiment, the privacy limits of the user as discussed above may be hard set and not flexible. In another embodiment, these limits may be flexible as a function of expected value of the compensation. This means that the user sets that he is willing to give up more details from his or her profile in exchange for more value of the compensation. This flexibility or elasticity rules or parameters may be set in the privacy data for individual entries, or for categories, or for the complete profile. This privacy elasticity parameter may be expressed, for example, in currency units or percentages. In other words, the user may set how the privacy parameter depends on the value of the compensation (more compensation is less privacy). When the elasticity parameter is expressed as a percentage, it means that the value of the compensation should be increase by a certain percentage which then defines how much the privacy parameter decreases.

From Sensor to Profile Entry

As discussed above the profile entry can be divided into 2 categories: the directly measurable entries and the indirectly measurable entries. For the directly measurable entries, the step from sensor to profile entry is direct. As shown in the example of the electronic connected scale, the output of the sensor (where the output is the weight and the scale is the sensor), can be used directly used as an input to the profile entry indicating the current weight of the user. As such, for some profile entries the sensor data may be converted directly into entry data for the profile entry.

Figure 27:
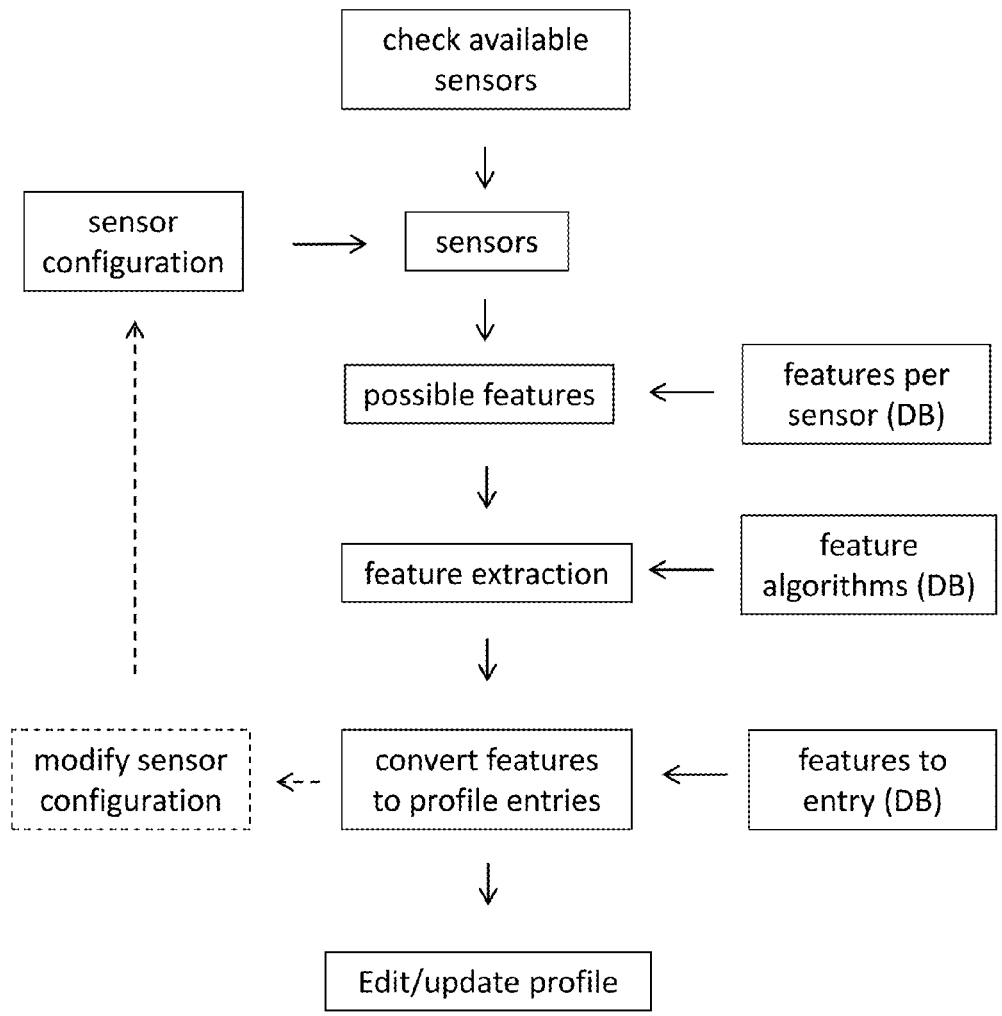
FIG. 27 is a schematic diagram showing conversion of sensor data into entry data for a profile entry, according to an embodiment.

However, many profile entries are indirectly measurable entries, which require some sort of model, algorithms, or rules to deduce the profile entry from the sensor data. FIG. 27 shows an example embodiment of the conversion of sensor signals into a profile entry involving several different steps.

The first step may be a feature extraction process. In this step the raw sensor signals are converted into more meaningful features. As such, at least one feature that may be extracted from the sensor data may be determined. For example, the SP may request a profile entry that would require the determination of a feature. These features may also be considered building blocks since they will be used in the following steps to build the profile entries. In one aspect, the sensor data may be processed to extract at least one feature. For example, raw coordinates from a GPS sensor can be converted into places the user visits or where the user spends a certain amount of time (e.g. more than 10 minutes). For this, the system checks when the user is in a certain location for more than the predefined time, and if this is the case uses e.g. a lookup table to determine what is at that location. In this case, the feature extraction process converts the raw GPS coordinates into a list of places the user spends his or her time. The extracted features may be seen as building block from which the profile entry is built in the next step. So, in this example, each building block, contains the place the user visited, and each building block may include additional attributes such as e.g. the time spent at that location.

In another example, the raw signals from one or more inertial sensors are converted into gestures or activities of the user. The gestures may be the gestures representing the movement of a mobile phone, smart watch, sports equipment, etc. The activities may be a list of some fundamental activities of a person such as e.g. walking, running, standing, sitting, lying. In this case, the feature extraction process converts the raw inertial sensor signals in a (time stamped) list of gestures and/or activities the user performs. Here, each building block represents a gesture or an activity of the person, and may include the time and duration of that gesture/activity.

The feature extraction process requires two types of knowledge: First of all, which features can be deduced from which sensor, and second, how to convert the sensor signals to the features or building blocks. The SP will create and maintain a database indicating the features that may be deduced for each sensor, and which model/algorithm to use to convert the sensor signal into the feature.

The next step is a profile entry deduction process. In this step, the extracted features are converted into profile entries and entry data. Preliminarily, at least one profile entry that depends at least in part on a feature may be identified. In other words, the profile entry is built from the building blocks. For example, using the list of places the user goes, many things can be deduced from the grocery stores the user visits: does the user always go to the same grocery store? how frequency does the user go to the grocery store? does the user by organic groceries or not? In the example of the activities, it can be deduced if the user has a desk job, if the user walks enough, if the user perform a physical activity regularly etc. The deduced information can then be used as an input for the user's profile entries.

Accordingly, entry data for at least one profile entry based at least in part on an identified feature may be determined. For example, for each profile entry, the required features or building blocks must be defined, and the model/algorithm should be available to convert the feature(s) to a profile entry. This information may be available in the form of a database.

In the final step, the deduced entries are entered into the user's profile. This may include generating the profile entry of the profile by incorporating the determined entry data. The entry data may also be incorporated into a plurality of profile entries. Based on the extracted features, it may be determined which profile entries may be created or modified. In one aspect, sensor activity may be determined for the entry data so that the sensor activity may be associated with the profile entry. This means that information about the sensors and (quantity of) sensor data required and used for the deduction of the profile may be associated with the profile entry. The deduced entry data may be used for a profile entry that is still empty, or for one that already has information. The profile may be updated or edited without notifying the user. Alternatively, the user receives a message when his or her profile has been modified. In another example, permission has to be asked first to the user before making any modification to the profile. If the new entry is the same as the already existing entry, the user may not need to be made aware. This may also increase the confidence factor of that particular entry. If the new entry is not identical to the existing entry, the existing entry may be replaced. If the entries are not identical or are contradictory, the system may withhold any changes for the moment and wait for more sensor information before making a decision. The system may also request information/help from the user to try to solve any ambiguities.

Figure 28:
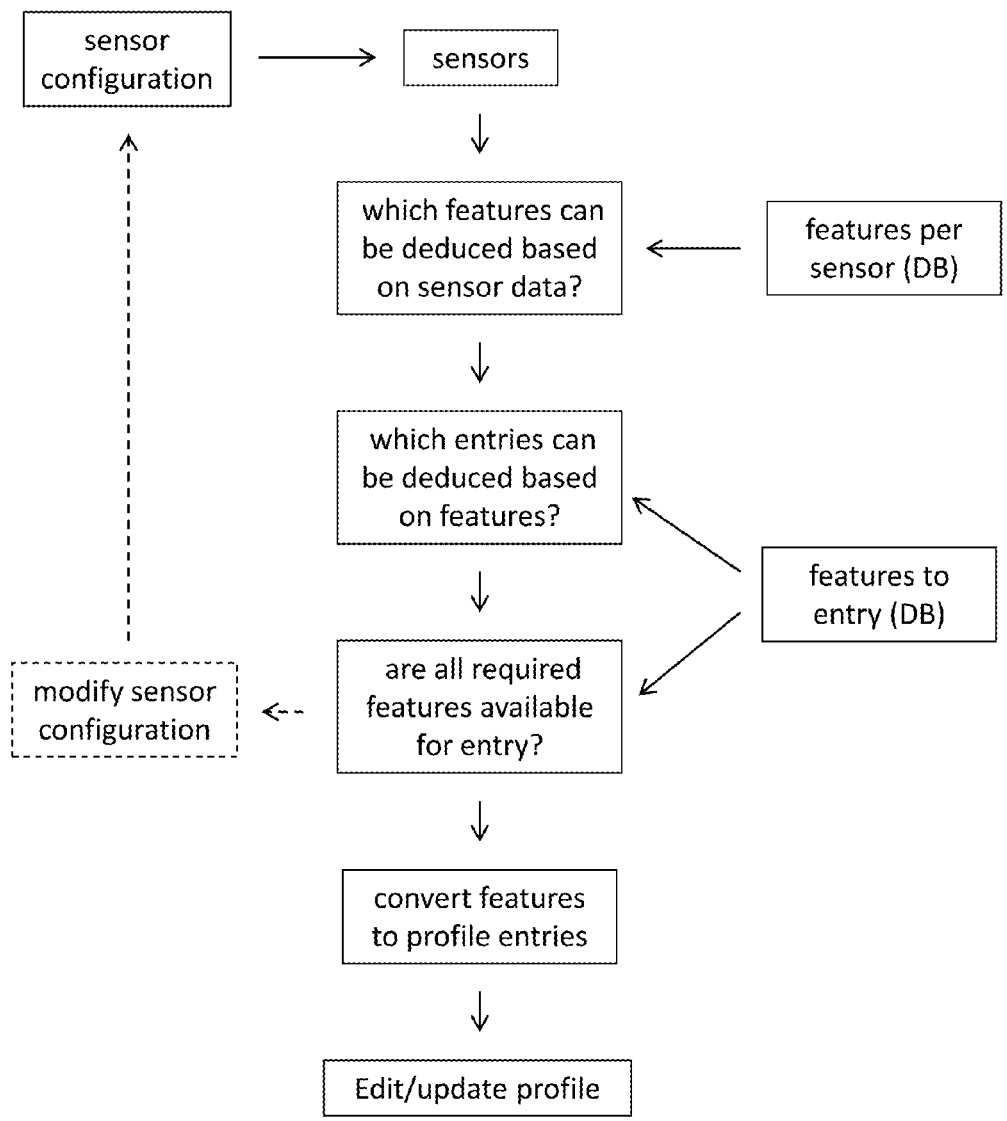
FIG. 28 is a schematic diagram showing construction of a profile based on a sensor configuration, according to an embodiment.

The whole process of converting sensor data into profile entries may be controlled or driven in different ways or modes. The process may be sensor driven, where the sensor data is analyzed whenever possible and converted into profile entries. Alternatively, the process may be profile or entry driven. In this case, a request is made to fill or verify a specific profile entry, and depending on the entry, the data for one or more sensors are analyzed until the profile entry can be deduced. This request may come from the user, an SP, or even a third party. The operation and/or switching of the different modes may be managed manually or automatically by the SP The sensor driven process may be used when the profile has many entries that need to be filled, and/or enough battery and processing power is available (FIG. 28). A user or SP may choose a sensor configuration or sensor profile where the sensors are 'always-on', in order to gather a maximum of sensor data. For each sensor that is active, the directly deducible profile entries, or the possible features and buildings blocks are deduced. Next, it may be verified which profile entries may be deduced based on the produced building blocks, and if for those entries all the required blocks are available. It may happen that a certain building block is used in an entry, but that that entry in addition requires other blocks that are not available because the appropriate sensor is not available or active or not enough data is available. In this case, the SP may adapt the sensor configuration in order to obtain the missing sensor data and information. This modification may depend on the available sensors, and processing and power resources. The SP may automatically operate the sensor assembly according to the modified sensor configuration, or may ask the user for permission first. This sensor configuration modification may be an instant static modification, or may be a dynamic configuration that changes over time, in order to collect the sensor data at the appropriate times.

The profile driven process may be used when the user or the system (SP) requests the verification or filling of a certain profile entry. The request may also come indirectly from a third party. The profile or entry driven process may be initiated when the user manually enters a profile entry, and the system requests a verification or validation of the entry to see if the entry was correct, i.e. if the user was telling the truth. For example, suppose the user indicates that he or she eats healthy. To verify this manual entry, the system may check the grocery stores and restaurant the user visits, to see if the correspond to healthy eating habits. Similarly, if a user indicates he or she practices sport on a regular basis, the system may decide to monitor the GPS and inertial sensor data to verify this entry. For the verification process, the system may first check if the required sensor data or features are already available and stored for the user. If this is the case, this data may be used to verify the profile entry. If some or all of the data or features are missing, the system may set up a sensor configuration or profile that enables the verification of the entry.

Figure 29:
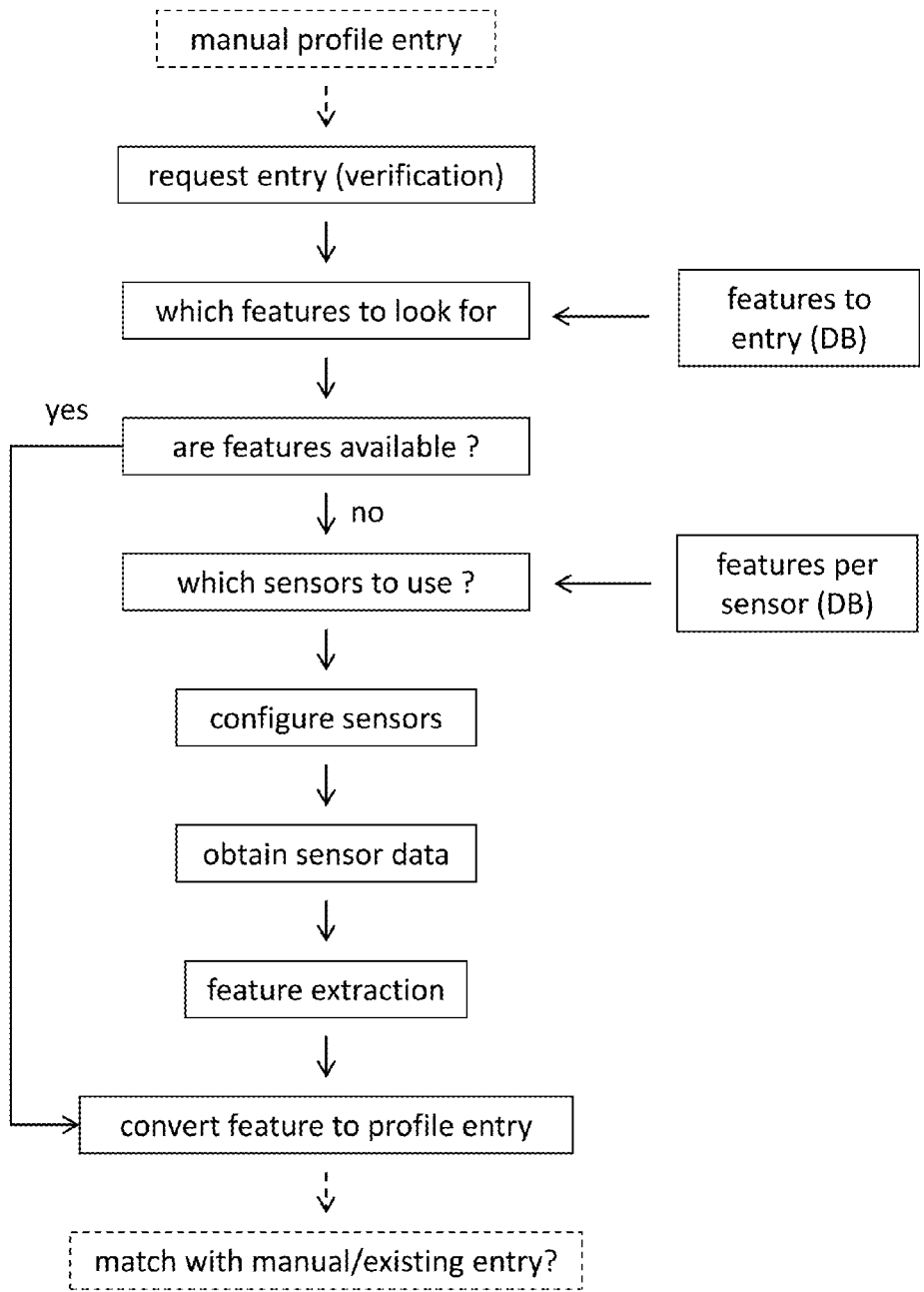
FIG. 29 is a schematic diagram showing a request to complete or verify a profile entry, according to an embodiment.

The profile driven process after a request to complete or verify a profile entry is shown in FIG. 29. This process makes use of the same databases as in FIGS. 27 and 28. First the 'features to entry' DB is used to determine what features to look for when verifying a certain entry. If the features do not exist (e.g. stored on some form of memory) or cannot be deduced from existing sensor data, next the 'features per sensor' DB is used to determine which sensor to use and how to convert the sensor data into features.

The database that is used to convert the features to a profile entry may be constructed in different ways. The DB may be created manually by the SP or a third party (may be suggestions from a user). In this case, sets of rules are defined manually between a certain entry and certain features. In the example of the healthy eating, this means that a list of grocery stores and restaurant is provided that corresponds with healthy eating. The manual creation takes a lot of effort to try to cover all the possible features (in this case possible stores and restaurants). It may therefore be preferred to automate the creating process where and whenever possible. This means that the required relations between the sensor data, the features, and the profile entry may be based on an analysis if a plurality of user profile and the sensors, sensor data, and features used to obtain the profile entries in those profiles. In one example, the manual entries by different users may be used to construct the database rules. A group of users may all indicate that they eat healthy. For this group the system may monitor the grocery stores and restaurants they visit. By having enough data and statistics, a relation can be established between eating healthy and the grocery stores and restaurants that are associated with it. A correlation strength can be calculated between the features and the entry, which can help determine the confidence factor.

Figure 30:
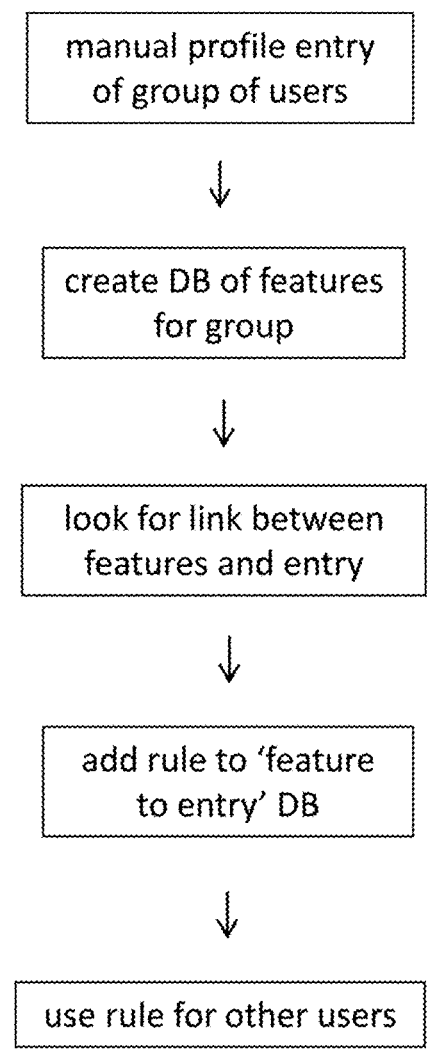
FIG. 30 is a schematic diagram showing manual profile entry, according to an embodiment.

This process is shown in FIG. 30, which shows that the manual entries of certain users can be used to construct the 'feature to entry' DB that may be used for other users. The weight of the contribution of different users may be adapted based on their history. For example, the contribution for users that are known to add correct data may be increased. The database that is used to know which features to extract from the sensors can be constructed using similar methods.

The feature extraction may be done immediately when the sensor data comes in, or may be done at a later (predefined) time. The more the features are complex and require more data, the more chance that this process takes time. In other words, construction the building blocks may take a certain amount of time. The construction of a building block may be started when some of the data required for the blocks has been transferred. A process may be started to check if all data is available, and if data is missing, a periodic check for this data may be started until the building block is finished. This means that a building block may have some sort of 'subscription' to data from a predefined DCO, and any time new data is produced the building block process is executed and it is verified if all required data has been made available so the building block can be finalized. A similar process may be used to construct the profile entries based on the building block that are, and will become, available. The same data 'subscription' may also be used to verify that the entries do not change over time.

Figure 31:
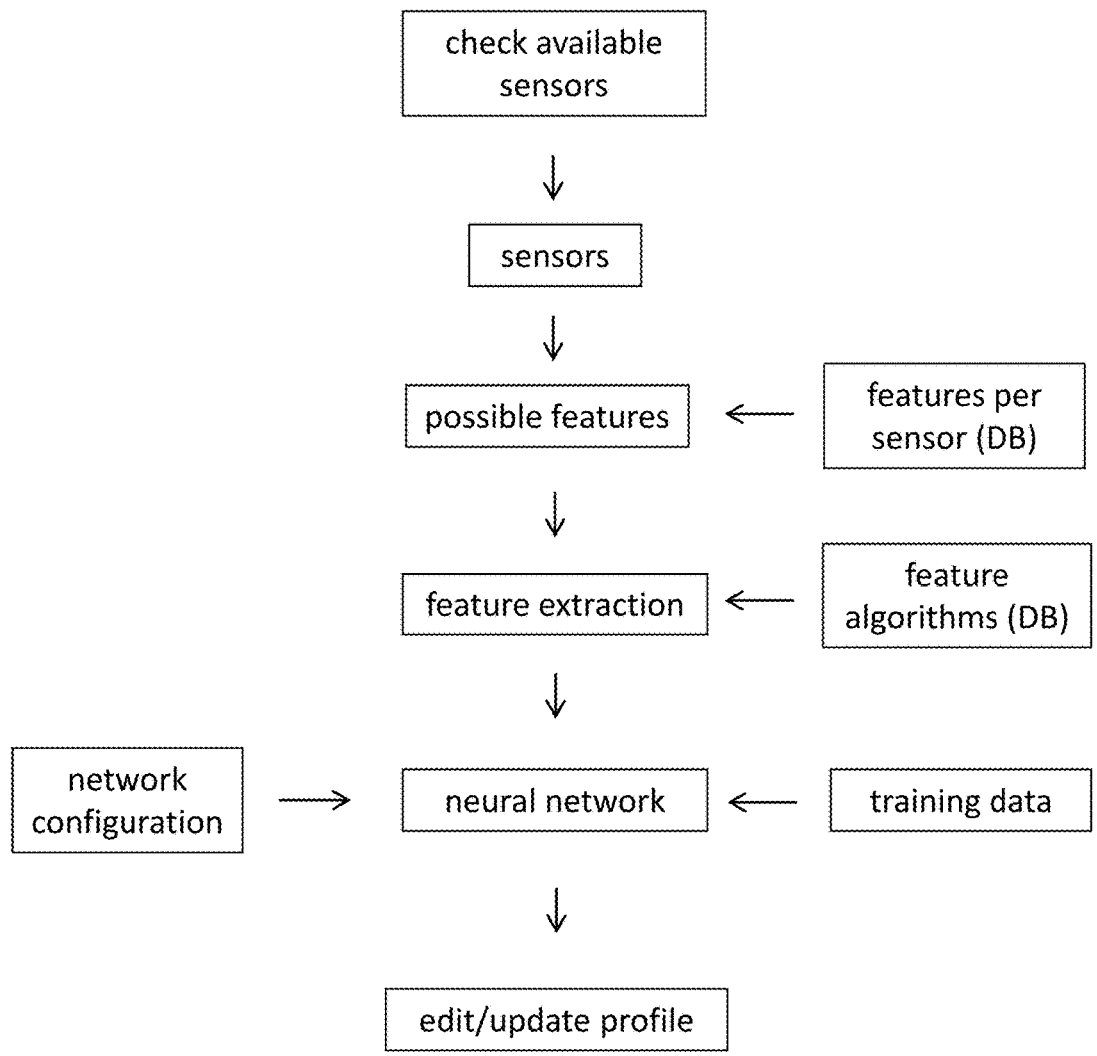
FIG. 31 is a schematic diagram showing determination of a profile entry using a neural network, according to an embodiment.

In the discussion above about the deduction of the profile entries from the sensor data, a 2-step method was presented as an example. Other methods using more or less steps also exists and may lead to the same results. In some embodiments, neural network may be used, which may replace all or some of the algorithm or steps discussed above. A mix of strategies may also be used combining neural networks with e.g. the 2-step methods discussed above. For example, for some profile entries a 2-step method may be used, and for other profile entries neural networks may be used. The best option may depend on the type and complexity of the required analysis and transformation of the sensor data. In some examples, a neural network may be used for the complete deduction from sensor data to profile entry, meaning that the sensor data is the input of the neural network, and the profile entry is the output of the neural network. In other examples, a first step may consist of extracting one or more features from the sensor data, and in a second step these features are used as an input to a neural network in order to deduce the profile entry (FIG. 31). The training data for the neural network may be provided by the user, for example by using manually entered data from other users. In some embodiments, the neural network may output a confusion matrix which may be used for classification of the profile entry. In addition the confusion matrix may be used to calculate a confidence factor.

User Status

Different users may have a different importance in the eyes of the SP or in the eyes of the different vendors or third parties. This importance may be expressed as a status, and thus the users have a different status for the SP and for a particular third party. One or more profile entries of the user profile may be related to a user status. As will become apparent from the examples below, the status for the SP and the third parties may be linked, where a high status for the SP also means a high status for the third party. The status for the SP and the status for the third party may be part of the profile as a profile entry, or may be separate parameters that are used in the monetizing options, data valorization, or other forms of compensation.

Status for the SP—The SP constructs profile entries from the data the user provides. Some data may be self-explanatory and immediately useable for a profile entry, but some data may need to be processed using e.g. an algorithm or a model before it can be used for a profile entry. In order to develop these models, the SP may need the help of the users. The help of the users may be in the form of user annotation.

For the SP, an ideal user provides a large quantity of data, with a high quality and a high frequency, covering a wide range of different fields, and with a good annotation when required. This would help construct a good profile for the user, and in addition develop algorithms or models that may help other user construct their models even if they provide less good data with little or no annotation. Different users have different capabilities and knowledge per specific fields, and therefore can provided annotation at a certain level. For example, a tennis player with an electronic racket may provide sensor data from his or her racket, and may annotate the types of swing. This user may not be able to determine if the swing was correctly executed or not. A tennis teacher on the other hand, would be able to annotate the tennis swings with more precision, indicating if the swings are good or bad, and maybe why. In addition, the tennis teacher will play tennis more often, and can therefore provide more tennis related data. Therefore, a tennis teacher is more important for the SP than a regular tennis player because the teacher can provide more data, annotated with more information or precision. Annotation may also be the user manually filling some profile entries, and maybe indicating which data events relate to that entry. For example, a user may indicate that he or she is eating healthy, and when the user goes to a grocery store or a restaurant, the user may indicate if he or she considers that that location fits with the healthy eating entry (or not).

In the introduction it was mentioned that the purpose of collecting the sensor data and sensor data annotation is to construct (better) models and algorithms. An advanced user, probably with some technical background, may also be able to provide insight or help construct these models. In this case, the user may be a person or a company. These factors may also be taken into consideration for the status definition.

Figure 32:
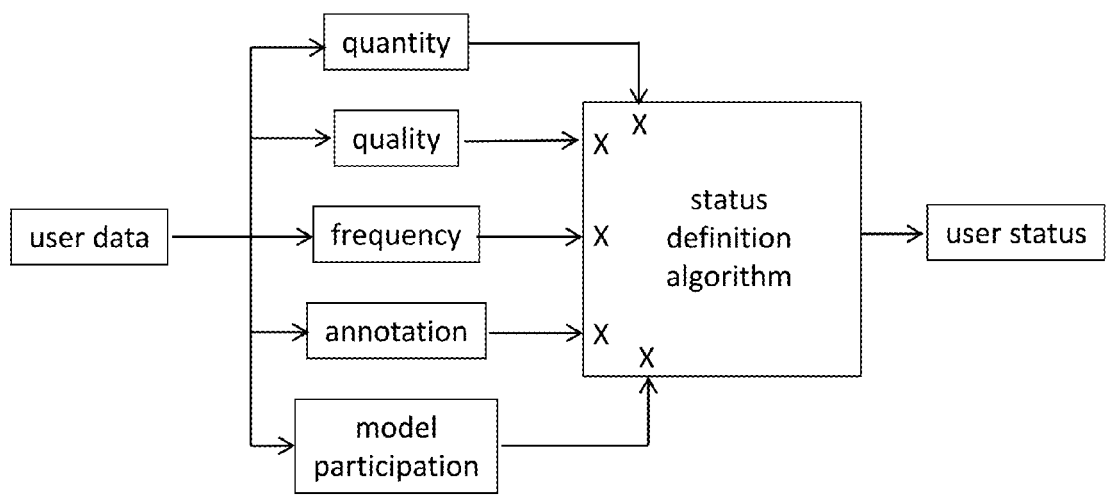
FIG. 32 is a schematic diagram showing determination of a user status, according to an embodiment.

FIG. 32 shows the principle of converting the user data into a user status by a status definition algorithm. The different factors of importance are extracted from the user data, and may each be given a different weight in the algorithm. The factors that are shown merely serve as an example.

The status may have a dynamic character, where the user has to continue his or her contribution of sensor data in order to maintain the current status. This avoids users from stopping to contribute once a certain status is achieved. Therefore, the frequency of the contribution of sensor data and sensor data annotation is important. The dynamic behavior of the status may be directly linked to the dynamic behavior of the sensor data contribution. The SP may define rules or algorithm controlling this dynamic link.

The status may be defined taking into consideration the entire profile, or a status may be defined per category or field (of interest). A user may have a high status in one field and another status in other fields. The different statuses of the different fields may be combined to generate an overall status.

A user with a higher status may receive more and/or better deals from the SP. For example, the user may provide monetizing options with a higher frequency, or may take a smaller commission in favor of the monetary benefit of the user.

A high SP status may have benefits for the user. For example, the SP may give the user beneficial treatment by increasing the quantity and quality of the monetizing options and other forms of compensation.

Status for a vendor—A vendor or third party may not care how much data a user provides to the SP, but may rather be interested in if the user can help the vendor sell more of the vendor's goods and/or services. A user may purchase something from the vendor himself, or may incite one or more of his connections to make a purchase. For example, consider a user that likes to go trail running and would like to buy new trail running shoes. If that user runs a lot, he or she will need new shoes often, and therefore this user would be more interesting than a user that runs very little and thus does not buy new shoes very often. Similarly, if that user has friends who also do a lot of trail running, it would make the user even more interesting for the vendor. Therefore, a user that runs a lot, and has many friends that run also has a high status for the vendor selling running shoes. It is obvious that if a user does not, or rarely, buys products similar to those that the vendor sells, that user has a very low status for the vendor or third party.

Using the example of the tennis player and teacher, it become apparent that there is a link between the status for the SP and the status for the third party. A tennis teacher will most likely know more people that play tennis. Therefore, if a vendor of tennis product provides the teacher with interesting deals, the teacher may send more potential clients to the vendor. In this case the teacher has a high status for the SP and for the vendor of tennis products. Very often, a user with a high amount of knowledge in a certain field also has many connections in that field.

It is of interest to the vendor to provide an interesting monetizing option to a user with a high status because this will make that user satisfied, which means that he or she may come backhand, even more important, may incite one of his or her connection to go to the vendor.

The status may be defined taking into consideration the entire profile, or a status more be defined per category or field (of interest). A user may have a high status in one field and another status in other fields. The different statuses of the different fields may be combined to generate an overall status. A vendor is usually only interested in the status in the vendor's field.

The example of the runner buying shoes is an example of a purchase event with a very low frequency. For some type of vendors, the frequency of the visits of a user may also be important. Staying with the example of the runner; the user may go running on a regular basis in the neighborhood of a vendor who might provide him or her with refreshing drinks after the run. For a vendor it is interesting to have a client that returns on a regular basis. So, to this vendor, a user who is a potential high-frequency client should have a higher status. If, in addition, the user is a runner that is usually running together with other runners, it means the user can bring more potential clients to the vendor. The group-effect may even be more than linear because a runner in a group is more likely to have a drink for the social effect (a runner by himself may just have a drink once he or she gets home). The third party status may comprise the different characteristics of how the user may bring business or revenue to the third party, such as e.g. the frequency of business, the connections the user may incite, etc.

Figure 33:
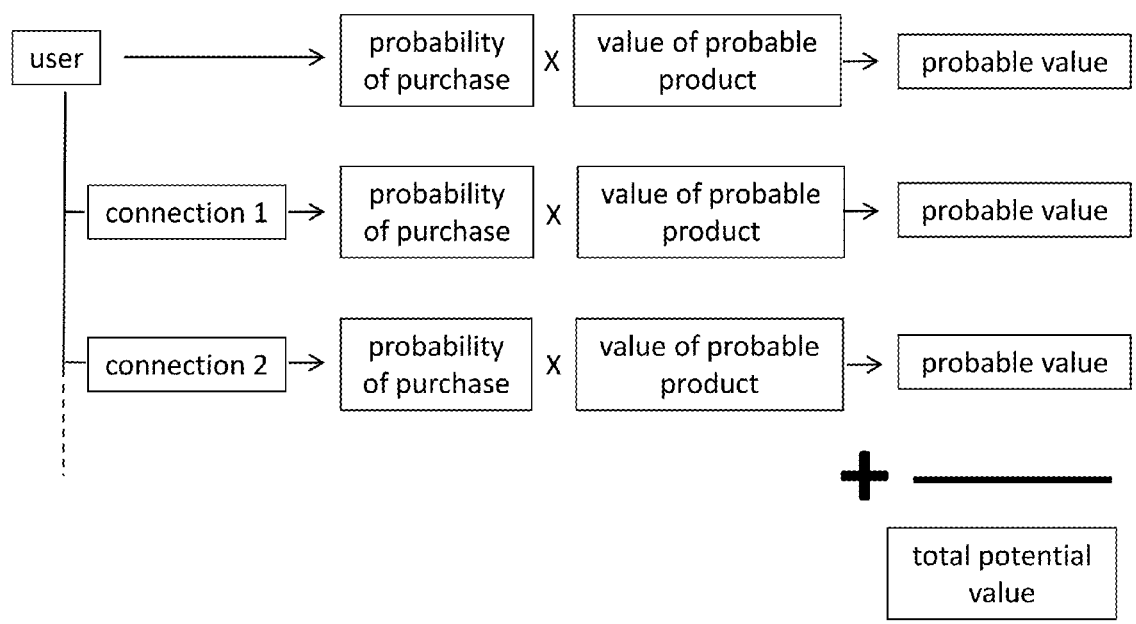
FIG. 33 is a schematic diagram showing the effect of user status on profile value, according to an embodiment.

The third party status of the user may be expressed in the potential revenue that the user may bring to the vendor. The calculation of the potential revenue may also take into consideration the connections of the user. FIG. 33 shows an example of the calculation of the status as expressed as the total potential value to user may bring to the vendor. The figure will be explained staying with the example of the runner looking to buy new trail running shoes. The user may indicate to the SP he or she would like to buy new frail running shoes, and the SP contact the vendor to make a personalized offer for the user (for more detail on this mechanism see the discussions further below). Based on the profile information the SP provides the vendor about e.g. the running habits of the user, the vendor makes a proposal. The sales value (or margin) of the proposed product may be multiplied by a factor taking into consideration the probability of purchase, giving the probable value. If the user lives close by, or passes on his or her way to work, the probability may be high. If the user lives far away the probability is much lower. The SP may estimate these factors of importance based on the past habits of the user (e.g. how far does the user normally drive to buy stuff), or based on a more general analysis of a group of users or all users.

In addition to the probable value of the user, the probable values for the user's connections may also be determined. For each connection the probability of purchase should be determined. For the connections this may involve an additional factor. In the example, the user has stated that he or she is looking to buy new shoes. However, the connections have not made such a statement. Therefore the SP has to include a factor taking into account the likely necessity of a purchase for the connections. The SP may do this by comparing the date of the latest purchase of running shoes with the average, amount of time (or km) in between the purchase of new shoes. An additional factor to take into consideration is the likelihood that the user incites the connections to go to the vendor. This factor may be determined based on previous action and monetizing opt ions of the user. The SP or vendor may stimulate the user to do so, e.g. by promising an additional discount in case his or her connections make a purchase.

In this example, the probable value calculation was focused only on the product that the user request a monetizing option for. However, if the vendor also has other products to offer that might be of interest to the user, these products may also be included in the calculation if the likelihood that the product is of interest to the user is taken into consideration.

The calculation of the probable value for the vendor depends on the product. This means that the value may be calculated once the request of the user is known. If there is no request, the value may also be derived based on e.g. the past purchase history of the user. The probable value for the vendor, which in this case may represent the status of the user, may be send to the vendor with the request for the monetizing options (see discussion further below).

Value

The generated profiles are used in monetizing options to gain compensation for the users. This means that a user profile has a value. Since the profile is built from data, the data has a value. Because of the triangular relationship between the user, the SP, and the third party, there is value for each of the parties. In general, any suitable technique may be applied to establish a value for a profile entry.

Figure 34:
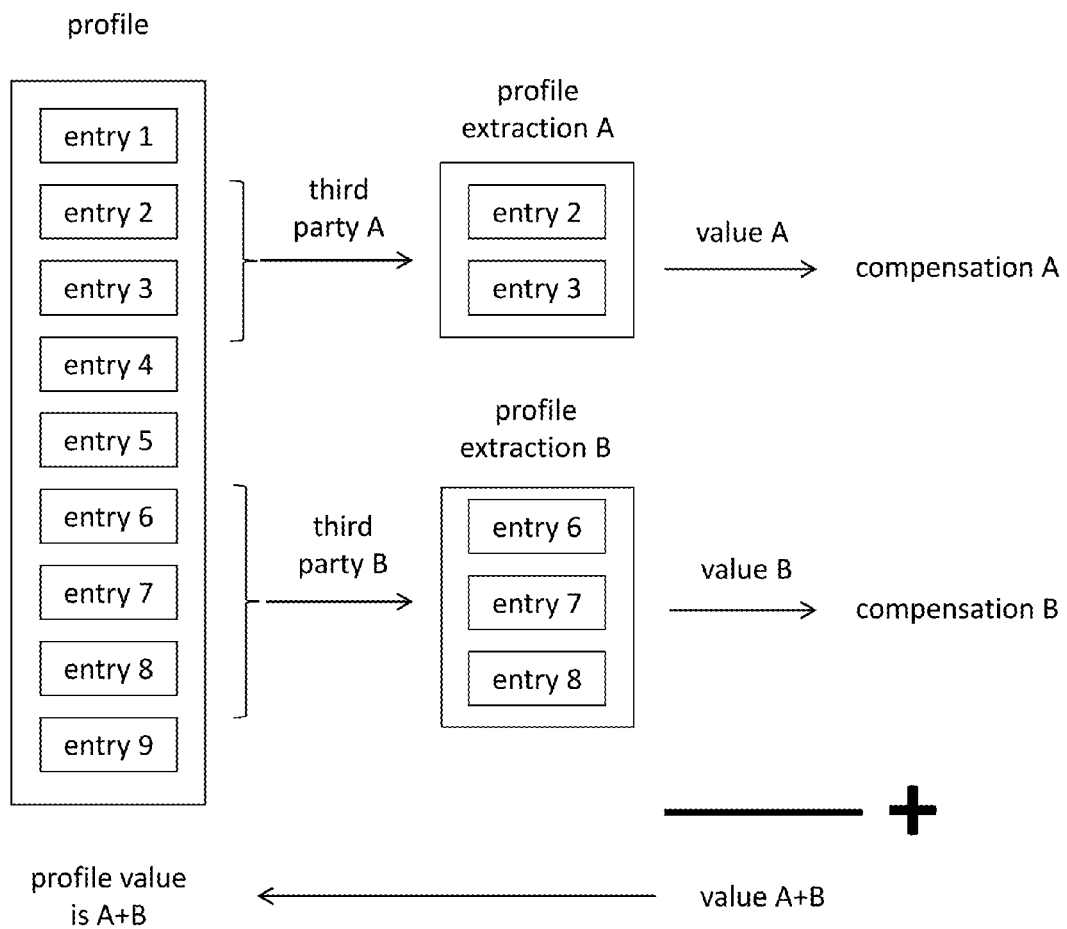
FIG. 34 is a schematic diagram showing a routine for establishing a value for an exchangeable profile, according to an embodiment.

Value of a profile—When a user obtains a monetizing option with a certain compensation from a third party based on some amount of information extracted from the profile, it can be stated that this information has that value. For example, the exchangeable profile, derived by transforming at least one profile entry as described above, may be transmitted to a third party and compensation may be received in return. The term transmitting may not necessarily mean that the information is transmitted to another device, for example a device belonging to the third party. The third party may be represented by a module or application running on a SP server, and in this sense the term transmitting means that the third party will have access to the 'transmitted' information. FIG. 34 shows an example of the calculation of the profile value. The SP arranges compensation A and B for a user by transmitting to third party A and third party B exchangeable profiles extraction A and B, respectively. This means that the combined value of the profile extractions has a value A+B. The value of the exchangeable profile equals the sum of the values of all the profile extractions. In other words, for the user the value of the profile is the sum of the value of all the compensation that he or she has obtained. This value may be referred to as the actual, historic, or obtained value because it is based on actions that have taken place. This value may be the sum since the date the user has created his or her profile, or may be expressed for a time period, such as e.g. per month or year. An average historic value per time period may be determined per user, for a group of users (e.g. users with a similar profile as the user), or for all the users subscribing to the service. Thus, a value for the exchangeable profile may be determined by aggregating established values for a plurality of transformed profile entries.

In most situations, the vendors exchange a monetizing option against a collection of information, and not just a single item of information. FIG. 34 shows, for example that for compensations A and B, entries 2-3 and entries 6-8 are used, respectively. From these equations, it is not possible to deduce the actual values of a particular transformed entry. However, as more and more monetizing options are used, with different combinations of entries, the actual individual entry values may be deduced for the user. For example, establishing a value for the transformed profile entry may be based at least in part on comparison to at least one completed exchange. The at least one completed exchange may be a previous exchange that concerns the user, but may also concern other users. By maintaining a database of exchanges, average values may be determined for profile entries. Moreover, relating the values to the sensor configuration used to obtain the sensor data may be used to guide the setting of the configuration. The value may also be established based on a request from a third party. Further, by analyzing the monetizing options of a group of different users, the number of combinations of entry combinations that yield a certain value may enable the determination of a value for each specific transformed profile entry. This may bean average value of each profile entry. However, some entry may only have value when combined with other values. In this case, the value of the entry combination can be determined. Assuming that statistically, the different users have different privacy settings, the influence of the privacy settings may also be determined for each profile entry, such as by associating the value with a given granularity of the entry data in the transformed profile entry. In other words, a statistical analysis of all the monetizing options and other forms of compensation with different entries and privacy settings, enables the calculation of the average value of each profile entry (as a function of the privacy setting or granularity). The influence of the privacy on the value helps the SP show the user how the value changes when he or she changes a privacy setting. For example, the compensation may be based at least in part on the granularity level of the entry data. A statistical analysis of all the users may include users with many different characters, habits, etc. If statistics allows, a similar analysis may be performed on a reduced group of users, where a selection may be made to choose users that are as similar as possible to a particular user. The profile entry values thus calculated are more relevant to that particular user. Accordingly, the established value for a transformed profile entry may be adjusted by selecting and applying a different granularity level. To optimize compensation, the different granularity level may correspond to a maximum obtainable granularity level.

The individual values of the profile entries for a certain user may be summed up to determine the value of the complete profile. However, it may be very difficult for a user to take full advantage of each profile entry. This profile value may therefore be referred to as a theoretical or hypothetical profile value. By averaging the value over all the users, or a group of users, the SP may determine an average theoretical profile value.

Instead of this theoretical profile value, the SP may also be able to determine an expected or projected profile value for a particular user. For example, suppose a user subscribes to the service and starts with an empty profile. At this point nothing is known about the user, and therefore the expected profile value may be equal to the average profile value. As the user contributes data and the profile is built, the user can be gradually compared to a smaller group of users with similar profiles. The expected profile value then equals the average profile value of the smaller group of users. The more the user builds his or her profile, the more accurate the expected value can be determined. If the buying/spending habits of the user are known, for example through purchase or bank records, the SP may be able to calculate the expected monetary gain for the user based on the user profile and the historic monetizing options of other users for similar products and/or goods. Here the same reasoning is valid; the more the SP knows about the user, the smaller the group of similar users, and the better the estimation of the expected value.

The discussion above was focused on the value of the profile and entries for the user. In most situations, the SP will receive a small commission when the user uses a monetizing option. This means that many of the calculations above can also be done for the SP's commission instead of the compensation for the user. For example, based on all the commission the SP receives on the use of monetizing options, the average total commission for a user profile or profile entry can be determined.

All the different types of values discussed here can be determined per profile category. This means for example that the user can get feedback on the value of the profile related to his or her car, house etc.

As discussed in the section on the dynamically of the profile, a profile is not static. A profile must be kept up to date by providing data so the SP can keep verifying that all the profile entries are still correct. The confidence in a certain profile entry decreases over time as discussed above. In one example embodiment, it may be assumed that there is a direct/linear relation between the value and the confidence factor, meaning that if the confidence decreases by a certain factor, the value decreases by the same factor. In combination with the value calculation above, this means that for all the different types of values discussed, a prediction of the change of these values over time can be made based on the change of the confidence factor over time. Even for non-linear relations between the value and the confidence factor, such predictions may be made.

Value of Data—

The discussion above shows that the value of a profile can be determined from the obtained compensations in a rather straightforward method. When going more into detail to determine the value of a profile entry the calculation becomes more complicated and requires more statistics from different user to determine the relations between the profile entries, and the profile value. When trying to determine the value of sensors or data, one or more additional complex layer are added to the equation.

Each profile entry is based on data from one or more DCOs or sensors. If an entry can be deduced by using just one sensor or DCO, the value of that entry may be attributed to the sensor. In one aspect, the value may be based in part on the activity of the sensor. The sensor activity for the profile or profile entry must be registered and associated with the profile and entry in order to performs such an evaluation. If more than one sensor is used for the deduction of the profile entry, the value for that entry has to be divided over the sensors or DCOs. As a first order approximation, this division may be done in equal parts. For a more accurate calculation, the contribution to the entry for each DCO has to be determined and quantified, and used as a weight in the division of the entry value for each sensor. This contribution may be calculated by quantifying the data from the DCO used to determine the profile entry. The data quantification may be based, for example, on the amount of data points, the amount of kBytes, the time of operation of the sensors, the battery consumption of the sensor, the frequency of the data, etc. Once the contribution to the entry has been quantified, the value of the entry may be divided over the DCOs according to their contribution.

By adding the different value contributions to each entry, the total value for each sensor or DCO can be calculated. This value may also be expressed, for example, per amount of data points, per amount of kBytes, per amount of sensor time etc. This may be done for each DCO, but also for all the sensors combined, giving the total value per amount of data points, per amount of kBytes, per amount of total combined sensor time etc.

Although this discussion shows how to determine the value contribution of the difference DCOs and sensors on a profile entry level, a similar calculation can also be done at the complete profile level. For example, for each sensor or DCO, the total amount of data points, the total amount of kBytes, the total operating time of the sensors, the total battery consumption of the sensor, may be determined and quantified per DCO. In this case 'total' means the contribution to the entire profile. The value of the entire profile may then be distributed over the different DCO according to the results of this quantification, which then gives the value of the DCOs.

Based on the methods discussed above, it may be possible to determine to value of the sensor configuration, including different sensor profiles and sensor settings. This may be done with respect to one profile entry, or with respect to the user profile as a whole, including a plurality of profile entries. A sensor configuration may be derived based on a requested amount of compensation. A sensor configuration or profile with more sensors which are in operation more time, will yield a larger value. Therefore it is of the interest of the user to use as much as sensors as possible, most of the time. However, the downside is that more sensors means more processing power and more battery usage. The expected value may be determined for the different possible sensor profiles, and may be indicated to the user when he or she has to set the sensor profile, in order to persuade him or her to use more sensors. The SP may advise an optimum sensor profile for the user biased on the users habits. For example, for a user who recharges the phone every night, the optimum sensor profile is the one with a maximum amount of sensor activation while making the battery last until the next charging at night. A similar reasoning also goes for the potential costs of transmitting the data. For example, if a user has to pay to transmit the data to the SP, the cost of these transmissions may be taken into account in the effective value calculation.

The calculation performed above to determine the value per sensor or DCO may also be performed per device in a similar manner. This information may be used as a marketing tool. For example, when the user is interested in buying a new device equipped with one or more sensors, the SP may be able to predict the value gain based on the user's profile and/or information from other users already using the device.

Compensation and Monetizing Options

Figure 35:
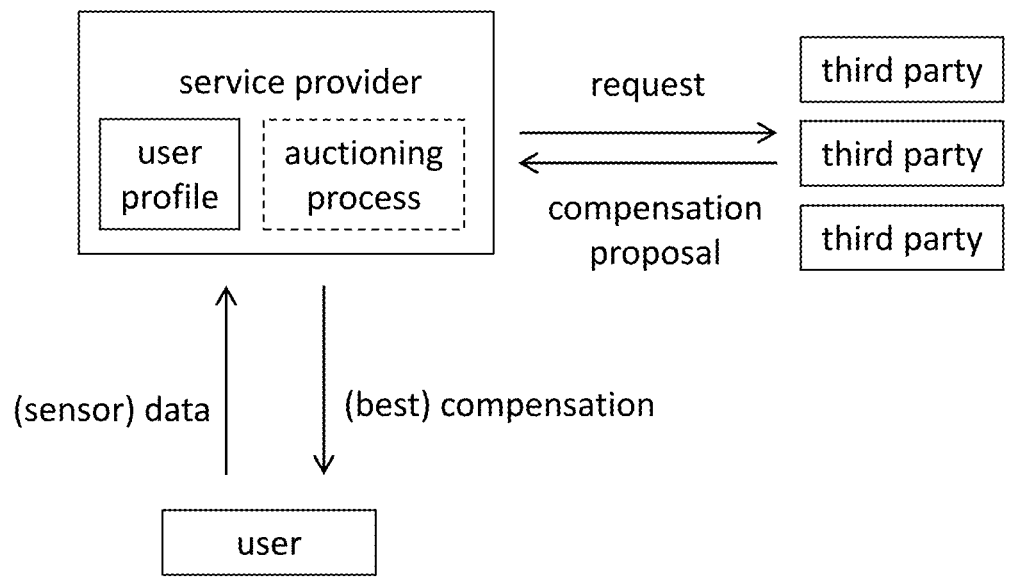
FIG. 35 is a schematic diagram showing the relationship between an exchangeable profile and compensation, according to an embodiment.

Once the user has constructed a profile, the SP may use the profile to generate monetizing options and other forms of compensation for the user. As discussed in the section on the privacy management, the SP uses the exchangeable profile to generate these options. As the name implies, the monetizing options provide a way for the user to obtain a compensation in exchange for information from his or her profile, and it can be seen as a reward for providing the (sensor) data (FIG. 35). The monetizing option may be initiated by the user or by the SP. Different options are available, such as for example:

"Personalized offer" The SP arranges a personalized offer for goods or services for the user. In one embodiment, the SP 'negotiates' the best possible offer (compensation) by an auctioning process among vendors or other suitable negotiation, using the user's profile as a way to incite the vendors to make their offers. In another embodiment, the user may deal with a single vendor or third party, but negotiate the offered information against the provided compensation. A combination of the different embodiments is also possible. The offer is personal, and the user needs proof of the offer, e.g. a coupon, in order to redeem the offer at the vendor. The obtained discount may be considered the compensation. The SP receives a commission for negotiating the offer.

"Advertising" This type of advertising is similar to the offer in the sense that the SP contacts vendors and offers the vendors the option to propose an ad to the user based on the user's profile. The vendors pay a fee to be able to propose the ad to the user. An auctioning process among the vendors or other negotiation, for example for the highest fee, may decide the vendor that may propose the ad. In contrast to the personal offer, the ad is not personal and the goods or services promoted in the ad are available to the general public at the same price. The vendor's fees for the ads may be considered the compensation.

"Questionnaires:" Vendors, manufacturers, and providers of goods and services may be interested in the feedback of users on their goods and services. The SP can provide a service to those parties interested in making a survey by selecting the appropriate target user based on the user profiles. The party ordering the survey pays the user a fee for filling out the questionnaire.

The monetizing options can be generated after the profile has been created. The monetizing options may be generated by the same SP that has also created the profile. Alternatively, more than one SP may be allowed to provide monetizing options (see also FIGS. 15 and 16). In this case, the profile will be provided to each SP. A specific SP may be specialized in monetizing options for a specific field. In this case this SP may only handle the monetizing options for this field using an adapted/reduced profile. The different SPs may all be independent and in contact direct with the user, or a central SP may control the SPs.

The profile may also be generated based on proposed compensations. For example, based on request from a third party that offers a certain compensation in exchange for certain profile information, the SP may take steps to generate exchangeable profiles with the desired information. The SP may adapt the sensor configuration in order to enable the generation of this desired information. The SP may request permission from the user before making the required sensor configuration changes.

The SP takes care of creating a vendor and third party database that contains all the required information for the monetizing options and other forms of compensation. These databased may contain entries comprising characteristics of the third parties. A certain vendor may provide more than one type of monetizing options, and the selection which option to choose may depend on the user profile.

In all the monetizing options, the user profile is used to provide information about the user to the provider of the monetizing option. The exchangeable profile, derived by transforming at least one profile entry as described above, may be transmitted to a third party and compensation may be received in return. In addition, the user status for the vendor may be provided as part of the profile or separately. From the point of view of the vendor what is interesting is the expected revenue from the user based on his or her profile and the past bought items, and a confidence of the calculation of that revenue. The SP will provide this information for each interaction with a provider of monetizing options.

The different monetizing options will now be discussed in detail.

Personalized Offer

Initiating an offer—A personalized offer may be initiated either by the user or by the SP. Some users may prefer to only obtain offers if they initiate the offer themselves, and may feel bothered by offers initiated by the SP that they did not ask for. The user may set preferences on how he or she prefers to receive the offers. These preferences may be very general, e.g. selecting on high level the offer mechanisms he or she prefers, or setting the preferences for each mechanism in detail. In any case, the user must be/feel in complete control of how to obtain the offers. As such, the SP may identify a suitable vendor based on the user request, which may include a desired amount of compensation.

For offers initiated by the SP, the SP may match entry data in one or more profile entries of a user profile with a request or requests from third parties. Further, the SP may analyze the spending habits, necessities, and even the financial data in order to optimize the offers. For example, for some users at the end of the month the financial situation may not allow any leisure related purchases and therefore offers should be generated as a function of the estimated necessity for the user.

Manually submitting a request—To obtain an offer the user may launch a specific request to the SP. Using a tool or an application provided by the SP and running on one of the user's devices such as e.g. the user's smartphone, tablet, or computer, the user may indicate he or she is interested in purchasing particular goods or services. The amount of detail of the request depends on the user. For example, if a user would like to buy new running shoes, the user may specify exactly which shoes he or she would like to be. Alternatively, the user may just state that he or she want new running shoes, and then the SP, in combination or not with a vendor, may propose certain types of running shoes based on the information available in the profile (e.g. previous owned shoes, typical terrain, weight and age of the user, etc.). Upon receiving the request, the SP will look for the appropriate vendor in the SP's vendor database, and forward the request to vendors that potentially can present a personalized offer.

The user may specify a date or a range of dates for the request. In the example of the running shoes, the user may specify e.g. a certain week where the user would like to buy new shoes. The SP will then try to get the best deal for the user at the specified date(s). The offer made to the user for these dates may be optional, meaning no purchase is required, or the purchase may be obligatory, meaning that the user is obliged to buy the shoes from one of the offers according to the user's specifications. Financial mechanism or strategies may be put in place between the user and the SP for the user to honor his or her obligations, and if not some form of penalty may apply. The advantages and disadvantages in these arrangements may depend on the status of the user, where e.g. a higher status may bring more flexibilities in the form of less strict obligations. The SP may aggregate the requests from a plurality of users and may predict the demands for different goods and services. This information may have value in the negotiations with the third parties and lead to better compensation. The information, and improved compensation, may also benefit other users that did not necessarily make requests for a certain date. The extent to which these other users may benefit may depends on the status of the user.

Online search based offer—The SP may setup collaboration with an online search engine service in order to detect if the user is performing an online search for certain products or services. In a strict sense, this is like a manual request, but instead of declaring the request directly to the SP, the user uses an online search engine. In one embodiment, the search engine provider transfers the request to the SP who handles the processing of the request. The resulting offers may be presented to the user by the SP usual method (e.g. the SP's application), or may be transferred to the search engine provider who take care of the presentation.

In an alternative embodiment, the SP transfers the (relevant) exchangeable profile information about the user to the search engine provider, who then handles further processing of the request. The user may be made aware, or asked for permission, to transfer profile information to the search engine provider.

In the collaboration setup, the SP and the search engine provider must agree on how to divide any commissions obtained from the offers.

Offer by wish list—Instead of manually submitting each request, the user may also make a wish list of goods and services that the user is interested in. The user may receive offers when entering the items on the wish list, in which case the process may be identical to the manual submission. In addition, the user may decide he or she would like to periodically receive offers for the items on the wish list. While the manually submission is convenient for goods or service the user wants to buy on a short term basis, the periodic offers allow the user to track offers for things he or she wants to buy on a long term basis and wants to get the best deal possible. In the user preferences, the user may set when and how he or she wants to receive the offers based on the wish list. For example, once a day, once a week, manual trigger, when starting the SP's application, etc.

For periodic listing of offers it means that within the period that the user specifies, the SP will regularly handle the request of the user and filter the offers for that period to provide a selection to the user. The SP may specify to the vendor, if the request was manual or from a wish list, because this indicates the urgency of the purchase to the vendor, who may, or may not, adapt the offer accordingly.

Offer by proximity—A user may receive an offer when in the proximity of the vendor or a store. For example, when the user is walking into a mall he or she may obtain relevant offers. The user may receive those offers automatically when walking into the mall, or the user may trigger the offers manually. In the former case, the SP monitors the position of the user constantly to verify if there are any potential vendors in the neighborhood. In the latter case, the SP only has to check the user's position when the user triggers the offers. The offers may be made depending on the wish list of the user, or purely based on the user profile.

The user may set preferences on how to trigger the offers, and the preferences may depend on the types of offers (e.g. type of product, amount of discount, . . . ). The user settings may also reflect on when the user may be disturbed by the offer. For example, the sending of the offer may depend on the activity of the user, or on the available time. If the user is driving by the vendor, no offer should be made, but when the user is walking by, an offer may be made. The offers may also depend on the distance between the user and the vendor. The relationship may be dynamic, in the sense that the further the user is from the vendor, the more interesting the offer has to be in order to be considered. In these examples, the analysis by the SP of the user's profile, and the therefrom deduced user habits, is very important.

Activity based offer—An offer may also be initiated by the SP based on an analysis of the activity and/or position of the user. For example, a user may be shopping in a mall and visiting shops of the same kind e.g. to look for new running shoes. The SP may analyze this behavior of visiting the same kind of shops, and formulate an offer related to that kind of shop. Because the user did not specify a request, the offer may not be able to be very specific if the shop sells a variety of items; the shop the user in the example visits may sell shoes and clothes. In this case, the offer may be a generally formulated offer, such as e.g. 10% discount on any item. The SP may compare the items in the shop with the profile of the user, and if the user has recently bought clothes to go running, but his or her running shoes are quite old, the offer may become more specific for shoes. The SP may contact the vendors that own the shop that the user already visited (if they subscribe to the service) and because it is obvious that the user is present and looking to buy, the proposed discount may be an important differentiator.

An activity based offer may not only be based on activities where the user is already in some kind of shopping mode. The offer may be related to the present activity, or a past of future activity. For example, if the user has just finished a running activity, the offer may be related to getting an interesting offer on a refreshing drink somewhere in the neighborhood after the exercise. In another example, the SP may know that a user is planning to go eat in a restaurant (from habits or agenda) and may provide interesting offers for restaurants.

Vendor initiated offer—The user may receive offers from the SP where the action was initiated by a vendor. The SP may identify a third party, the vendor, by matching the transformed profile entry with a request.

For example, a vendor may be launching a new product and is looking to target users for that product. The vendor may contact the SP and setup a desired or ideal user profile for the product or the vendor. The SP may match the user profiles in the SP's database with the target profile, and propose these users the new product at a discount. This offer may be 'personalized' at a group level, but may even be further personalized within the selected group (e.g. people who lives further away may need a bigger discount as an incentive to come to the shop).

A similar offer strategy may be applied when a vendor is opening a shop at a new location, and would like to reach out to potential customers in the area.

Figure 36:
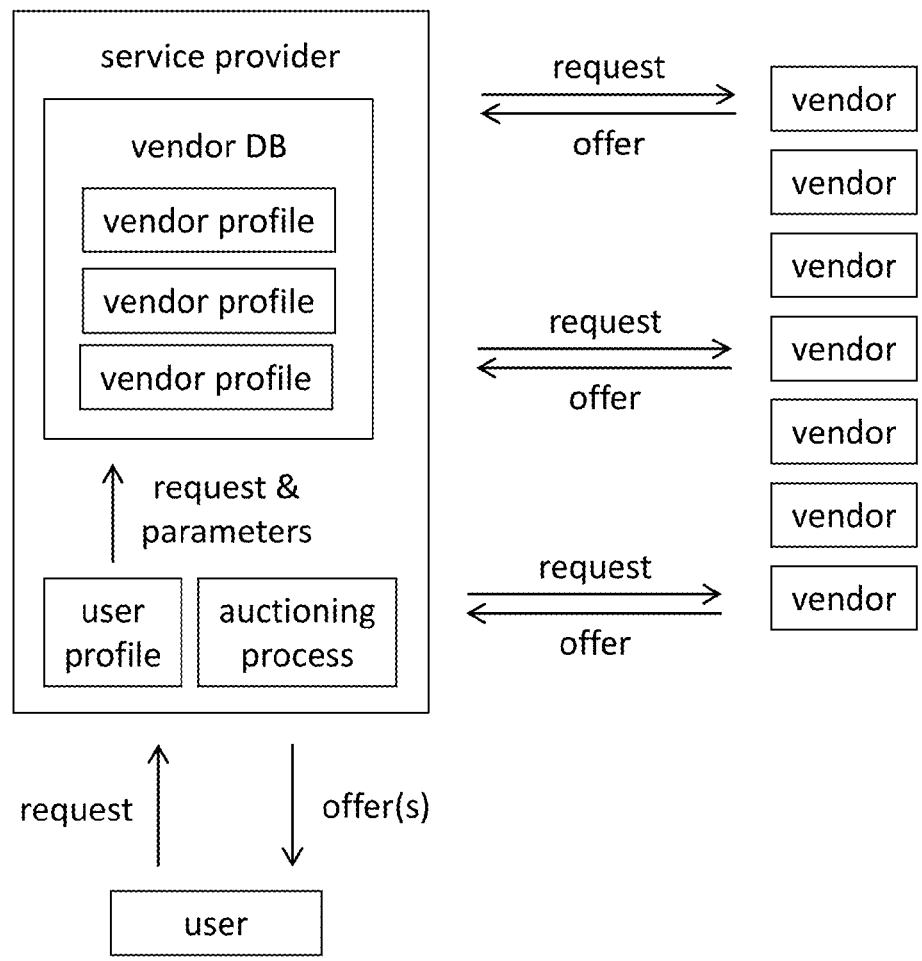
FIG. 36 is a schematic diagram showing the building of an offer, according to an embodiment.

Building an offer—Once a request has been submitted, manually, or automatically, the SP performs a search in the SP's vendor database in order to find one or more vendors that may be able to provide the requested item (FIG. 36). As such, the third party may be selected from a plurality of entities based at least in part on the compensation being offered and or the request. The search in the vendor database may be subject to certain parameters, some of which may be set by the user. For example, the user may set a certain distance he or she is willing to travel to go and redeem the offer. This kind of information may also come from analyzing the habits of the user. In this case, how far does the usually normally drive to specifically buy something.

The vendor database contains all the vendors subscribed to the service, and for each vendor a vendor profile is available. The vendor profile contains all the information needed to find the correct potential customer, such as the location and the types of goods and services the vendor provides. The offer creation process may be automated and the SP does not actually ask a person to formulate an offer. (It is possible that the vendor responds 'manually', but this usually takes more time). This means that the vendor must also provide all the information required to formulate offers based on the user's profile. This information may be part of the vendor's profile and contains a set of rules that determines the offer price or discount for the available items, depending on the user's profile. For example, if the user buys the item on a regular basis or spent a lot of money on the category of items the vendor sells, the vendor may indicate a higher discount to attract the user as a client. Similarly, if the user has a lot of connections that live in the neighborhood of the vendor and regularly buy related items, the vendor may propose an interesting discount, hoping that the user is able to bring some of his connections to the shop. In other words, the offer may be adapted depending on the status of the user (as discussed in the section on the user's status). The SP may provide the vendor with a parameter reflecting the probability the user will come to the vendor, based on the user's habits.

The SP may provide a vendor tool to the vendor to set and manage these rules. This vendor tool may be running in the cloud on the SP server and be directly connected to and integrated with the vendor database. The vendor can then change the settings through a remote access, similar to a web page, using e.g. a computer or smartphone. Alternatively, the vendor tool may run on one of the vendor's devices, for example an app on the vendor's smartphone or desktop computer. In this case, the vendor tool communicates with the vendor database remotely to set the offer parameters.

The vendor may be part of a chain of stores or franchises. In this case, it may be possible that the main office or headquarters may set part of the offers parameters and rules, and the local vendors may set different parameters or rules. Certain corporate parameters may overwrite local parameters (or vice-versa).

Part of the vendor profile may be created by the SP, and may even be unknown (or unchangeable) to the vendor. This information may be conceived automatically based on past offers and sales. For example, which offers are made to what kind of user profiles. The information may also be related to user feedback on the offer, the sales, or the vendor itself.

In order to increase the database of vendors subscribing to the service, the SP may contact non-associated vendors within a range of the associated vendors, and show them the potential loss of business by not being associated. In this case, a vendor profile has to be created by the SP based on the available information on the vendor.

FIG. 36 shows a global overview of the process. The vendors are shown 'outside' the SP. In this case, part of the programs and or applications are running on a system at the vendor, in communication with the SP. Alternatively, all the components are running on the SP's system, as building blocks of the complete process as explained above.

First offer—After receiving the request from the SP, the vendor formulates a first offer based on the user profile and user status.

Figure 37:
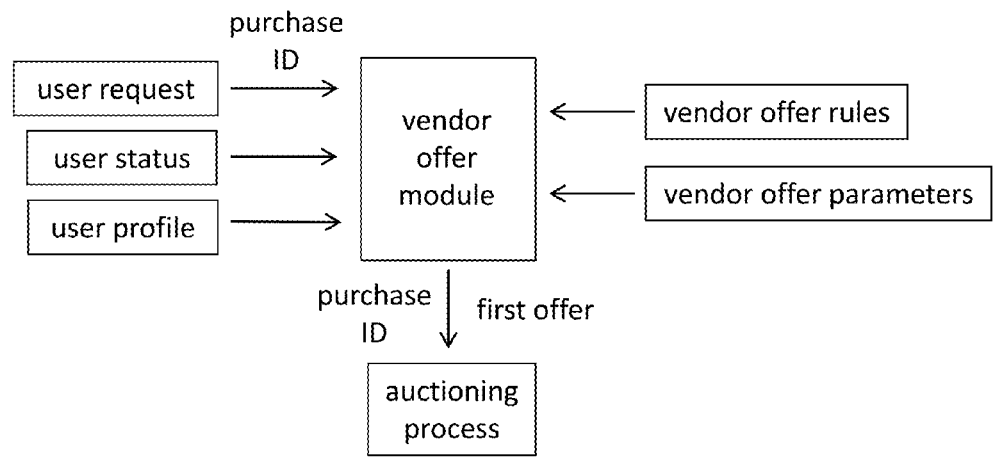
FIG. 37 is a schematic diagram showing exchange of information between a service provider and a third party, according to an embodiment.

The vendors can obtain the information about the user in several ways. The SP may send the relevant user information to the vendor along with the offer request (FIG. 37). Depending on the user's (privacy) settings, the SP may send the complete exchangeable profile, or only the relevant information in the form of a selection from the exchangeable profile. In the latter case it is up to the SP to select the relevant information from the user profile, and transmit a dedicated and reduced profile to the vendor. This selection may be influenced by the privacy settings of the user. The selection process may follow preset rules in agreement with the SP and the user. Alternatively, the user may decide which information to send to which type of vendor. The user status may be part of the user profile, or may be sent separately. As discussed above, the user status is adapted to the interests of the vendor.

The user profile information may be processed by a Vendor Offer Module (VOM), which receives the user information and the vendor offer parameters and rules as inputs. The vendor rules and parameters define what offer to make based on the profile and status information from the user, what amount of discount per type of information. The weight of the different profile entries in the discount can also be learned by the SP by analyzing the correlation strength between the performed purchases and the profile information of the users. Based on the information from both sides, the VOM may propose a first offer. The user may only be identified by the vendor by a purchase ID, which is linked to the user ID by the SP without the vendor's knowledge. The purpose of using a purchase ID for each new request is that the vendors cannot link multiple requests to the same user.

Figure 38:
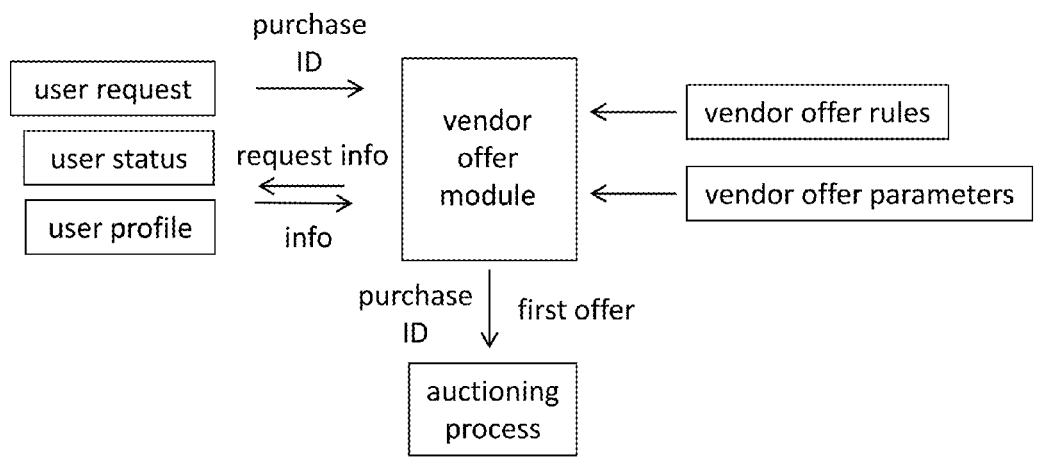
FIG. 38 is a schematic diagram showing exchange of information between a service provider and a third party using a purchase identification, according to an embodiment.

Instead of sending the user profile to the vendor with the purchase request, the SP may only send a purchase ID (FIG. 38). Upon receiving the purchase request, the vendor can 'interview' the user profile for relevant information. When responding, the SP can link the purchase ID to the correct user ID and user profile. The interview consist of the VOM requesting certain information from the user profile, and the user profile will provide the information if it seems relevant for e.g. the requested item and the category of the vendor. The VOM may refuse to provide information if the request is not relevant. For example, this can be based on the OpenPDS and SafeAnwser system (http://openpds.media.mit.edu/). These privacy rules may be set by the SP and/or the user.

The access to the user profile may be limited in time, where the time limit may be set by the SP or according to user preferences and may depend on the type of request or the way it was formulated.

Auctioning—The offers from the different vendor offer modules are input to an Offer Processing Module (OPM), so that the compensation by the user is determined in an automated auctioning process including the third party according to preset auctioning rules, typically involving multiple third parties bidding for the user's exchangeable profile. Many different types of automated auctioning and/or negotiating processes and algorithms exist in literature, and it is not the intent to discuss these here. The person skilled in the art will have no problem applying the methods cited in literature for determining the compensation of the exchangeable profile. What follows below is a mere example of a possible embodiment, which is in no way limiting. In its simplest embodiments, the OPM may pass the offers to the user without any action. The OPM may also select only the best N offers in order not to pass to many offers to the user. The OPM may order the offers on relevance, proximity, etc. . . . . The content of the exchangeable profile may also be determined in the automated auctioning process. Other negotiation techniques may be employed as desired.

Figure 39:
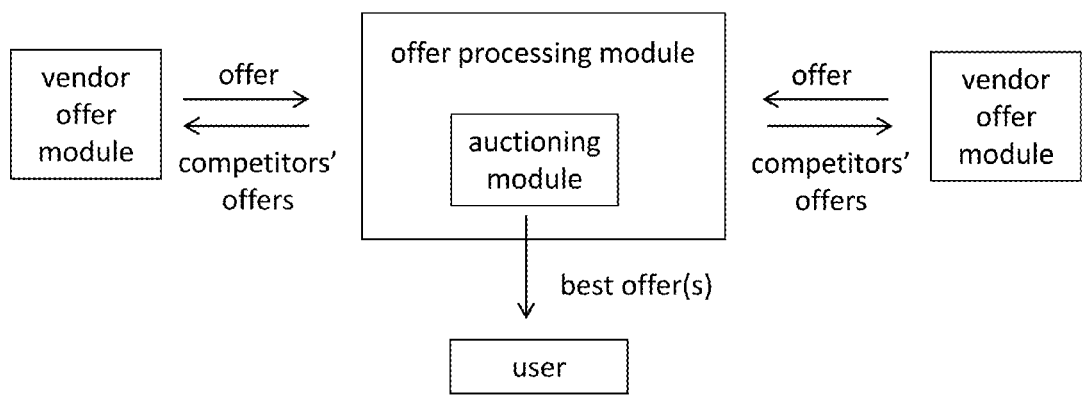
FIG. 39 is a schematic diagram showing auction process involving an exchangeable profile, according to an embodiment.

The OPM may also contain an offer comparison module or Auctioning Module (AM), which can compare the offers from the different vendors and regulate an auctioning process (FIG. 39). For example, suppose the AM receives and offer from vendor 1 and vendor 2. If vendor 1 has a better first offer than vendor 2, this might be made known to vendor 2, which can then decide to make a second offer better than the first offer of vendor 1. Because this may be an automated process, and there are not actually any people involved in this auctioning process, the auctioning rules have to be set in advance by the vendor. These auctioning rules may be part of the vendor profile, or may be stored separately.

In one example, each vendor may have various discount levels or percentages, e.g. 5%, 10% and 15%, that vary between vendors. For the first offer, the vendor may apply the lowest discount level. However, another vendor may have a higher first discount level, or a lower initial sales price, making the effective offer more interesting for the user. In this case the auctioning rules regulate when the first vendor may apply a higher discount percentage to obtain a better offer. The auctioning rules that determine when to overbid another vendor may depend, for example, on the user status, the proximity of the user, the number of relevant connection, etc. Thus, the auctioning decisions are based on a combination of the auctioning rules and the user profile. The auctioning rules may also take into consideration the profile of the other vendors participating in the auction. The auctioning rules may also take into consideration the time aspect of the offer. For example, certain offers may be only valuable for a certain amount of time, or the offer may decrease the longer the user waits. The SP may take into consideration the possibility of the user to actual go and redeem the offer, depending on the knowledge the SP has of the user's habits and schedule. The algorithm in the AM processes all the different rules, parameters, and aspects of the auctioning process, and calculates the best offer(s). The user may define how many (competing) offers he or she wishes to receive.

It may also be possible that the AM algorithm cannot determine what the best offer for the user is. For example, vendor 1 may give a better offer than vendor 2, but the offer is valid for a shorter period of time. In this case, both offers might be presented to the user, who can then decide. Such rules may even be included in the user profile, but may add a layer too complex for some users. Alternatively, some such problems might also be solved using other information sources. For example, using a user's agenda the SP might know in advance the user will not have lime to get for a time limited offer. But again, this may be a decision that the user may need to take, because his or her schedule might be flexible.

In addition to a flexible discount rate, the SP commission or fee may also be flexible. Similar to the discount level, the SP commission may also have different levels, meaning different vendors may propose different commissions for the SP. A similar strategy may be applied to the commission levels as was discussed for the discount levels above and the SP commission's may be changed during the auctioning process. For example, if the user has a high status for the SP, the SP may decrease the SP's commission during the auctioning if this gets the user a better deal.

There may be situations where the settings of competing vendors lead to best profit for the users while other offers lead to best profit for the SP. Rules may be set so that the profit to the user prevails over the profit to the SP (may set a range).

The auctioning rules may be adaptive. This means that the rules may evolve based on past auctioning processes against competing vendors. For example, if a vendor always loses the offer competition because the vendor's discount percentages are a little too low, the SP may inform the vendor and may be able to make a simulation of the results of increased percentages.

Figure 40:
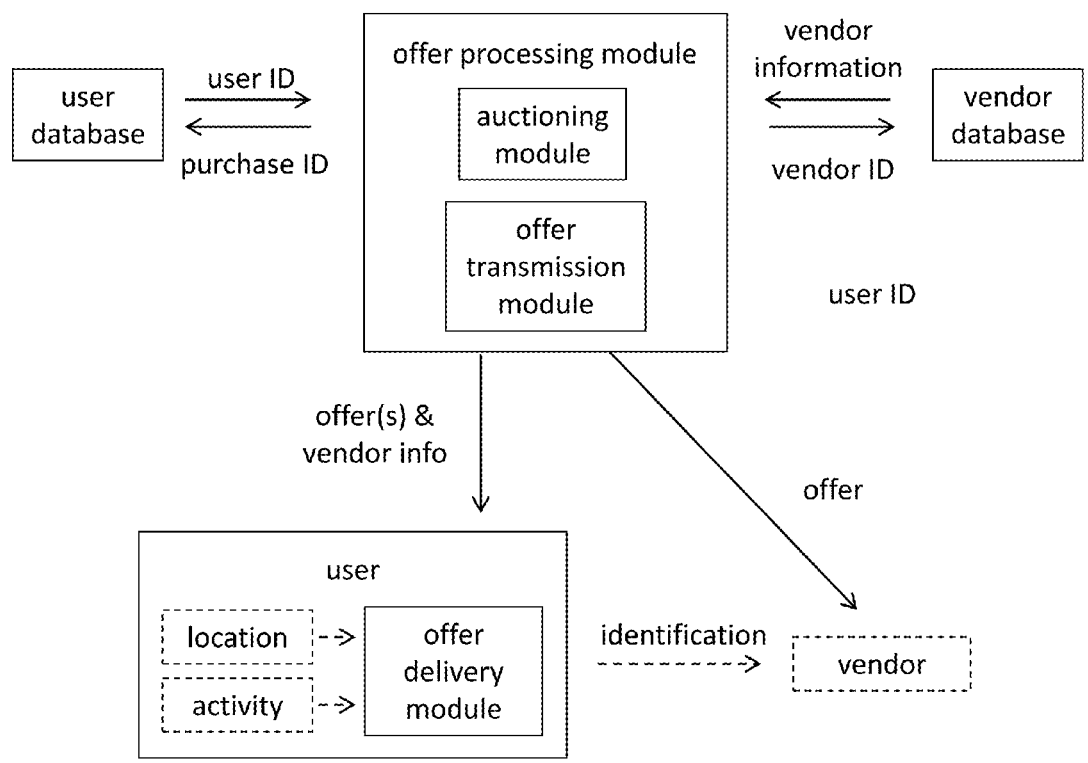
FIG. 40 is a schematic diagram showing the transfer of offers to the user, according to an embodiment.

Delivering the offer—Once the Offer Processing Module has determined the final offers, these offers have to be transmitted to the user (FIG. 40). This task may be performed by an Offer Transmission Module (OTM). When the offers are received from the OPM the vendor may be represented by a vendor 1D number and the user through a purchase ID number. The OTM gathers the relevant information from the vendor and user database for the corresponding ID numbers. The vendor information contains the name, address and Other required information. In addition, supplemental information regarding the vendor, such as customer reviews may also be added. It may also be interesting for the user, to see what information from the user profile the vendor accessed to formulate the offer. This information may be used to adjust the access to the user profile if required. All the offer information and history may be stored at the SP database for future reference.

The offer information is then transferred to the user. For example, this may be done by means of email, sms, or a dedicated application or tool designed by the SP. The offer made to the user may also be communicated to the vendor so the vendor is aware the offer was presented to the user. When transmitting the offer to the user, the vendor is known to the SP, but the user is still anonymous to the SP since the offers can be transmitted using the user ID. For personalized offers, the vendor may require that the user be identified. For the vendor the purchase ID related to the offer may be sufficient because this enables the vendor to identify the user that the offer was proposed to. Some vendors may require or desire to know the exact identity of the user. Because the SP does not know this identity, the user application or tool has to transmit this information directly to the vendor so that the identity of the user remains unknown to the SP. The details of this transmission may be incorporated into the offer, and may also depend on the (privacy) settings of the user.

The moment of delivery of the offers may depend on the method of requesting the demand. For example, if the user puts in a request manually, the offer may be formulated and delivered as quickly as possible, because there is a large possibility that the user is waiting for the offer. On the other hand, if the offer was generated automatically, for example by being within the preset range of a potential vendor, the moment of delivery might be chosen depending on the activity and/or location of the user. In one example, the user may receive the offers on a mobile device such as e.g. a smartphone, which is running a dedicated application or tool that incorporates an Offer Delivery Module (ODM). The ODM receives the offer information, and decides to make the user aware at the right moment depending on, for example, the locations and/or the activity of the user. For example, if the user is driving, the ODM might wait until the user stops driving. In general, the app should be programmed to wait for an appropriate pause in the activity. An exception might be when the user is in close proximity, and if waiting means the user is distancing himself from the vendor. The ODM may be programmed to select the best moment to have an as high as possible potential conversion rate, while taking the safety of the user into consideration.

In an alternative embodiment, the offer information may be stored in a ODM on the SP server, waiting for the device to signal that it can be transferred. In this case, the application monitors the activity of the device, and signals the ODM at an appropriate time to deliver the offers. In another example, if the user is transmitting his or her sensor data online, the analysis of the appropriate time may be decided in the cloud.

Although initially the offer is considered personal, the vendor may allow the offer to be transferred to the user's connections. For example, if one of the user's connections has a similar profile, and can be of similar interest to the vendor. The SP may take care of this transfer, in which case the offer becomes personal to the user's connection(s).

After-offer analysis—For the SP and the vendors, it may be interesting to know the behavior/action/reaction after the offers have been received. This information may be used to enhance and improve the offers and the service.

If the user accesses the offers using the SP's application or tool, it is possible to measure if he or she opens the offer information, and how long he or she checks out each offer. After the initial opening of the offer, it may be possible to see if the user did any follow up action to look for better offers, e.g. on the internet. If the user provides the SP with sufficient data, this kind of analysis can be made.

By monitoring the user's action's after the offer, the SP may be able to verify if the user actually came to the store of the vendor, but maybe did not buy the item. In this case, the offer may be considered as advertising, and a dedicated fee may be determined between the SP and the vendor for these situations.

A system may be put in place where the user may respond to the offer, for example rating them, or indicating if the offers are interesting. This information can be used to improve future offers and adapt the user profile. Such feedback may be treated as mentioned above in the section on monetizing options, and discussed in more detail below in the section on questionnaires.

Redeeming the offer—When the user receives a personalized offer that he or she wants to use, the user should be able to redeem the offer at the vendor.

In order to redeem the personalized offer, when the user goes to the vendor the user has to prove he or she has the right to a special offer. In one example, the user may be able to prove the offer by showing a QR code or equivalent (e.g. coupon reference, . . . ). The QR code may be sent to the user right away with the offers. Alternatively, the user may need to press a button to download the QR code. This has the advantage to monitor the interest of the user in the different offers. When showing the offer to the vendor, the agreed discount should be applied to the goods or services that the user wants to purchase. The vendor may request an identification of the user in order to validate that the user has the right to the offer. This validation may occur by comparing the offer the user presented to the offer notification send to the vendor by the SP. This validation may be done manually, or may be done automatically through communication between a user's app and the vendor tool, both provided by the SP. If the user pays with his phone, the SP app may take care of applying the discount. Other means of communication with the vendor (system) may also be used to redeem the offer, such as e.g. Bluetooth, NFC, etc.

In an alternative embodiment, the user initially does not receive the discount put pays the full price. The vendor then transfers the discount to the SP, and the SP transfers the discount to the user, minus the commission fee. The SP may make the payout to the user on a regular basis, for example once a month. This method has the advantage that the user becomes more aware of the compensation he or she obtains from the service provided by the SP in exchange for the data.

In addition to applying the discount for the user when redeeming the offer, the vendor also has to transfer the agreed commission to the SP. This transaction may be done from the vendor tool. The commission may come out of the remaining profit of the vendor, and may come out of the discount of the user.

It may happen that a user is going to a vendor with the intention to purchase the item he or she received an offer for. However, after discussing with the vendor, the user decides to purchase another (similar) item, with or without a (similar) discount. The SP and the vendor may make agreements on a commission for the SP for these situations, which may depends on the offer and the actual purchase. Furthermore, it may also happen that the user buys the items of the offer, and in addition buys other items. The SP and the vendor may make agreements on a commission for the SP for these additional purchases that occurred because the user came to the store after 'negotiation' by the SP.

Additional negotiation between the vendor and the user and/or SP may also occur. For example, the exchangeable profile may be modified prior to transmission, such as to improve the value to the vendor. This modification may comprise a change in granularity level. Thus, the modification may be based at least in part on the characteristics of the third party. Likewise, if the value to the vendor is improved, modification of the exchangeable profile may be linked to a change in the compensation.

The details of the transaction may also be uploaded to the SP and stored with the user profile and or the vendor profile.

After-sales analysis—It may be useful to do an after-sale analysis in order to improve the user profile, vendor profile, or the formulation of the offers. The results may be beneficial for the user, the vendor or the SP.

The purchase history may be provided to the SP, to analyze if the user bought exactly what was in the offer, if the user bought an alternative product, if the user bought more than the promoted product. . . .

It may also be interesting to analyze the actions of the user up to the event. What actions did the user take to come to the vendor? Did the user come especially for the vendor, or did the user combine with other actions? Did the user go see the competitors before?

It may also be interesting to analyze the action of the user after the sales. Did the user go do other stuff in the neighborhood? Did the user come back to the store, to buy or just to look?

The SP's after-sales tool may also give the user the possibility to provide feedback on the sale, or make other friend or connections aware of the vendor. In addition, the tool may be able to track repeat-business and work-of mouth effects. For example, the SP may be able to analyze if any of the connections of the user came to the shop and bought something. The SP may be able to track the user's first use of the new item, and ask the user to make a review.

Profile Based Advertising

In addition to the personalized offers discussed above, profile-based advertisement gives the user another monetizing option. Based on the user's profile and request, vendors may be able to do targeted advertising. In order to manage the advertising, meaning not over flooding the user with ads and maximizing the compensation for the user, the SP may follow a similar auctioning process as described above with the personalized offers. In other words, the vendors will pay a small fee to be able to propose the advertisement to the user, and through the auctioning process the SP will try to obtain the maximum fee for the user. The vendor that proposes the highest fee, will get the opportunity to propose the advertisement.

In analogy to the personalized offers, the advertising fee that the vendor is willing to pay is based on preset rules, and an analysis of the user's profile and status. The advertising is less personal in the sense that the user profile is used to select the ads that may be of interest to the user, but that the ads are not tailored to the user and any proposed offers or discounts are available to the general public. The user may not need a specific coupon or the likes to be able to purchase the goods or services in the advertising.

The triggering or initiation of the ads is similar to the personalized offers. The number of ads presented to the user may be adaptive and the SP may monitor the attention the user pays to the ads in order to optimize the process for the user and/or the vendor. The Return On Investment (ROI) may be determined by the SP for a certain user or user group/category, or for a certain vendor or vendor category. The ROI may be provided to the vendor by the SP in order to determine the advertisement fee the vendor is willing to pay (similar to the user status).

The ads may be presented to the user on several different media or devices, such as a mobile device like a smartphone, a desktop computer, or even a television screen. The ads may be used/integrated in many different types of applications, such as for example, web browsers, mobile applications, video viewer or video streams.

The advertising fee may be charged only for presenting the advertisement to the user. However, an after-ad analysis can be used to track the actions of the user as a consequence of the ad. The SP may track if the user goes to the vendor's shop and if he or she buys some of the vendor's goods or services. The SP may charge the vendor with additional fees depending on the steps/actions the user takes. For example, a small fixed fee when the user goes to the shop and a small percentage of the sale if the user actually buys something. The SP may provide certified proof of these actions based on the user's data.

Profile Based Questionnaire

The offers and advertising options discussed above generally are triggered by what a user is interested in purchasing. However, the knowledge and opinions of a user can also be a source of compensation. For example, a vendor who has sold a product to the user may be interested in the user's feedback. Answering the questions will take time of the user, for which he or she may receive a compensation or otherwise (e.g. discount on future products). If the questions require any actions, the SP may verify with (sensor) data if the user has performed the required actions.

In another example, a third party may be looking to perform a survey regarding certain goods or services, and may contact the SP with their request. Based on the type of survey, the type of questions, and/or the types of goods or services, the SP may selects potential users based on their user profile. The SP may then contact the selected users and ask them to fill out the questionnaire against an agreed compensation, which may depend on e.g. on the type and amount of questions. The SP may also receive a commission for the questionnaires.

Profile Based Filtering

Figure 41:
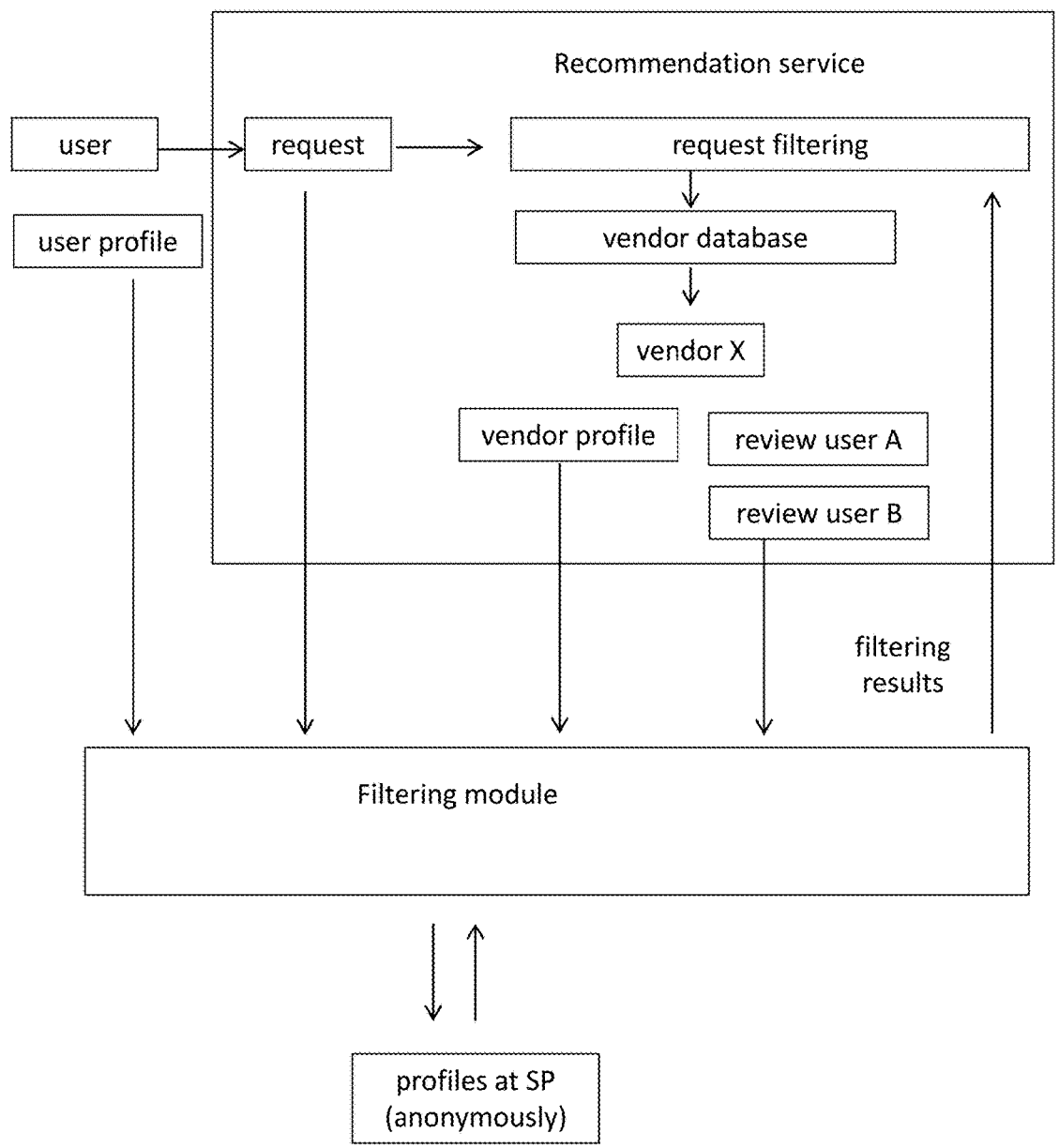
FIG. 41 is a schematic diagram showing a recommendation service involving user profiles, according to an embodiment.

The user based profile information may also be used to filter external databases based on the profile information. For example, the user may want to use a service, and that service has received reviews or comments from users (FIG. 41). Such services may consist of helping people find restaurants, hotels, etc. The profile information of the user and other users may be used to filter the reviews or comments of the proposed services (e.g. restaurants, hotel, . . . ) to obtain only those results that e.g. are contributed by users with similar profiles or lifestyles as the user.

Figure 42:
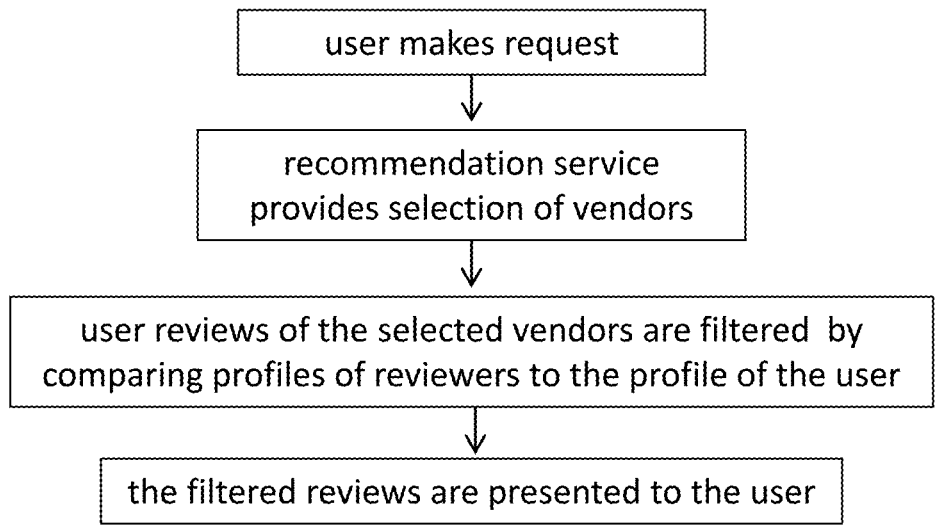
FIG. 42 is a schematic diagram showing selection among offers based on a recommendation service, according to an embodiment.

The profile based filtering may be done several ways, which will be explained now using the example of a user looking for a restaurant. In a first method the user may define that he or she is looking for a particular type of restaurant, and the service providing the restaurant into and reviews may list the corresponding restaurants according to the user's requests and specifications. Each of the listed restaurants may have reviews or comments from users. The profile based information from the user is used to filter the user reviews that are shown, and the profile is used to order the reviews starting e.g. with the review from the user with the profile that matches the most (FIG. 42). It is assumed here that a sufficient amount of the reviewers have a profile available.

Figure 43:
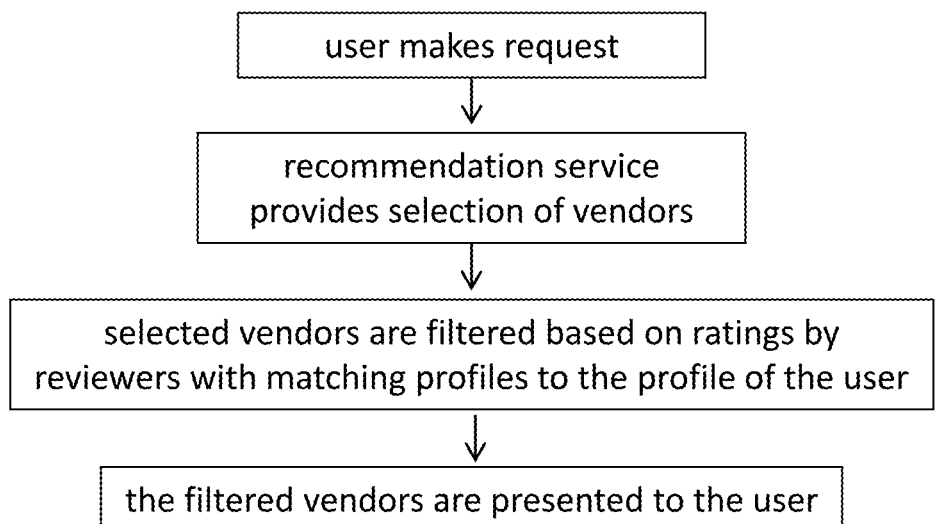
FIG. 43 is a schematic diagram showing the filtering of information about services based on a user profile, according to an embodiment.

In a second method, the filtering is done at a higher level. When the user defines the type of restaurant, the restaurants that are selected to be presented to the user are filtered based on the user profile. For example, the restaurant that are shown are based on the fact that user with a similar profile than the user have giving it at least a certain rating (FIG. 43).

In a third method, the filtering is done at an even higher level. In this method, the user does not define the type of restaurant he or she is looking for. The restaurants that are presented are selected based on the fact that users with a similar profile give the restaurants at least a certain rating.

The filtering depends on the type of service the user is looking for and on the available profile information of the users. The filtering settings may be defined at least in part by the service that lists the options, and may at least be partly defined by the user. For example, the user may indicate based on which criteria (e.g. profile entries) the matching profiles should be filtered. These criteria may also be defined by the SP, or the SP may learn these criteria based on past definitions by users. These learned preferences may then be proposed to the user, which may choose to modify them.

The principles of filtering the reviews and recommendation of these kinds of services may also be combined with the principle of the personalized offer. For each of the listed services, a personalized discount may be arranged, a least for those services subscribing to the SF, and shown in the listing. This means that the listing provided by the service also shows any personalized discount based on the user's profiles if one is available.

Alternative Compensation

The SP may have other opportunities to monetize the (sensor) data or profile information. The opportunities may also provide monetizing options for the user, i.e. the provider of the data. For example, the SP may sell data bases with (sensor) data to third parties that may want to use this data to construct models. These parties may pay directly for the data, or may offer the SP a share in the profit of the sales of the models. The user may be rewarded a share of the money earned by the SP, where the user's part may depend on his or her contribution to the databases that were sold. The SP itself may also use the sensor data to develop models. If these models are sold, the user may receive a share in a similar reasoning.

In a similar manner, the SP may be able to sell databases with profile information, for example for marketing purposes. The user rewards will be treated as with the sale of the sensor data.

In any case, the user is in complete control of how his or her sensor data and profile information is used. The user may indicate in his preference how he or she allows the SP to monetize the data.

Market Research Service—

As an example of monetizing the data and profile information the SP has gathered from the users, the SP may provide a Market Research Service. This service may e.g. provide answers that manufactures or vendors of products and services have concerning their customers. For example, consider the manufacturer of a certain model running shoe. This manufacturer may want to know what type of buyers buy this model of shoe, and how they use the shoe. The SP may check which users have bought that model of shoe, and then run an analysis on these users. A correlation analysis of the characteristics, habits, etc. of the user may provide valuable information to the manufacturer of the shoes. Some of these correlations may be obvious but some may only be deduced using the profile deduction algorithms that the SP constructed. The correlations that where found and the information in the profiles of the corresponding users may be compared to the target users that the manufacturer intended the shoe for. Moreover, information on how the users used the shoe may be compared to the targeted use. In any type of information, geographical dependencies may be revealed also. Based on the findings, the manufacturer may e.g. change the marketing strategy or may propose modification for the next version of the model.

The SP charges a service fee to these types of investigations, and part of this fee may be transferred to the users whose profile was used in the investigations. The distribution may be equal over the users, or a weight may be applied depending on how much profile information was used. The status of the user may also be used as a weight in the calculations of distribution of the compensations.

Ontology Based Architecture

Using ontologies—In order to create a user profile based on different data types and sources, the relations between the profile entries and the data have to be known or defined. When using different sensors, it has to be known which sensor can contribute to which profile entry or building block. Many difference architectures may be used for these purposes.

In one example embodiment, this architecture may be driven by ontologies. Ontology may be defined as a "specification of a conceptualization" (Tom Gruber) or a "description of things that exist and how they relate to each other" (Chris Welty). In our application of building user profiles, there are DCOs that generate data, which is converted into profile entries. The ontology basically describes all these different elements and the relation that exists between them. The underlying idea is that based on the ontology there is a logical way to determine which DCO and data can be used for which profile entries, and which DCOs and data are required to construct a particular profile entry.

Ontologies and the use of ontologies are widely described in literature, and it is not our goal to describe all the principles here. The examples that follow below show how to apply the principles of ontologies for the creation of the user profile. The examples should not be interpreted as explicit ontology definitions or syntax definitions. In ontology the definitions are often given as triples; subject-predicate-object.

Consider the following list of triples:

| | | |
|---|---|---|
| grocery_store | is_a | building |
| building | has_a | location |
| location | is_measured_with | GPS |

The predicate 'is_a' is used in this example to attribute the grocery_store to the class 'building' and the predicate 'has_a' is used to attribute a property 'location' to the elements of the class 'building'. The predicate 'is_measured_with' defines which property can be determined with which sensor or DCO. These ontology triples define that the location of a grocery store can be measure with a GPS, or more in general the location of any building can be determined using a GPS.

| | | |
|---|---|---|
| building | has_a | address |
| address | is_measured_with | address_DB |

By adding these triples, the addresses of the grocery store (or other buildings) can be determined from the lookup table 'address_DB'. In this case the database is the data source. To define that at a grocery store we do shopping and to get the amount of money the user spends at the grocery store, the following triples may be used.

| | | |
|---|---|---|
| grocery_store | is_a | shop |
| buying | is_a | activity |
| buying | is_activity_at | shop |
| payment | is_part_of | buying |
| payment | is_measured_with | credit_card_DB |

This defines that at a grocery store (or other shops) a user is buying something, and that the amount of the payment can be determined from the DCO 'credit_card_DB' that represents the credit card statements of the user. The predicates that the SP uses to define the relations may be defined by the SP or may be imported from other existing ontologies.

The underlying principle of the application of ontology is that it is used to define the measurable properties or attributes of people, objects and events, how to measure these properties and attributes, and with which sensors or DCOs. For any measurable property or attribute, there should always be one sensor or DCO entry into the ontology, either directly or indirectly. If not, this means that it cannot be measured and this may indicate that the user should do a manual entry. Indirectly means that, following the relations defined in the ontology the path can be followed to determine how to measure. The predicates, or relations between the subjects and objects, may be defined by the SP specifically for the determination of the profile entries. However, the predicates should be kept as basic and few as possible in order to simplify the processing.

Figure 44:
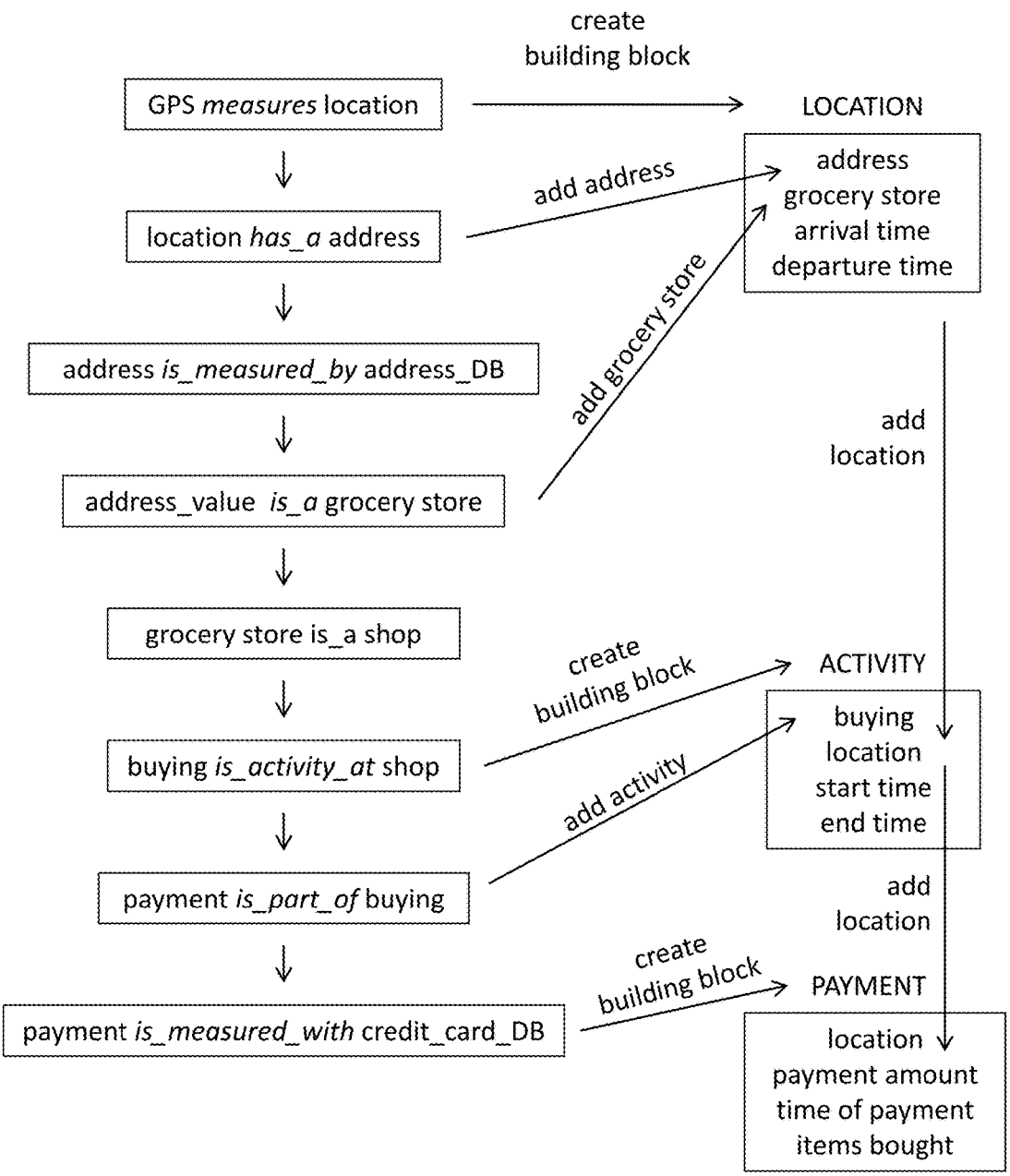
FIG. 44 is a schematic diagram showing the application of ontology when creating building blocks, according to an embodiment.

Creating building blocks—The definitions of the relations may be used for the extraction of the features from the sensor signals and the creation of the building blocks discussed above. FIG. 44 shows an example of the application of ontology for the creation of building blocks. In this example, GPS data is received and if the GPS data indicates that the user is not moving but is at a certain location, the feature extraction and building block construction may be started. The fact that the GPS measures a location may trigger the creation of a location building block. The ontology teaches that each location has an address and that this address can be looked up in a DB. Because the address is a property of the location, the determined address is added as a property to the location building block. The address database may indicate that the address corresponds to a grocery store, and this may also be added as an attribute to the building block. The arrival time and departure time may also be added.

Once it has been detected that the location is a grocery store, the ontology logic can be followed further to deduce that the grocery store is a shop, and that at a shop the activity is defined as buying or shopping. The detection of an activity may lead to the creation of an activity building block. It may be defined that every activity has a location, and then the location, which may be inherited from the location building block, is added to the activity building block. Since a payment is part of buying and a payment can be measured from a credit card record, the system will check if such a record is available for the timeslot that the user visited the grocery store. If the record is available a payment building block is created with the corresponding information.

Figure 45:
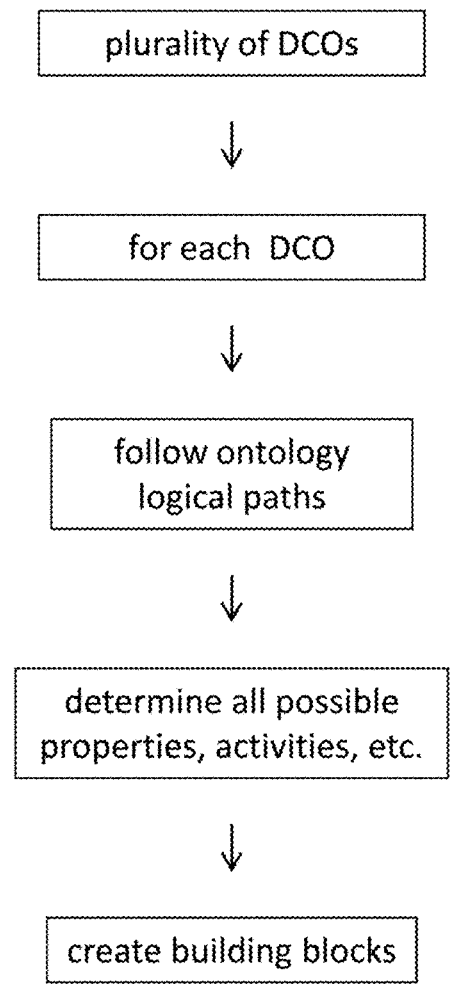
FIG. 45 is a schematic diagram ontological creation of building blocks using sensor data, according to an embodiment.

This example shows that, by following the logical path defined in the ontology, all the possible building blocks can be created and the measurable properties determined. In other words, the ontology helps to make sure that everything that can be measured is measured, and nothing is forgotten. A maximum of building blocks can be created and the links between the buildings blocks will be known. In this example, the starting point was the GPS data, but if data from other DCO is available these logical paths may be started at each DCO or incoming data because not all sensors are necessarily interconnected (FIG. 45).

The building blocks may be created as the data is coming in, or e.g. at the end of the day or during the night when all the data for that day is available. Some data may be available with a delay, and using a timestamp the building block may be created later or the data may be added later. In case the ontology is looking for some type of data, and that data is not yet available, a process may be started to regularly check for the missing data. For data that is always available with a delay, such as e.g. a credit card data, the SP may learn the time delay and adapt the process to check for the data.

Sensor profiles—In the discussion above it was shown how the ontology may be applied to analyze the data that has been measured. In addition, the definitions and links of the ontology may also be used to create and adapt the user's sensor profiles. A sensor profile is the definition of which sensors are active and what the settings of the sensors are. Based on the ontology links and definition it can be determined which of the sensors or DCOs are needed to obtain the information that is required. In the example above, the GPS may be switched off when the user is in the grocery store. The detector that detects the payments has to be activated because a payment is expected due to the shopping activity (although in this case the DCO for the credit card is not actually a sensor). However, it could be defined that the payment is always preceded by a waiting in line. Therefore, it may be decided to activate the accelerometer (and gyrometer) to determine how long the user is standing still, or walking slowly, before the payment is done. In another example, if it is detected that the user is at a tennis court, the activity monitoring sensors, such as e.g. the accelerometer and gyrometer, may be switching on the determine how much the user is running and walking while playing tennis. If the user is using an electronic racket, the activation and detection of the data from the racket may also be used to activate the motion sensors.

The sensor profiles may be adaptive depending on the location, on the activity or any other relevant trigger option. The system may be able to switch a sensor on if the sensor is required for data that is expected to be available. The system may also be able to switch off a sensor to save battery or processing power is the sensor is not needed. In this case, it should be verified (e.g. with the OS) that no other part of the system is using the sensor.

The ontology does not necessarily always provide all the information needed to optimize the sensor profiles. Additional information may also be provided by analyzing the sensor data. For example, to know exactly when a sensor is needed within a certain activity may not be known based on the ontology. The fact that the payment is done at the end of the shopping may not be defined (but this is possible). However, from analysis the time of the payment compared to the time of the shopping activity this relation can be determined, and the accelerometer activation can be adapted accordingly.

Profile Entries—In addition to the application of the ontology logic to the feature extraction and the creation of building blocks, the ontology can be used in a similar way for the profile entry inputs. Because the ontology is used to gather information, the statements may be referred to as ontology queries. For example, consider that a profile entry relates to the grocery store statistics of the user. This entry may be defined using the ontology query: 'user is_visiting grocery_store'. The predicate is_visiting may be defined as looking for a match in location of the object and the subject. The system will then analyze the location building blocks with a location class grocery store. A time window may be given with the request to analyze only the building blocks within that window. The system may be set up to analyze all the properties as specified in the ontology. In addition, the system may present the results as a sum of the class, and per available subclasses defined in the ontology. This means that for this example, the system will be set up to give the number of visits to grocery stores, the visiting time, and the payments as a sum of the class, but it will give the same information for each different grocery store that is part of the class (e.g. Safeway, Whole Foods, . . . ). If any subclasses of the grocery_store class exist, the system will automatically perform an analysis per subclass (e.g. organic or non-organic). All the different analyses may be performed automatically according to the logic defined in the ontology. For example, if instead of the grocery store, a profile entry is related to the restaurant visits, the profile entry may be defined by 'user is_visiting_restaurant', and all the analysis similar to the grocery store analysis is automatically performed. The restaurant may have other properties, such as e.g. the noise level, but these are automatically included in the analysis and the statistics, if this is indicated in the ontology.

The profile entry may also be limited by adding e.g. subclasses or properties to the object. For example, to only get the payment information the profile entry may be defined as 'user is_visiting grocery_store (payment)', or to limit to the sub class of organic grocery stores 'user is_visiting grocery_store (organic)', or a combination of the two with 'user is_visiting grocery_store (payment;organic)'.

In another example, the profile entry may be related to the activity of the user, and specifically running. The activity class may have a sub class 'sport' to which running belongs. The profile entry definition may then be e.g. 'user is_doing sport(running)', where is_doing is defined as being related to an activity the subject is doing. As with the example above, following the properties defined in the ontology, all the data relevant for running is presented, such as e.g. the average distance, average speed. This data may be distributed for different subclasses related to the terrain (e.g. tarmac, single track, gravel road, . . . )

The examples above show how to use the ontology to summarize all the related information following the ontology logic. Certain functions or calculations may also be applied to the obtained data. For example, to create a profile entry indicating how much time a user spends on average per week doing sport the following statement may be used 'user is_doing sport (time_per_week)'. In this example first all the sport related activities for the user are gathered, and then a function 'time_per_week' is applied. This function is defined by the SP and extracts all the time information from the data resulting from the ontology query and determines the average time per week. (Note that the syntax used or proposed in all these examples serves just to explain the principles and are only examples and many other syntax variations are possible to obtain the same functionalities).

The profile entries may also be constructed by combining different ontology queries. For example, to obtain a profile entry that states if the user is living healthy, queries may be performed on the activities a user performs, the type of restaurants he or she visits, or the grocery stores the user uses. The resulting information may then be combined by a specific function or algorithm that generates e.g. a healthy living index.

The ontology and the functions/algorithms may also be designed to investigate and determine time related dependencies. This means that the SP should be able to determine that certain events are related in time to other events. For example, in order to determine if a user is taking the car or public transportation to work, it has to be determined if the activity of the user was 'driving' before (and after) the user was at work, which can be defined as an activity or a location.

In conclusion, the profile entries can be generated using the ontology as a means to gather all the available information that was preprocessed into e.g. building blocks. Functions or algorithm may be applied to combine or further extract information.

Profile queries by vendor—When sending profile information to a vendor for a monetizing option, ontology queries may also be used. The query may be formed by the SP and the information will then be send to the vendor, or the vendor may construct the query and the SP will respond with the information if the privacy settings allow. When the SP sends information to a vendor, the information may already be available in the form of a profile entry. Alternatively, the SP may define a specific query for the vendor and gather the information with the monetizing options. For example, if the user request an offer for running shoes, the SP may run a query to determine the amount of miles or kilometers the user is doing on average per week (e.g. 'user is_doing sport(running(miles_per_week))') and use the results as part of the information send to the vendor along with the request. In a setup where the vendor is allowed to 'interview' the profile, the vendor tool may be designed to formulate similar requests to obtain the information. A privacy manager may be used to verify that the vendor is not asking for unrelated information. For example, the vendor may have been attributed a class, and may only ask questions related to that class. In this example, the vendor may be attributed a class 'sport', and therefore the question/queries may only be related to the sport activities of the user (e.g. 'user is_doing sport'). The permission may be related to the (class) levels of the ontology. In this example using activities, the highest or first level is the level covering all activities, the second level in this case is the level covering sporting activities, and the third level is the level covering the running activity. If the user asks for an offer related to running shoes, all information for the equivalent level may be made available to the vendor (in this case the third level). A certain discount percentage may be defined for that level, if the vendor would like to gel information about a higher level, in this case for all sports related activities, the vendor may have to increase the discount level also (as discussed above in the auctioning section). In conclusion, the different levels of the ontology also help to regulate the access to the information for the vendors and different discount percentages.

Ontology evolution—The ontology is not static and may evolve since its initial creation by the SP. The SP may not be able to define all the required logical connections between object, properties, activities, etc. The ontology may evolve because of additions by the user, for example by annotation. For example, certain links between activities and location, or links between object and properties may be added by users. The SP may provide an annotation tool or dedicated tool for the evolution of the ontology.

The additions to the ontology may also be done automatically based on detected relations and correlations in the data. For example, by analyzing the user motion data and the payment data, the SP may be able to deduce that before the payment the user is always standing still or walking very slowly for a certain amount of time. In other words, this standing time, or waiting time, may be defined as a part of the payment process. The detection of such a logical combination may be proposed as a candidate addition to the ontology which has to be approved by the SP. This automatic addition means that after this creation of the new ontology entry, for future payment activities the system will automatically detect the waiting time.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for constructing an exchangeable profile of a user having at least one profile entry, comprising:
    a) associating a first device having an integrated sensor assembly including at least one sensor with the user;
    b) operating the integrated sensor assembly according to a first sensor configuration;
    c) obtaining sensor data from the integrated sensor assembly;
    d) determining at least one feature that may be extracted from the sensor data;
    e) processing the sensor data to extract the at least one feature;
    f) determining at least one profile entry that depends at least in part on the extracted feature;
    g) determining entry data for the at least one profile entry of a private profile of the user based at least in part on the extracted feature;
    h) generating the at least one profile entry of the private profile by incorporating the determined entry data, so that the at least one profile entry is based at least in part on sensor data from the integrated sensor assembly;
    i) obtaining privacy data corresponding to the user;
    j) establishing a first granularity level for at least one profile entry of the private profile based at least in part on the privacy data;
    k) transforming the at least one profile entry of the private profile to match the first granularity level; and
    l) generating the exchangeable profile, wherein the exchangeable profile comprises the at least one transformed profile entry.

2. The method of claim 1, further comprising determining a second sensor configuration based at least in part on the entry data required for a profile entry and operating the sensor assembly according to the second sensor configuration.

3. The method of claim 1, further comprising determining a confidence factor for the determined entry data for the profile entry.

4. The method of claim 3, further comprising adjusting the confidence factor over time.

5. The method of claim 1, further comprising obtaining a request for the at least one profile entry.

6. The method of claim 5, wherein the determining a feature is based on the requested profile entry.

7. The method of claim 5, wherein the first sensor configuration is based at least in part on the request.

8. The method of claim 1, further comprising inputting entry data for the profile entry and verifying the input entry data based on the sensor data.

9. The method of claim 8, further comprising determining a confidence factor for the input information based at least in part on the verification.

10. The method of claim 1, wherein at least part of the user profile is anonymized.

11. The method of claim 1, further comprising determining sensor activity for the determined entry data, and associating the sensor activity with the profile entry.

12. The method of claim 1, wherein the user profile contains at least one profile entry related to a status of the user.

13. The method of claim 1, wherein the user is connected to at least one second user.

14. The method of claim 1, further comprising establishing a plurality of granularity levels for at least one profile entry of the profile wherein establishing the first granularity level comprises selecting the first granularity level from the plurality of granularity levels for the at least one profile entry based at least in part on the privacy data.

15. The method of claim 14, wherein establishing the plurality of granularity levels comprises analyzing a plurality of user profiles.

16. The method of claim 15, wherein the plurality of user profiles is selected from a group of users, the selection process being based on a comparison of the entry data of at least one profile entry.

17. The method of claim 1, wherein the first granularity of the profile entry is derived from the privacy data using a disclosure parameter associated with the profile entry.

18. The method of claim 1, further comprising transmitting the exchangeable profile to a third party and receiving compensation in return.

19. The method of claim 18, wherein the compensation is based at least in part on a granularity level of the entry data.

20. The method of claim 18, further comprising modifying the exchangeable profile prior to transmission.

21. The method of claim 20, wherein the modification is based at least in part on the characteristics of the third party.

22. The method of claim 20, wherein modification of the exchangeable profile is linked to a change in the compensation.

23. The method of claim 18, wherein the third party is identified based at least in part on a user request with respect to a desired compensation.

24. The method of claim 18, wherein the received compensation is determined in an automated negotiation process with the third party according to preset rules.

25. The method of claim 24, wherein the content of the exchangeable profile is determined in the automated negotiation process.

26. The method of claim 18, wherein the exchangeable profile includes information about a status of the user for the third party.

27. The method of claim 18, wherein the exchangeable profile includes at least one profile entry related to a second user connected to the user.

28. The method of claim 1, further comprising establishing a value for the transformed profile entry.

29. The method of claim 28, further comprising establishing a value for the transformed profile entry based at least in part on comparison to at least one completed exchange.

30. The method of claim 28, further comprising establishing a value for the transformed profile entry based at least in part on a request for the transformed profile entry.

31. The method of claim 28, further comprising determining a value for the exchangeable profile by aggregating established values for a plurality of transformed profile entries.

32. The method of claim 28, further comprising adjusting the established value for the transformed profile entry by selecting a second granularity level and updating the transformed profile entry based at least in part on the second granularity level.

33. The method of claim 28, further comprising relating the established value to the first sensor configuration.

34. The method of claim 33, further comprising operating the sensor assembly according to a second sensor configuration to generate an exchangeable profile with a different value.

35. A device for constructing an exchangeable profile for a user, comprising a sensor assembly including at least one sensor integrated with the device and a profile module implemented by a processor configured to:
   a) operate the sensor assembly according to a first sensor configuration;
   c) provide sensor data from the sensor assembly;
   d) determine at least one feature that may be extracted from the sensor data;
   e) process the sensor data to extract the at least one feature;
   f) determine at least one profile entry of a private profile for the user that depends at least in part on the extracted feature;
   g) determine entry data for the at least one profile entry of the private profile based at least in part on the extracted feature;
   h) generate the at least one profile entry of the private profile by incorporating the determined entry data, so that the at least one profile entry is based at least in part on sensor data from the sensor assembly;
   i) obtain privacy data corresponding to the user;
   j) establish a first granularity level for at least one profile entry of the private profile based at least in part on the privacy data;
   k) transform the at least one profile entry of the private profile to match the first granularity level; and
   l) generate the exchangeable profile, wherein the exchangeable profile comprises the at least one transformed profile entry.

36. A server for constructing an exchangeable profile for a user, comprising a processor implementing a profile module configured to:
   a) determine at least one profile entry of a private profile for the user that depends at least in part on an extracted feature, wherein the extracted feature is extracted from sensor data obtained from a device with an integrated sensory assembly operated according to a first sensor configuration that is associated with the user;
   b) determine entry data for the at least one profile entry of the private profile based at least in part on the extracted feature;
   c) generate the at least one profile entry of the private profile by incorporating the determined entry data, so that the at least one profile entry of the private profile is based at least in part on sensor data from the integrated sensor assembly;
   d) obtain privacy data corresponding to the user;
   e) establish a first granularity level for at least one profile entry of the private profile based at least in part on the privacy data;
   f) transform the at least one profile entry of the private profile to match the first granularity level; and
   g) generate the exchangeable profile, wherein the exchangeable profile comprises the at least one transformed profile entry.

* * * * *